United States Patent
Matsumoto et al.

(10) Patent No.: US 9,467,602 B2
(45) Date of Patent: Oct. 11, 2016

(54) CONTROL TERMINAL, IMAGING SYSTEM, CONTROL METHOD, AND NON-TRANSITORY MEDIUM SAVING PROGRAM FOR CONTROLLING A TARGET TERMINAL RESPONSIVE TO DETECTION OF A PREDETERMINED STATE OF AN OBJECT OR A PREDETERMINED MOTION OF THE OBJECT

(71) Applicant: Olympus Corporation, Hachioii-shi, Tokyo (JP)

(72) Inventors: Saori Matsumoto, Tokyo (JP); Kensuke Ishii, Tokyo (JP); Arata Shinozaki, Tokyo (JP); Kiiko Takamatsu, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/735,506

(22) Filed: Jun. 10, 2015

(65) Prior Publication Data

US 2016/0150132 A1    May 26, 2016

Related U.S. Application Data

(63) Continuation of application No. PCT/JP2014/080784, filed on Nov. 20, 2014.

(51) Int. Cl.
*H04N 5/225* (2006.01)
*H04N 5/232* (2006.01)
*H04N 5/228* (2006.01)

(52) U.S. Cl.
CPC .......... *H04N 5/2252* (2013.01); *H04N 5/2254* (2013.01); *H04N 5/23216* (2013.01); *H04N 5/23293* (2013.01)

(58) Field of Classification Search
CPC ........... H04N 5/23248; H04N 5/2254; H04N 5/2252; G03B 17/48; G03B 2217/00; G03B 17/565
USPC ............................. 348/373, 375–376, 208.99
See application file for complete search history.

(56) References Cited

U.S. PATENT DOCUMENTS

2012/0162476 A1  6/2012  Onoda
2013/0329074 A1*  12/2013  Zhang ................... H04N 5/2258
                                                                  348/222.1
2015/0049204 A1  2/2015  Okabe et al.

FOREIGN PATENT DOCUMENTS

| JP | A-2008-026553 | 2/2008 |
| JP | A-2010-034633 | 2/2010 |
| JP | A-2010-181968 | 8/2010 |
| JP | A-2012-053532 | 3/2012 |
| JP | A-2012-142721 | 7/2012 |
| JP | B-5541429 | 5/2014 |
| JP | B-5515067 | 6/2014 |

OTHER PUBLICATIONS

International Search Report to PCT/JP2014/080784, mailed Feb. 17, 2015 (2 pgs.), with translation (1 pg.).
Written Opinion of the International Searching Authority to PCT/JP2014/080784, mailed on Feb. 17, 2015 (3 pgs.), with translation (3 pgs.).

* cited by examiner

*Primary Examiner* — Kelly L Jerabek
(74) *Attorney, Agent, or Firm* — John C. Pokotylo; Straub & Pokotylo

(57) ABSTRACT

A control terminal includes: an imaging unit configured to capture an image of a shooting area and to generate a first image; a shielding object detecting unit configured to detect a shielding object fixed to the control terminal, the shielding object shielding part of the shooting area; an operation detecting unit configured to detect a predetermined state of an object other than the shielding object or a predetermined motion of the object based on a second image, which is an image of at least an area based on an image of the shielding object in the first image, after the shielding object has been detected; and an output unit configured to output a control signal to a control target terminal when the predetermined state of the object or the predetermined motion of the object is detected.

18 Claims, 35 Drawing Sheets

CONTROL TERMINAL, IMAGING SYSTEM, CONTROL METHOD, AND NON-TRANSITORY MEDIUM SAVING PROGRAM FOR CONTROLLING A TARGET TERMINAL RESPONSIVE TO DETECTION OF A PREDETERMINED STATE OF AN OBJECT OR A PREDETERMINED MOTION OF THE OBJECT

This application is a continuation application of PCT Application No. PCT/JP2014/080784, filed on Nov. 20, 2014, the disclosure of which is incorporated herein by reference in its entirety.

BACKGROUND OF THE INVENTION

1. Field of the Invention

The present invention relates to a control terminal, an imaging system, a control method, and a non-transitory medium saving a program.

2. Description of Related Art

A technique of detecting the motion of a person's hand from an image acquired from a camera and controlling equipment based on the detected motion of the hand, that is, a gesture, is known. For example, Japanese Unexamined Patent Application Publication No. 2012-53532 discloses a technique of detecting a motion of a user's finger on a virtual input device from an image and performing an input based on the detected motion of the finger. In this technique, a predetermined area of a desk surface or the like is used as a virtual input device (for example, a keyboard). A pressing operation with the user's finger in this area is detected.

SUMMARY OF THE INVENTION

According to a first aspect of the present invention, there is provided a control terminal including: an imaging unit configured to capture an image of a shooting area and to generate a first image; a shielding object detecting unit configured to detect a shielding object fixed to the control terminal, the shielding object shielding part of the shooting area; an operation detecting unit configured to detect a predetermined state of an object other than the shielding object or a predetermined motion of the object based on a second image after the shielding object is detected, the second image being an image of at least an area based on an image of the shielding object in the first image; and an output unit configured to output a control signal to a control target terminal when the predetermined state of the object or the predetermined motion of the object is detected.

A second aspect of the present invention is the control terminal according to the first aspect, wherein the shielding object detecting unit detects the shielding object based on the first image.

A third aspect of the present invention is the control terminal according to the first or second aspect, wherein the shielding object is the control target terminal.

A fourth aspect of the present invention is the control terminal according to any one of the first to third aspects, wherein the control target terminal is an imaging terminal having a wireless communication function. Here, the output unit may wirelessly transmit the control signal relevant to the imaging to the imaging terminal when the predetermined state of the object or the predetermined motion of the object is detected.

A fifth aspect of the present invention is the control terminal according to the second aspect, wherein focus or exposure of the imaging unit is settable. Here, the focus or the exposure set in the imaging unit may be fixed while the shielding object detecting unit detects the shielding object.

A sixth aspect of the present invention is the control terminal according to the first aspect, wherein the operation detecting unit stops the detecting of the predetermined state of the object or the predetermined motion of the object when the shielding object is not detected after the shielding object has been detected.

A seventh aspect of the present invention is the control terminal according to the first aspect, further including a display unit configured to display the first image. Here, the display unit may stop the displaying of the first image when the shielding object is not detected after the shielding object has been detected.

An eighth aspect of the present invention is the control terminal according to the first aspect, wherein the imaging unit stops the forming of the first image when the shielding object is not detected after the shielding object has been detected.

A ninth aspect of the present invention is the control terminal according to the first aspect, wherein the operation detecting unit detects a position of the object and the predetermined state of the object based on the second image after the shielding object is detected. Here, the second image may be an image of at least an area based on an image of the shielding object in the first image. The output unit may output the control signal based on the position of the object to the control target terminal when the predetermined state of the object is detected.

A tenth aspect of the present invention is the control terminal according to the ninth aspect, wherein the control target terminal is a lens module connected to an imaging terminal. Here, the output unit may output the control signal to the lens module when the position of the object is at least an area based on the lens module and the predetermined state of the object is detected.

An eleventh aspect of the present invention is the control terminal according to the first aspect, wherein the operation detecting unit detects the predetermined state of the object or the predetermined motion of the object based on the second image after the shielding object is detected. Here, the second image may be an image of a second area which is included in a first area including the shielding object in the first image.

A twelfth aspect of the present invention is the control terminal according to the eleventh aspect, further including an input unit configured to input information from the control target terminal. Here, the operation detecting unit may detect the second area based on the information input through the input unit.

A thirteenth aspect of the present invention is the control terminal according to the twelfth aspect, wherein the control target terminal is an imaging terminal and a lens module is connected to the imaging terminal. Here, the input unit may input information of the lens module from the imaging terminal. The second area may be at least an area including an image of the imaging terminal.

A fourteenth aspect of the present invention is the control terminal according to the first aspect, further including a manual operation detecting unit configured to detect a first manual operation on the control terminal. Here, the operation detecting unit may stop the detecting of the predetermined state of the object or the predetermined motion of the object when the first manual operation is detected after the shielding object has been detected.

A fifteenth aspect of the present invention is the control terminal according to the first aspect, wherein the control target terminal is an imaging terminal. Here, the control terminal may further include a manual operation detecting unit configured to detect a second manual operation on a lens module connected to the imaging terminal. The operation detecting unit may stop the detecting of the predetermined state of the object or the predetermined motion of the object when the second manual operation is detected after the shielding object has been detected.

According to a sixteenth aspect of the present invention, there is provided an imaging system including a control terminal and an imaging terminal. Here, the control terminal includes: an imaging unit configured to capture an image of a first shooting area and to generate a first image; a shielding object detecting unit configured to detect a shielding object fixed to the control terminal, the shielding object shielding part of the shooting area; an operation detecting unit configured to detect a predetermined state of an object other than the shielding object or a predetermined motion of the object based on a second image after the shielding object is detected, the second image being an image of at least an area based on an image of the shielding object in the first image; and an output unit configured to output a control signal to a control target terminal when the predetermined state of the object or the predetermined motion of the object is detected. The imaging terminal includes: a second imaging unit configured to capture an image based on the control signal and to generate a third image; and an input unit configured to input the control signal from the control terminal.

According to a seventeenth aspect of the present invention, there is provided a control method including: an imaging step of capturing an image of a shooting area using an imaging unit of a control terminal and forming a first image; a shielding object detecting step of detecting a shielding object fixed to the control terminal, the shielding object shielding part of the shooting area; an operation detecting step of detecting a predetermined state of an object other than the shielding object or a predetermined motion of the object based on a second image after the shielding object is detected, the second image being an image of at least an area based on an image of the shielding object in the first image; and an output step of outputting a control signal to a control target terminal when the predetermined state of the object or the predetermined motion of the object is detected.

According to an eighteenth aspect of the present invention, there is provided a non-transitory medium saving a program causing a computer to perform: an imaging step of capturing an image of a shooting area using an imaging unit of a control terminal and forming a first image; a shielding object detecting step of detecting a shielding object fixed to the control terminal, the shielding object shielding part of the shooting area; an operation detecting step of detecting a predetermined state of an object other than the shielding object or a predetermined motion of the object based on a second image after the shielding object is detected, the second image being an image of at least an area based on an image of the shielding object in the first image; and an output step of outputting a control signal to a control target terminal when the predetermined state of the object or the predetermined motion of the object is detected.

DETAILED DESCRIPTION OF THE INVENTION

Figure 1:
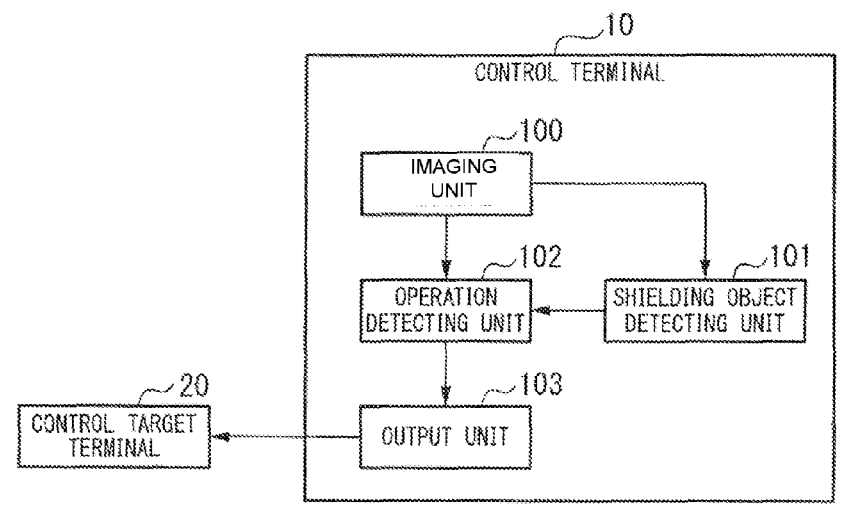
FIG. 1 is a block diagram showing a configuration of a control terminal according to an embodiment of the present invention.

Exemplary embodiments of the present invention will be described below with reference to the accompanying drawings. FIG. 1 shows a configuration of a control terminal 10 according to an embodiment of the present invention. As showed in FIG. 1, the control terminal 10 includes an imaging unit 100 (first imaging unit), a shielding object detecting unit 101, an operation detecting unit 102, and an output unit 103.

The imaging unit 100 captures an image of a shooting area and forms a first image. The shielding object detecting unit 101 detects a shielding object fixed to the control terminal 10. The shielding object shields part of the shooting area. After the shielding object is detected, the operation detecting unit 102 detects a predetermined state of an object other than the shielding object or a predetermined motion of the object based on a second image. The second image is included in the first image. The second image is an image of at least an area based on the shielding object in the first image. When the predetermined state of the object or the predetermined motion of the object is detected, the output unit 103 outputs a control signal to a control target terminal 20.

According to this configuration, it is possible to control the control target terminal 20 depending on the state of the object or the motion of the object which is detected from the image. For example, the object other than the shielding object is a person's finger or hand. That is, it is possible to control the control target terminal 20 depending on a gesture of a user.

For example, the shielding object detecting unit 101 detects the shielding object based on the first image formed by the imaging unit 100. For example, the shielding object is the control target terminal 20. For example, the control target terminal 20 is an imaging terminal having a wireless communication function. When the predetermined state of the object or the predetermined motion of the object is detected, the output unit 103 may wirelessly transmit a signal relevant to the imaging to the imaging terminal. The control target terminal 20 may be a lens module.

The shielding object detecting unit 101 may be a switch that mechanically or electrically detects the shielding object fixed to the control terminal 10. Accordingly, an image processing load of the control terminal 10 is reduced.

The output unit 103 may perform wired or wireless communication. The output unit 103 may output the control signal to the control target terminal 20 through a relay terminal that relays the control signal. When the control target terminal 20 is a lens module, the imaging terminal may be a relay terminal.

For example, when the control target terminal 20 is the imaging terminal, the output unit 103 outputs a control signal for instructing execution of the imaging to the imaging terminal. When the control target terminal 20 is the imaging terminal, the output unit 103 may output a control signal indicating a parameter relevant to the imaging, that is, an imaging parameter, to the imaging terminal. For example, the imaging parameter controlled in the imaging terminal is a shutter speed. When the control target terminal 20 is the lens module, the output unit 103 may output a control signal indicating the imaging parameter to the lens module. For example, the imaging parameter controlled in the lens module is at least one of focus, zoom, and an aperture.

A computer of the control terminal 10 may read a program including commands for defining an operation of the control terminal 10 and may execute the read program. That is, the function of the control terminal 10 may be embodied by software. The program is provided by a "computer-readable recording medium" such as a flash memory. The program may be transmitted from a computer having a storage device or the like storing the program to the control terminal 10 via a transmission medium or by transmission waves in the transmission medium. Here, the "transmission medium" via which the program is transmitted is a medium having a function of transmitting information, such as a network (communication network) such as the Internet or a communication circuit (communication line) such as a telephone line. The program may be configured to realize part of the above-mentioned function. The program may be a so-called differential file (differential program) which can realize the above-mentioned function in combination with a program recorded in advance in a computer.

Figure 2:
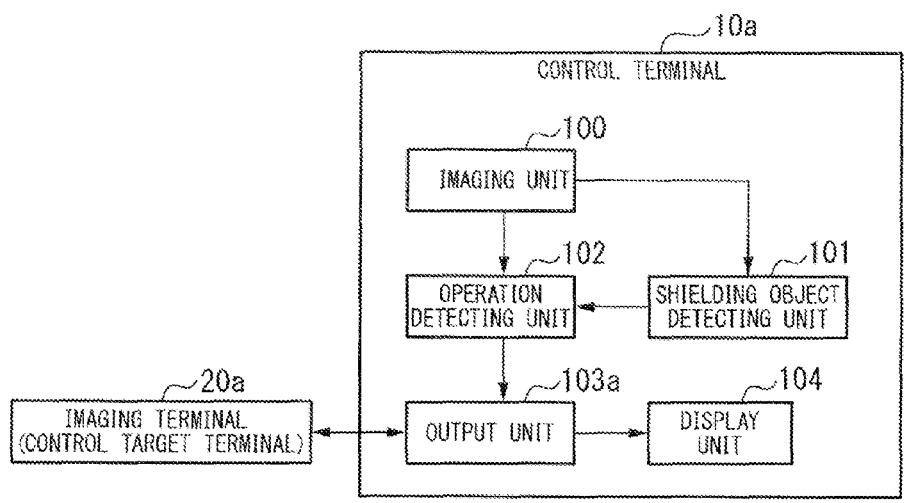
FIG. 2 is a block diagram showing a configuration of the control terminal according to the embodiment of the present invention.

FIG. 2 shows a configuration of a specific control terminal 10a of the control terminal 10. As showed in FIG. 2, the control terminal 10a includes an imaging unit 100, a shielding object detecting unit 101, an operation detecting unit 102, a communication unit 103a, and a display unit 104.

In FIG. 2, elements referenced by the same reference numerals as in FIG. 1 are the same as showed in FIG. 1. Accordingly, description of the imaging unit 100, the shielding object detecting unit 101, and the operation detecting unit 102 will not be repeated. The communication unit 103a is a specific example of the output unit 103 showed in FIG. 1. The communication unit 103a wirelessly communicates with the imaging terminal 20a. Accordingly, the communication unit 103a wirelessly transmits a control signal to the imaging terminal 20a. The communication unit 103a wirelessly receives an image which is wirelessly transmitted from the imaging terminal 20a. The display unit 104 displays information (for example, a warning) indicating whether or not detection by the operation detecting unit 102 is valid. The imaging terminal 20a is an example of the control target terminal 20.

Figure 3:
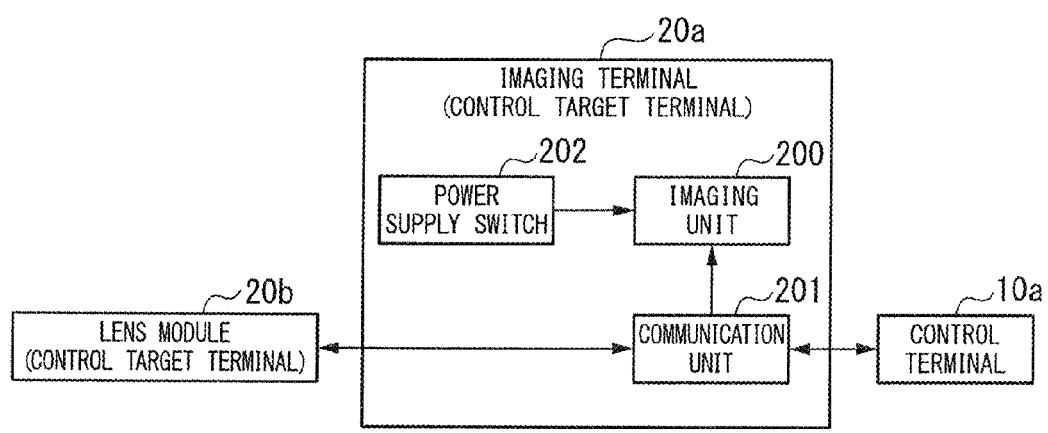
FIG. 3 is a block diagram showing a configuration of the control terminal according to the embodiment of the present invention.

FIG. 3 shows the configuration of the imaging terminal 20a. As showed in FIG. 3, the imaging terminal 20a includes an imaging unit 200 (second imaging unit) and a communication unit 201 (input unit). The imaging terminal 20a includes a power supply switch 202.

The imaging unit 200 captures an image in response to a control signal and forms an image (third image). The communication unit 201 wirelessly communicates with the control terminal 10a. Accordingly, the communication unit 201 inputs the control signal to the control terminal 10a. The control signal input through the communication unit 201 is output to the imaging unit 200. The communication unit 201 communicates with a lens module 20b. Accordingly, the communication unit 201 outputs the control signal from the control terminal 10a to the lens module 20b. The communication unit 201 may wirelessly transmit the image formed by the imaging unit 200 to the control terminal 10a. The power supply switch 202 receives an operation of turning on the power supply of the imaging terminal 20a. When the operation of turning on the power supply of the imaging terminal 20a is received, the power supply of the imaging terminal 20a is turned on and the imaging unit 200 is started.

Figure 4:
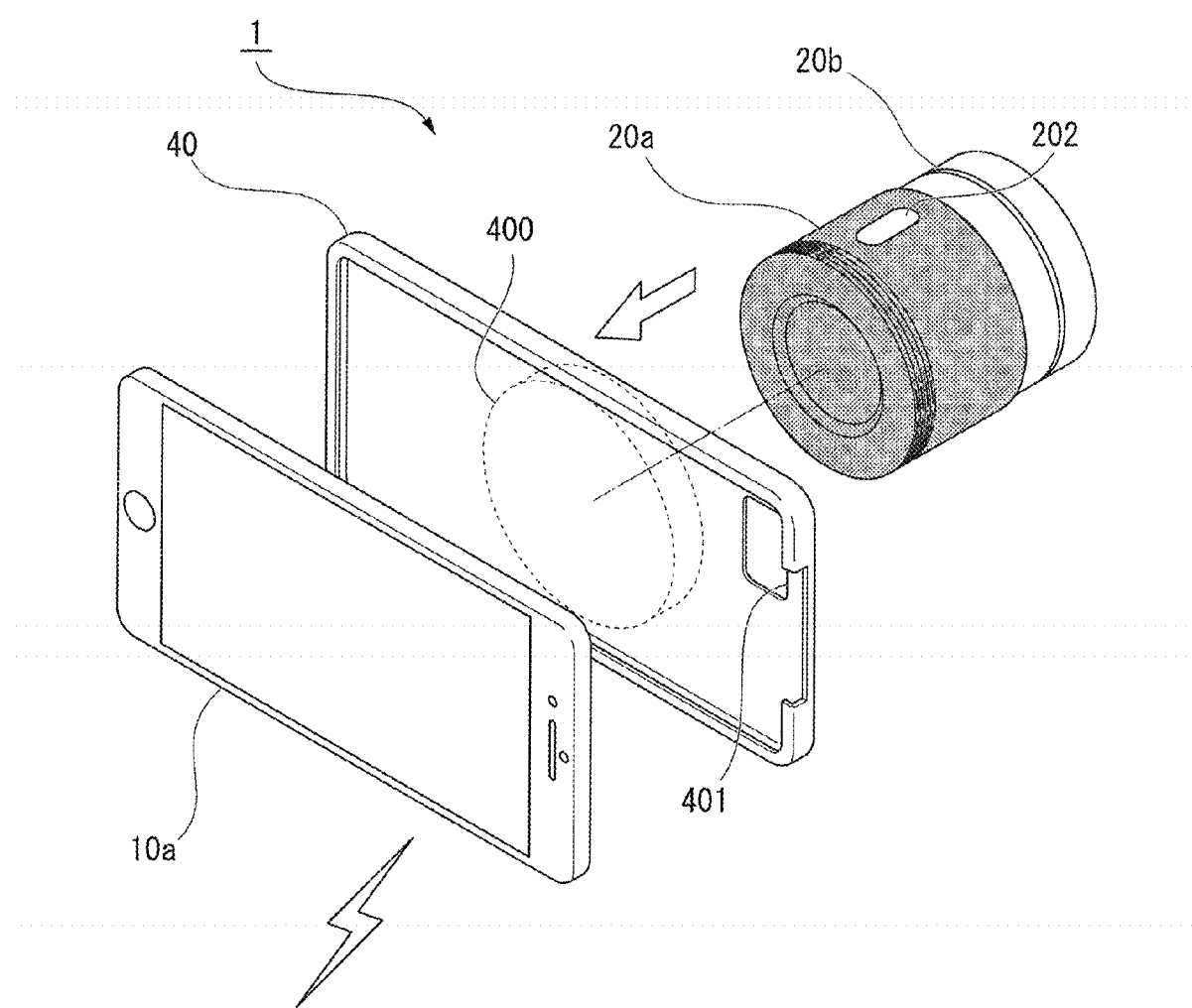
FIG. 4 is a perspective view showing an imaging system according to the embodiment of the present invention.
Figure 5:
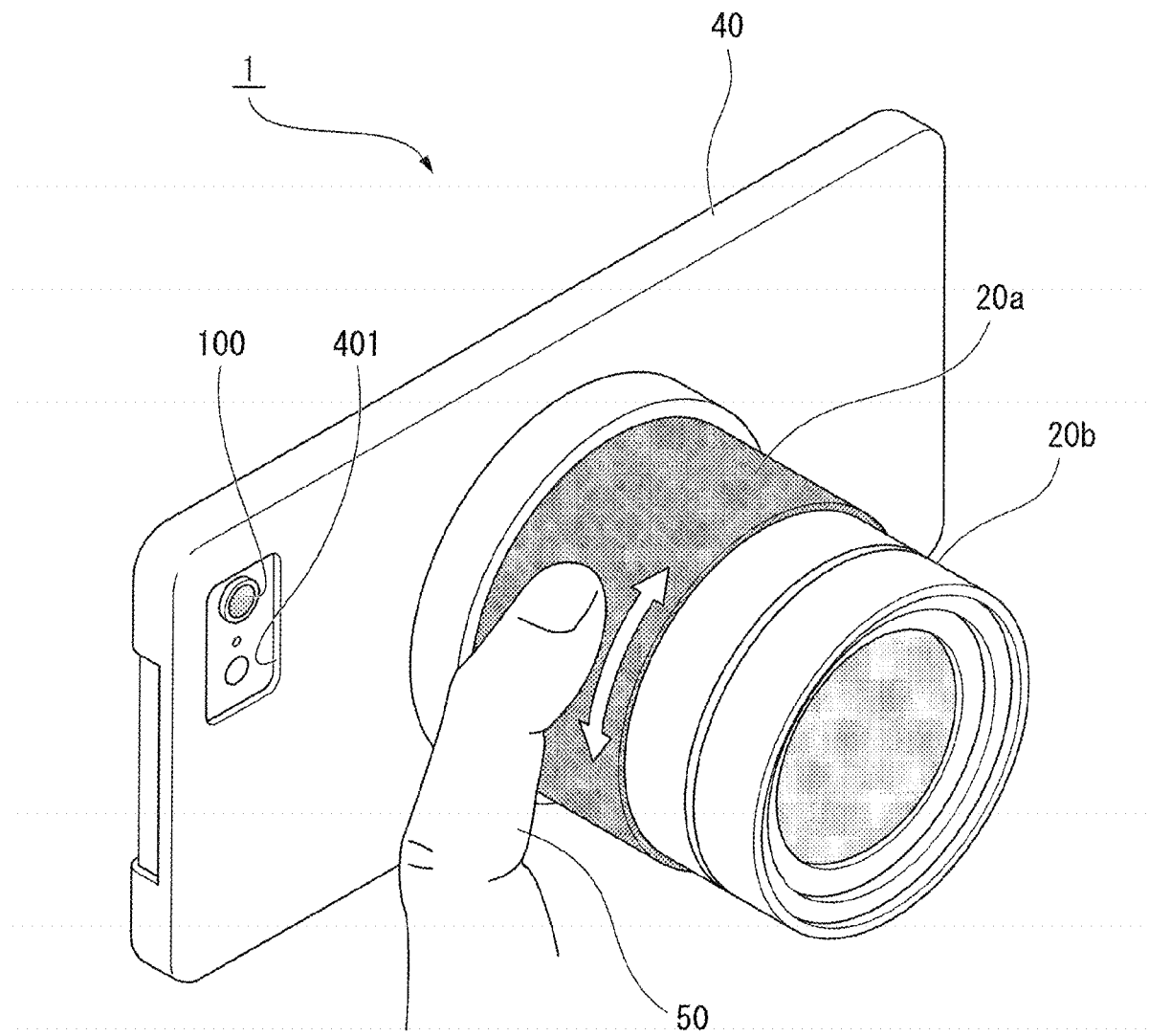
FIG. 5 is a perspective view showing the imaging system according to the embodiment of the present invention.

FIGS. 4 and 5 illustrate an imaging system 1 including the control terminal 10a and the imaging terminal 20a. As showed in FIGS. 4 and 5, the imaging system 1 includes the control terminal 10a, the imaging terminal 20a, the lens module 20b, and a case 40.

The lens module 20b includes a lens, that is, a focus lens or a zoom lens. The lens module 20b is attached to the imaging terminal 20a. The lens module 20b can be detached from the imaging terminal 20a. The power supply switch 202 is disposed on the surface of the imaging terminal 20a. In the embodiment of the present invention, the imaging terminal 20a and the lens module 20b are separated from each other. However, the imaging terminal 20a and the lens module 20b may be integrated as one body.

The case 40 can be attached to the control terminal 10a. The case 40 includes an attachment unit 400 to which the imaging terminal 20a is attached. The imaging terminal 20a is attached to the attachment unit 400 and is thus fixed to the case 40. When the case 40 is attached to the control terminal 0a, the imaging terminal 20a is fixed to the control terminal 10a. In the case 40, a window 401 is formed at a position corresponding to the position of the imaging unit 100 of the control terminal 10a.

The imaging unit 100 is disposed at a position close to an end of the surface of the control terminal 10a. The imaging unit 100 receives light in a shooting area through the window 401. The imaging unit 100 is disposed such that at least part of at least one of the imaging terminal 20a and the lens module 20b is included in the shooting area of the imaging unit 100.

A user can operate the imaging terminal 20a by moving a finger 50 in the shooting area of the imaging unit 100. For example, the user can operate the imaging terminal 20a by moving the finger 50 in the vicinity of the imaging terminal 20a.

Figure 6:
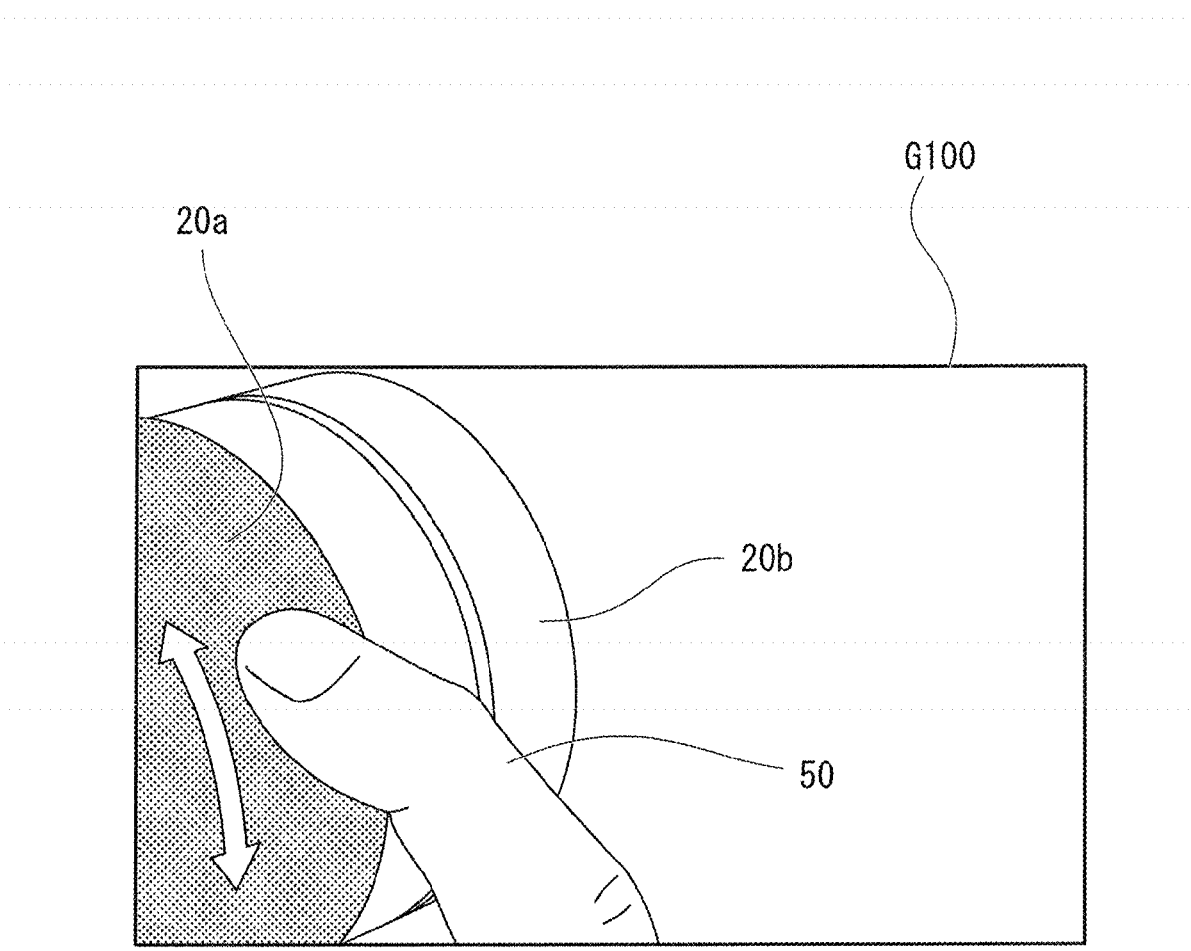
FIG. 6 is a reference diagram showing an image which is formed by an imaging unit of the control terminal according to the embodiment of the present invention.

FIG. 6 shows an image G100 formed by the imaging unit 100. Images of the imaging terminal 20a, the lens module 20b, and the finger 50 are included in the image G100. The imaging terminal 20a and the lens module 20b shield the shooting area of the imaging unit 100. The shielding object detecting unit 101 detects the imaging terminal 20a as a shielding object. The user moves the finger 50 along the surface of the imaging terminal 20a. The operation detecting unit 102 detects the motion of the finger. The output unit 103 outputs a control signal based on the motion of the finger 50 to the imaging terminal 20a.

The lens module 20b may be detected as a shielding object. The user may operate the lens module 20b by moving the finger 50 in the vicinity of the lens module 20b. The operation detecting unit 102 may detect the state of the finger 50. For example, the state of the finger 50 is the position of the finger 50. In this embodiment of the present invention, it is assumed that the shielding object is the imaging terminal 20a and the control signal is generated based on the motion of the user's finger.

Figure 7:
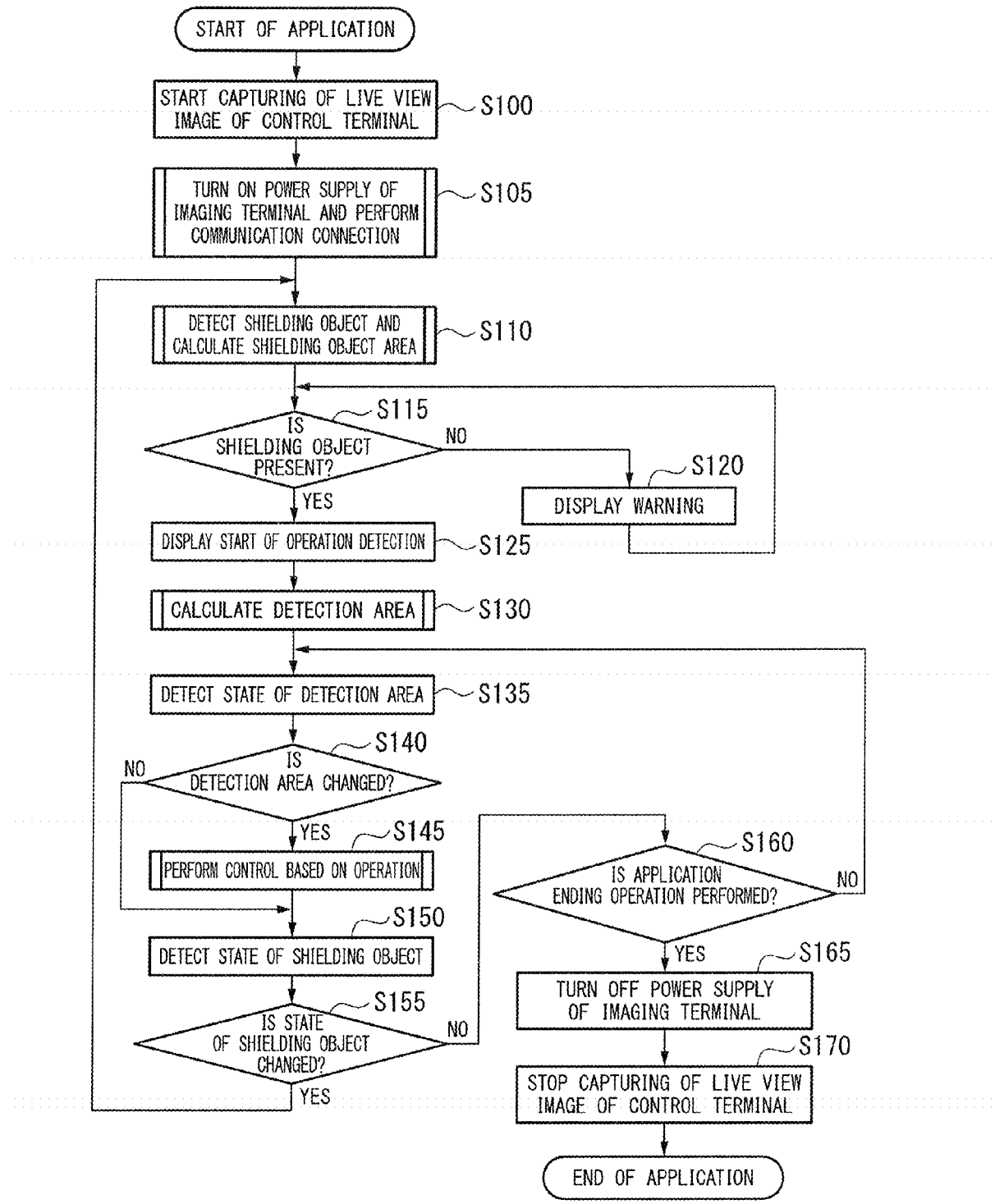
FIG. 7 is a flowchart showing an operation flow of a control terminal according to the embodiment of the present invention.

FIG. 7 shows an operation flow of the control terminal 10a. The operation of the control terminal 10a will be described below with reference to FIG. 7.

By starting an application of the control terminal 10a, the control of the imaging terminal 20a is started. The imaging unit 100 starts capturing of a live view image (step S100). Accordingly, the imaging unit 100 captures an image of the shooting area and forms an image. A live view image is an image which is continuously formed. The imaging is performed in parallel with the operation showed in FIG. 7. The formed image is used by the shielding object detecting unit 101 and the operation detecting unit 102.

After the capturing of a live view image is started, the output unit 103 outputs a control signal for turning on the power supply of the imaging terminal 20a to the imaging terminal 20a and starts a communication connection to the imaging terminal 20a (step S105).

After the communication connection to the imaging terminal 20a is started, the shielding object detecting unit 101 performs a process of detecting a shielding object and calculates a shielding object area (step S110). The shielding object area is an area which is occupied by a shielding object in the image formed by the imaging unit 100.

After the process of detecting a shielding object is performed and the shielding object area is calculated, the operation detecting unit 102 determines whether or not a shielding object is present based on the result of step S110 (step S115).

When no shielding object is present, the imaging terminal 20a is not attached. In this case, the display unit 104 displays a warning (step S120). For example, the display unit 104 displays a message prompting attachment of the imaging terminal 20a. After the warning is displayed, step S115 and step S120 are repeatedly performed until the imaging terminal 20a is attached.

When a shielding object is present, the imaging terminal 20a is attached. In this case, the display unit 104 displays a start of operation detection (step S125). For example, the display unit 104 displays a message indicating that control based on the operation corresponding to the motion of the user's finger is possible.

After the start of operation detection is displayed, the operation detecting unit 102 calculates a detection area (step S130). The detection area is an area for detecting the motion of the user's finger in the image formed by the imaging unit 100.

After the detection area is calculated, the operation detecting unit 102 detects the state of the detection area (step S135). For example, in step S135, the operation detecting unit 102 calculates a change of the detection area in multiple images formed for a predetermined period of time, that is, a change of the image.

After the state of the detection area is detected, the operation detecting unit 102 determines whether or not the detection area is changed based on the result of step S135 (step S140). For example, when the change of the detection area is equal to or greater than a predetermined amount, it is determined that the detection area is changed. When the change of the detection area is less than the predetermined amount, it is determined that the detection area is not changed.

When the detection area is changed, control based on the operation is performed (step S145). When the detection area is not changed, the operation is not performed and thus step S145 is not performed.

After the control based on the operation is performed, the shielding object detecting unit 101 detects the state of the shielding object (step S150). For example, in step S150, the operation detecting unit 102 acquires an image from the imaging unit 100 and compares the image of the shielding object area calculated in step S110 with an image when a shielding object is present.

After the state of the shielding object is detected, the operation detecting unit 102 determines whether or not the state of the shielding object is changed based on the result of step S150 (step S155). When the state of the shielding object is changed, step S110 is performed.

When the state of the shielding object is not changed, the control terminal 10a determines whether or not an application ending operation is performed (step S160). When the application ending operation is not performed, step S135 is performed.

When the application ending operation is performed, the communication unit 103a wirelessly transmits a control signal for turning off the power supply of the imaging terminal 20a to the imaging terminal 20a (step S165). The communication unit 201 of the imaging terminal 20a wirelessly receives the control signal from the control terminal 10a. The power supply of the imaging terminal 20a is turned off in response to the control signal.

After the control signal for turning off the power supply of the imaging terminal 20a is output to the imaging terminal 20a, the imaging unit 100 stops the capturing of the live view image (step S170). After the capturing of the live view image is stopped, the application is ended.

Figure 8:
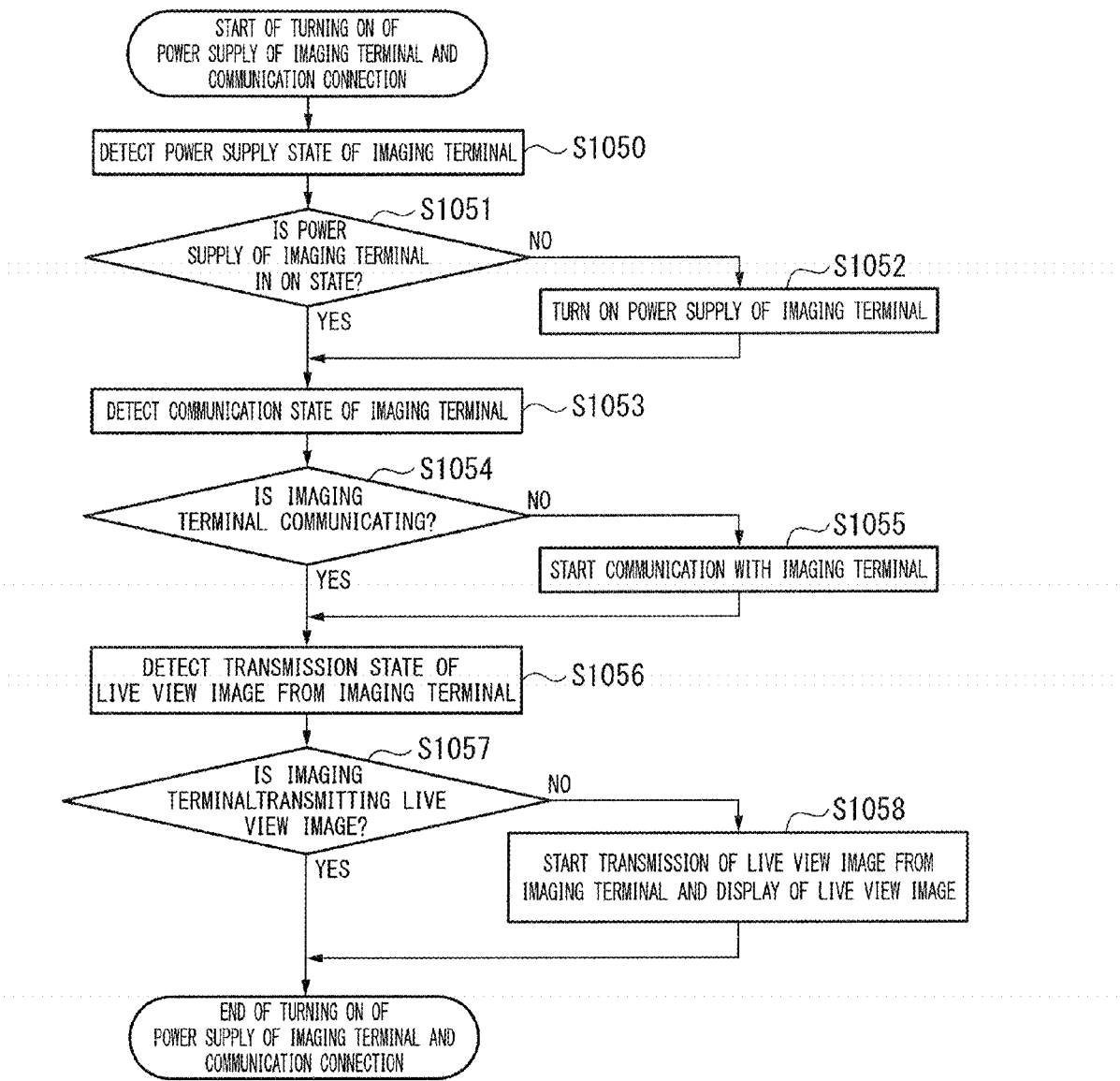
FIG. 8 is a flowchart showing an operation flow of the control terminal according to the embodiment of the present invention.

FIG. 8 shows an operation flow of the control terminal 10a in step S105. The operation of the control terminal 10a in step S105 will be described below with reference to FIG. 8.

The control terminal 10a detects the power supply state of the imaging terminal 20a (step S1050). The control terminal 10a determines whether or not the power supply of the imaging terminal 20a is turned on based on the result of step S1050 (step S1051). When the power supply of the imaging terminal 20a is turned off, the communication unit 103a wirelessly transmits a control signal for turning on the power supply of the imaging terminal 20a to the imaging terminal 20a (step S1052). The communication unit 201 of the imaging terminal 20a wirelessly receives the control signal from the control terminal 10a. The power supply of the imaging terminal 20a is turned on in response to the control signal. When the power supply of the imaging terminal 20a is turned on, step S1052 is not performed.

After the power supply of the imaging terminal 20a is turned on, the control terminal 10a detects the communication state of the imaging terminal 20a (step S1053). The control terminal 10a determines whether or not the imaging terminal 20a is in communication based on the result of step S1053 (step S1054). The communication which is determined in step S1054 is transmission of data (such as an image) other than the control signal. When the imaging terminal 20a stops the communication, the communication unit 103a starts communication with the imaging terminal 20a (step S1055). When the imaging terminal 20a is in communication, step S1055 is not performed.

After the communication with the imaging terminal 20a is started, the control terminal 10a detects a transmission state of a live view image from the imaging terminal 20a (step S1056). The control terminal 10a determines whether or not the imaging terminal 20a is transmitting a live view image based on the result of step S1056 (step S1057). When the imaging terminal 20a stops transmission of a live view image, the communication unit 103a starts transmission of a live view image and the display unit 104 starts display of a live view image (step S1058).

In step S1058, the following process is performed. The communication unit 103a wirelessly transmits a control signal for starting the transmission of a live view image to the imaging terminal 20a. The communication unit 201 of the imaging terminal 20a wirelessly receives the control signal from the control terminal 10a. The communication unit 201 starts the transmission of a live view image in response to the control signal. That is, the communication unit 201 wirelessly transmits an image formed by the imaging unit 200 to the control terminal 10a. The communication unit 103a of the control terminal 10a starts the transmission of a live view image. That is, the communication unit 103a wirelessly receives an image from the imaging terminal 20a. The display unit 104 displays the image received by the communication unit 103a. When the imaging terminal 20a is transmitting a live view image, step S1058 is not performed.

By starting the transmission of the live view image and the display of the live view image, step S105 is ended.

Figure 9:
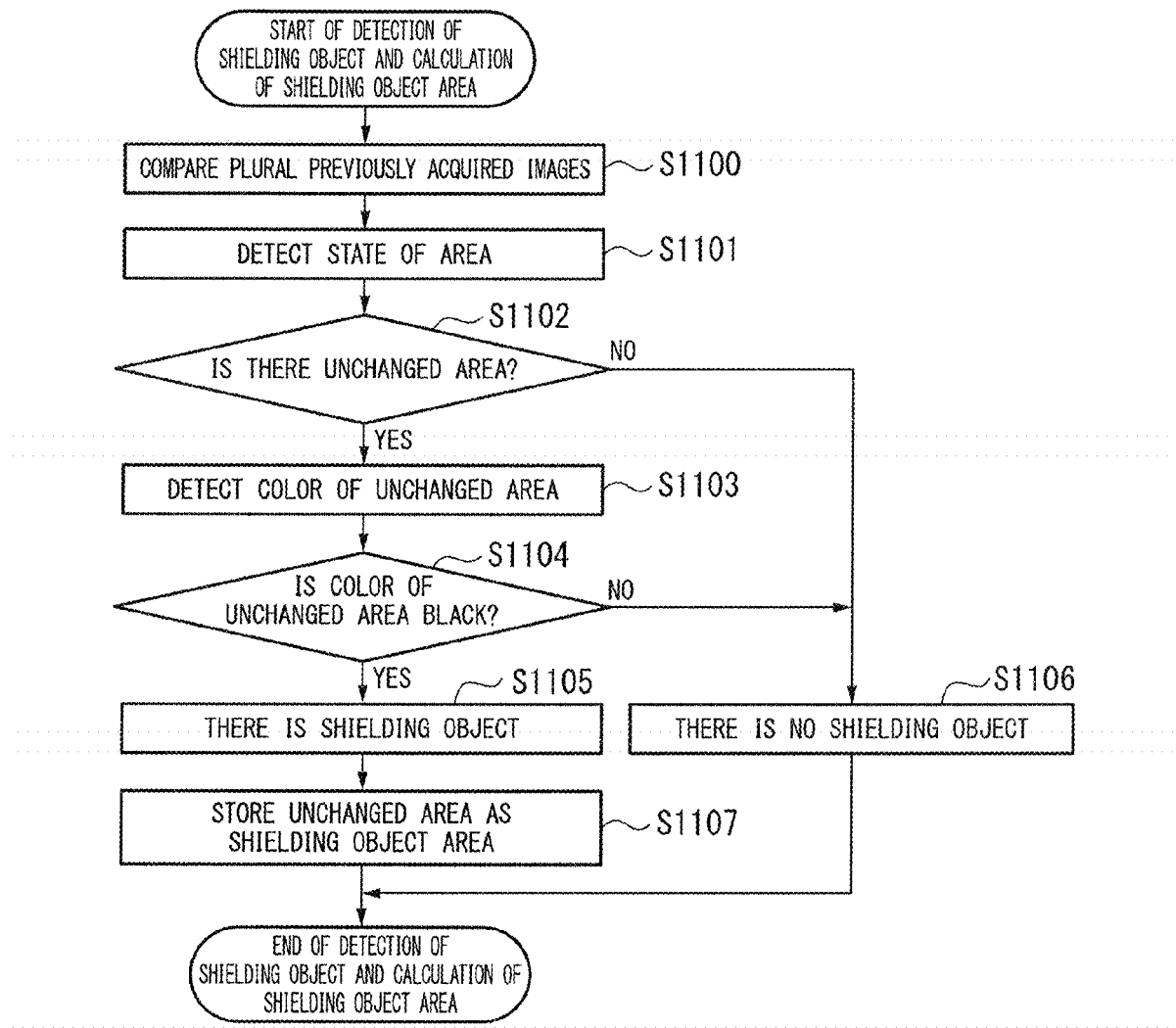
FIG. 9 is a flowchart showing an operation flow of the control terminal according to the embodiment of the present invention.

FIG. 9 shows an operation flow of the control terminal 10a in step S110. The operation of the control terminal 10a in step S110 will be described below with reference to FIG. 9.

The shielding object detecting unit 101 compares multiple images previously acquired from the imaging unit 100 (step S1100). The images which are compared in step S1100 include a newest image and are plural images which are continuously formed by the imaging unit 100. For example, in step S1100, the shielding object detecting unit 101 compares five images.

After the images are compared, the shielding object detecting unit 101 detects states of areas in the images based on the result of step S1100 (step S1101). The shielding object detecting unit 101 determines whether or not an unchanged area is present based on the result of step S1101 (step S1102). The unchanged area is the same area which is detected from all of the images, that is, an area in which there is no change.

When an unchanged area is not present, the shielding object detecting unit 101 determines that there is no shielding object (step S1106). When an unchanged area is present, the shielding object detecting unit 101 detects the color of the unchanged area based on the image of the unchanged area (step S1103).

After the color of the unchanged area is detected, the shielding object detecting unit 101 determines whether or not the color of the unchanged area is black based on the result of step S1103 (step S1104). Step S1104 is a process of detecting the imaging terminal 20a which is a shielding object. In this example, the color of the imaging terminal 20a is black. The color of the imaging terminal 20a may be a color other than black. In step S1104, the shielding object detecting unit 101 may determine whether or not the color of at least part of the unchanged area is black. When the color of the unchanged area is not black, the shielding object detecting unit 101 determines that there is no shielding object (step S1106).

When the color of the unchanged area is black, the shielding object detecting unit 101 determines that a shielding object is present (step S1105). The shielding object detecting unit 101 stores the unchanged area as a shielding object area (step S1107). In step S1107, the position of the unchanged area in the image is stored.

By performing step S1106 or step S1107, step S110 is ended.

Figure 10:
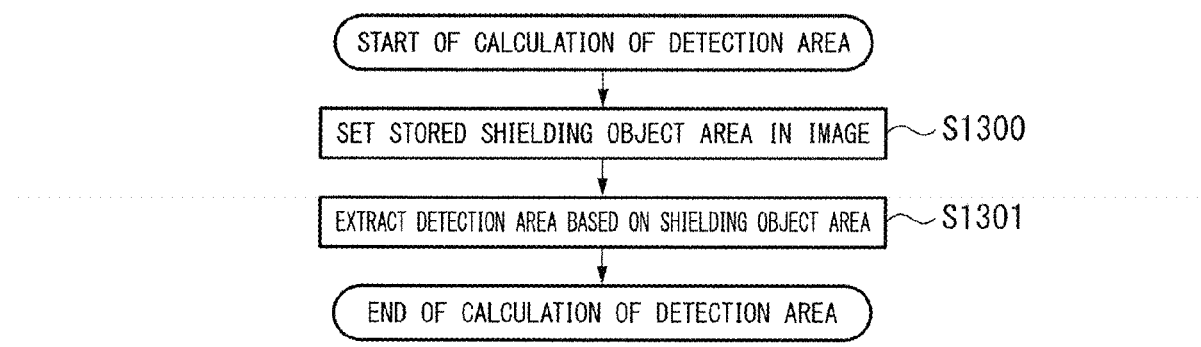
FIG. 10 is a flowchart showing an operation flow of the control terminal according to the embodiment of the present invention.

FIG. 10 shows an operation flow of the control terminal 10a in step S130. The operation of the control terminal 10a in step S130 will be described below with reference to FIG. 10.

The shielding object detecting unit 101 sets the shielding object area stored in step S1107 in the image (step S1300). The image used in step S1300 can be any one of the images used in step S1100.

After the shielding object area is set in the image, the shielding object detecting unit 101 extracts a detection area based on the shielding object area in the image (step S1301). Accordingly, shielding object detecting unit 101 detects an area based on the shielding object.

By performing step S1301, step S130 is ended.

FIGS. 11 to 16 illustrate images formed by the imaging unit 100. A shielding object area and a detection area will be described below with reference to FIGS. 11 to 16.

Figure 11:
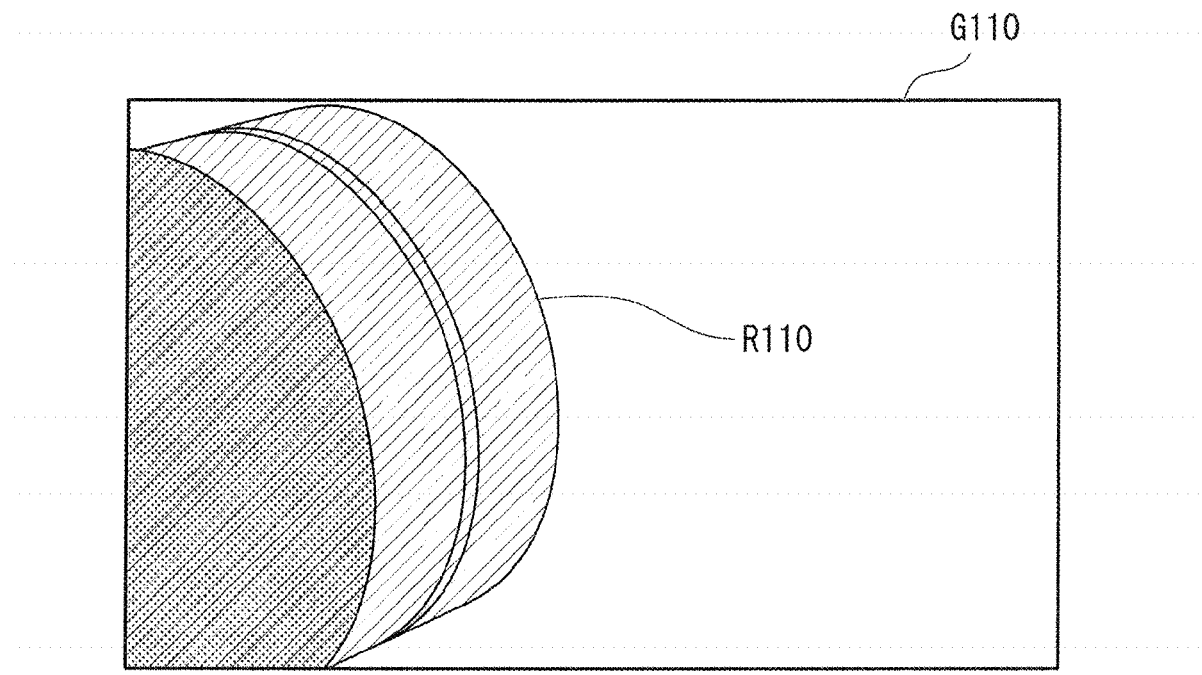
FIG. 11 is a reference diagram showing a shielding object area in the embodiment of the present invention.
Figure 12:
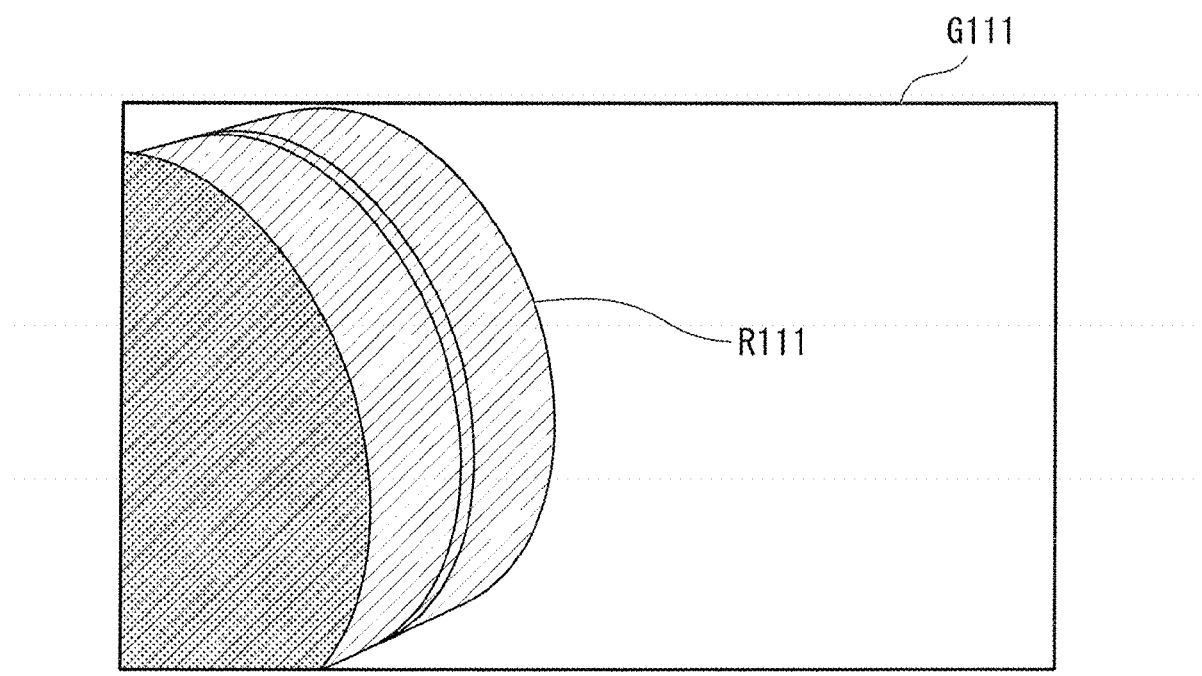
FIG. 12 is a reference diagram showing a detection area in the embodiment of the present invention.

FIGS. 11 and 12 illustrate a first example of a shielding object area and a detection area. In an image G110 showed in FIG. 11, a shielding object area R110 including images of the imaging terminal 20a and the lens module 20b is detected. In an image G111 showed in FIG. 12, a detection area R111 which is located at the same position as the shielding object area R110 is calculated.

Figure 13:
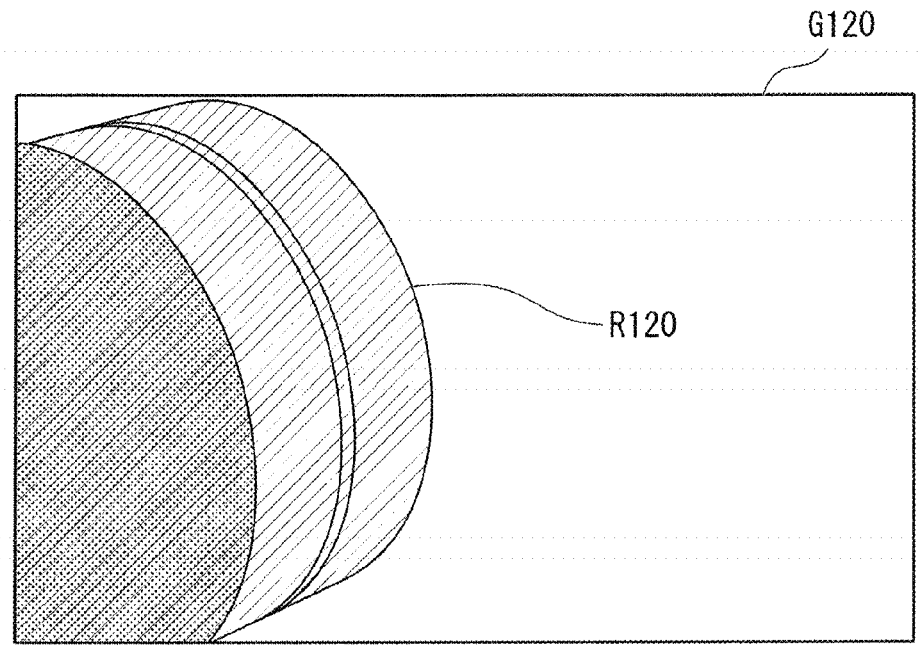
FIG. 13 is a reference diagram showing a shielding object area in the embodiment of the present invention.
Figure 14:
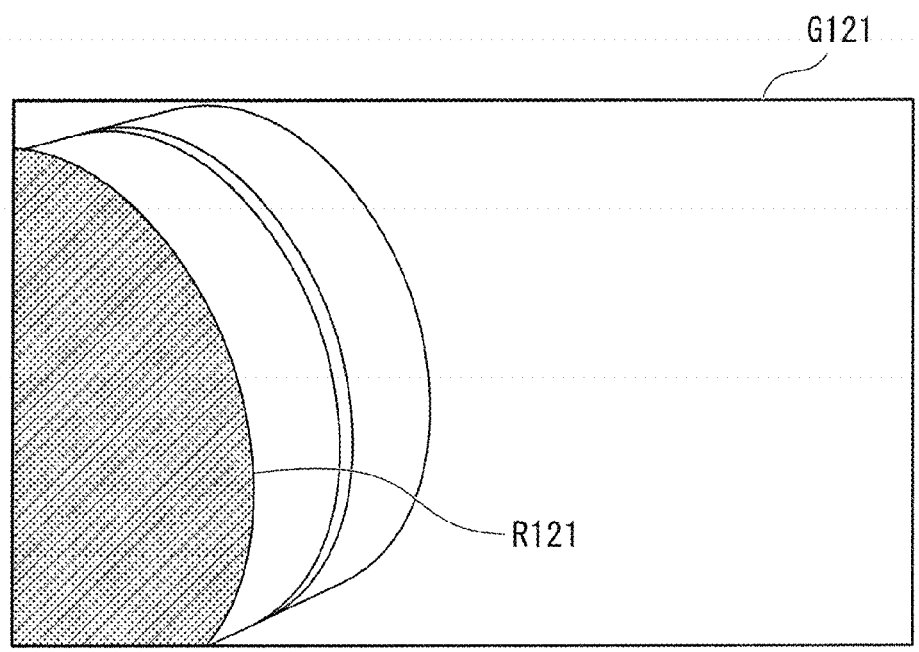
FIG. 14 is a reference diagram showing a detection area in the embodiment of the present invention.

FIGS. 13 and 14 illustrate a second example of a shielding object area and a detection area. In an image G120 showed in FIG. 13, a shielding object area R120 including images of the imaging terminal 20a and the lens module 20b is detected. In an image G121 showed in FIG. 14, a detection area R121 including the image of the imaging terminal 20a is calculated from the shielding object area R120. For example, the detection area R121 is an area of a predetermined color. The detection area R121 may be a designated area of the image. Since the detection area R121 is smaller than the detection area R111 showed in FIG. 12, an image processing load in step S135 is reduced. The same detection area R121 can be set regardless of a difference in shape depending on the type of the lens module 20b.

Figure 15:
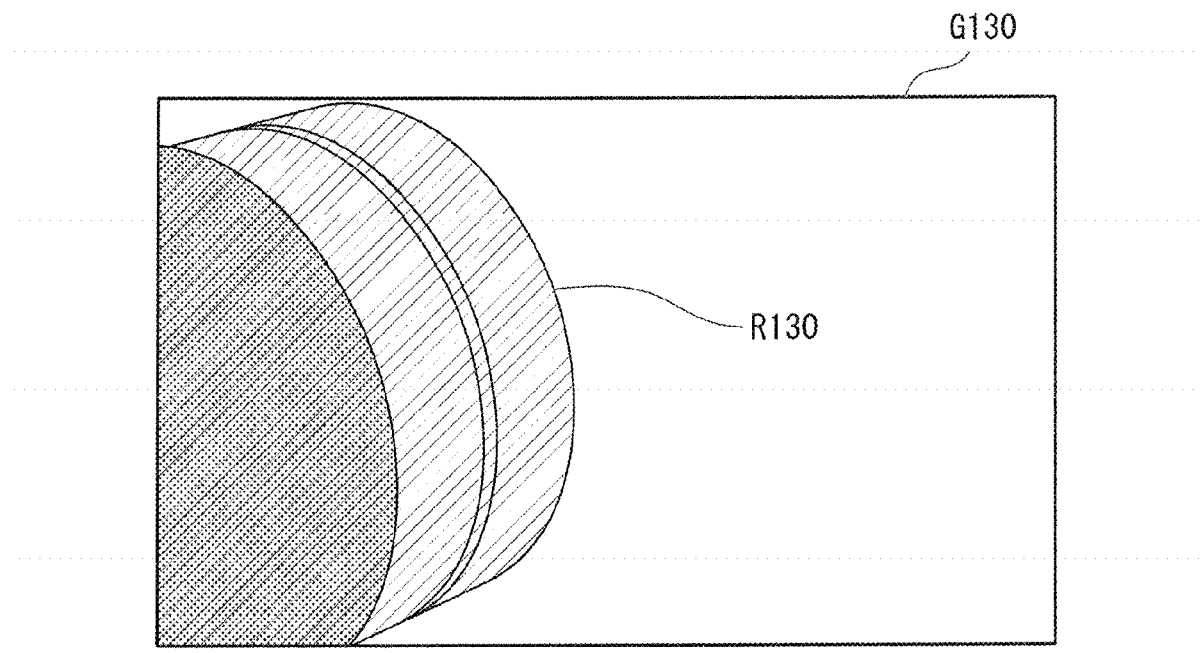
FIG. 15 is a reference diagram showing a shielding object area in the embodiment of the present invention.
Figure 16:
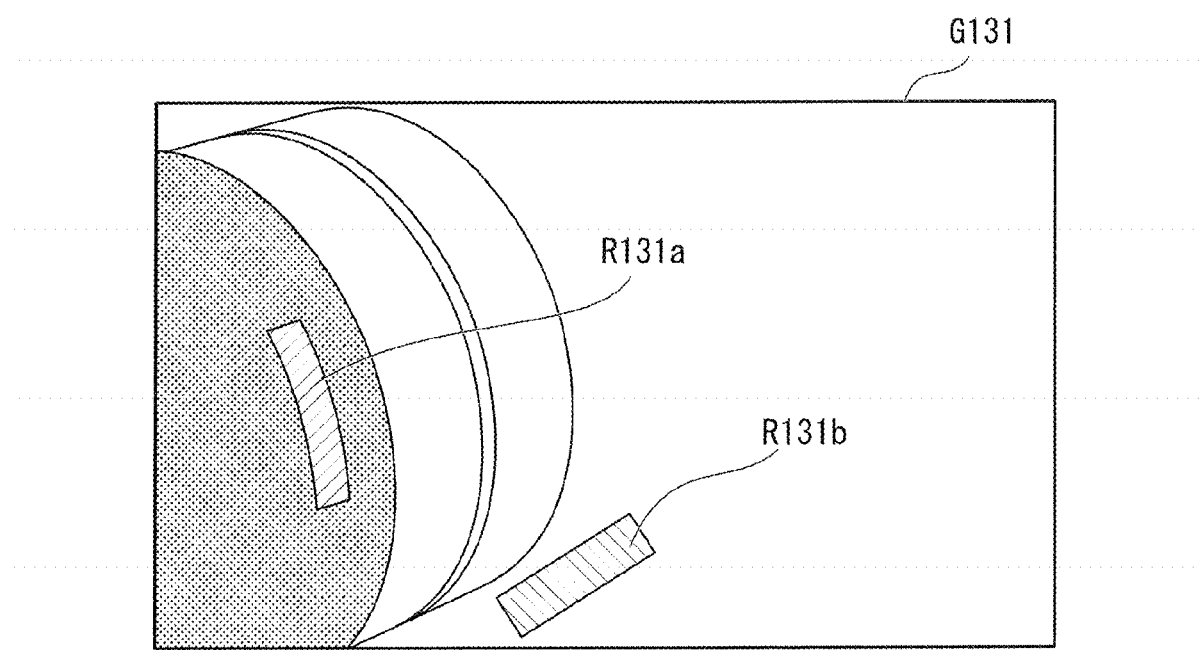
FIG. 16 is a reference diagram showing a detection area in the embodiment of the present invention.

FIGS. 15 and 16 illustrate a third example of a shielding object area and a detection area. In an image G130 showed in FIG. 15, a shielding object area R130 including images of the imaging terminal 20a and the lens module 20b is detected. In an image G131 showed in FIG. 16, a detection area R131a including a partial image of the imaging terminal 20a is calculated from the shielding object area R130. In the image G131 showed in FIG. 16, a detection area R131b in the vicinity of the shielding object area R130 including the image of the lens module 20b is calculated. Since the detection area R131a and the detection area R131b are smaller than the detection area R111 showed in FIG. 12, an image processing load in step S135 is reduced.

When the shielding object detecting unit 101 is provided as a switch, the shielding object area is a designated area of the image. In this case, the shielding object detecting unit 101 stores information of the shielding object area in advance.

Figure 17:
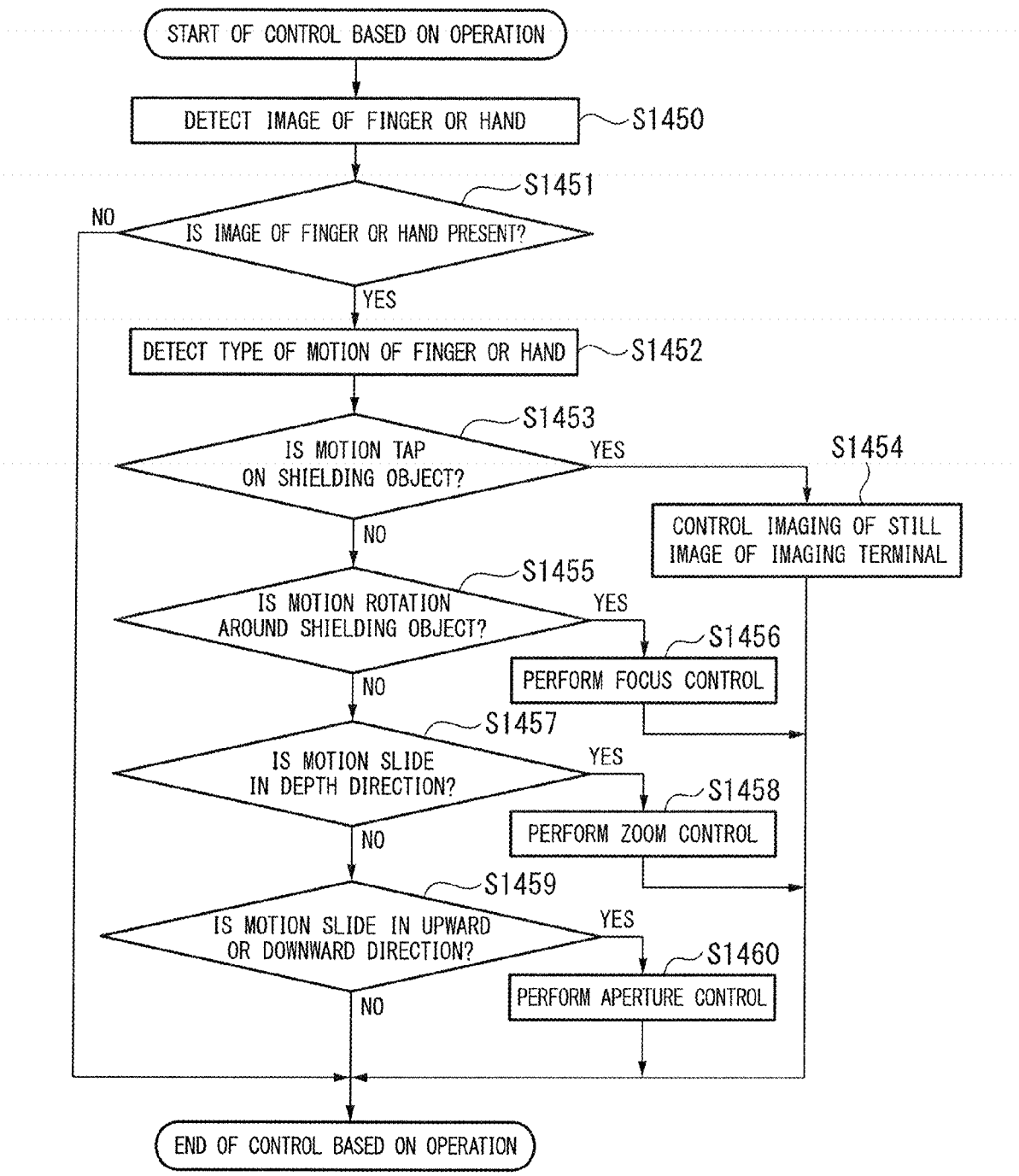
FIG. 17 is a flowchart showing an operation flow of the control terminal according to the embodiment of the present invention.

FIG. 17 shows an operation flow of the control terminal 10a in step S145. The operation of the control terminal 10a in step S145 will be described below with reference to FIG. 17.

The operation detecting unit 102 performs a process of detecting an image of a user's finger or hand based on the image of the detection area (step S1450). The image used in step S1450 is an image used in step S135. For example, in step S1450, the operation detecting unit 102 detects an image of the user's finger or hand by detecting a flesh-colored area. Alternatively, in step S1450, the operation detecting unit 102 detects an image of the user's finger or hand by detecting a shape corresponding to a registered shape of the image of the user's finger or hand.

The operation detecting unit 102 determines whether or not the image of the user's finger or hand is present in the image of the detection area based on the result of step S1450 (step S1451). When the image of the user's finger or hand is not present in the image of the detection area, step S145 is ended. When the image of the user's finger or hand is present in the image of the detection area, the operation detecting unit 102 detects the type of the motion of the user's finger or hand based on the image of the detection area (step S1452). In step S1452, the plurality of images used in step S135 are used.

After the type of the motion of the user's finger or hand is detected, the operation detecting unit 102 determines whether or not the detected motion is a tap on the shielding object based on the result of step S1452 (step S1453). When the detected motion is a tap on the shielding object, the communication unit 103a wirelessly transmits a control signal for controlling the capturing of a still image in the imaging terminal 20a to the imaging terminal 20a (step S1454). The communication unit 201 of the imaging terminal 20a wirelessly receives the control signal from the control terminal 10a. The imaging unit 200 performs the capturing of a still image in response to the control signal. By performing step S1454, step S145 is ended.

When the detected motion is not a tap on the shielding object, the operation detecting unit 102 determines whether or not the detected motion is rotation around the shielding object (step S1455). When the detected motion is rotation around the shielding object, the communication unit 103a wirelessly transmits a control signal for controlling focus of a lens to the imaging terminal 20a (step S1456). The communication unit 201 of the imaging terminal 20a wirelessly receives the control signal from the control terminal 10a. The communication unit 201 transmits the received control signal to the lens module 20b. The lens module 20b adjusts the focus in response to the control signal. By performing step S1456, step S145 is ended.

When the detected motion is not rotation around the shielding object, the operation detecting unit 102 determines whether or not the detected motion is a slide in the depth direction (step S1457). When the detected motion is a slide in the depth direction, the communication unit 103a wirelessly transmits a control signal for controlling zoom of a lens to the imaging terminal 20a (step S1458). The communication unit 201 of the imaging terminal 20a wirelessly receives the control signal from the control terminal 10a. The communication unit 201 transmits the received control signal to the lens module 20b. The lens module 20b adjusts the zoom in response to the control signal. By performing step S1458, step S145 is ended.

When the detected motion is not a slide in the depth direction, the operation detecting unit 102 determines whether or not the detected motion is a slide in the upward or downward direction (step S1459). When the detected motion is a slide in the upward or downward direction, the communication unit 103a wirelessly transmits a control signal for controlling an aperture of a lens to the imaging terminal 20a (step S1460). The communication unit 201 of the imaging terminal 20a wirelessly receives the control signal from the control terminal 10a. The communication unit 201 transmits the received control signal to the lens module 20b. The lens module 20b adjusts the aperture in response to the control signal. By performing step S1460, step S145 is ended. When the detected motion is not a slide in the upward or downward direction, step S145 is ended.

Figure 18:
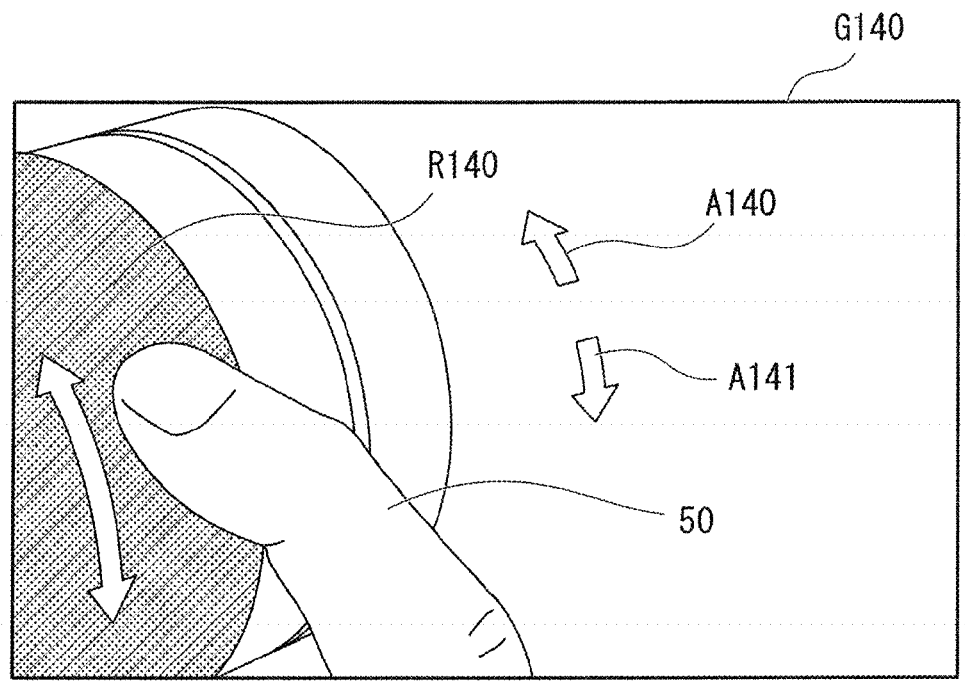
FIG. 18 is a reference diagram showing a motion of a user's finger or hand which is detected in the embodiment of the present invention.
Figure 19:
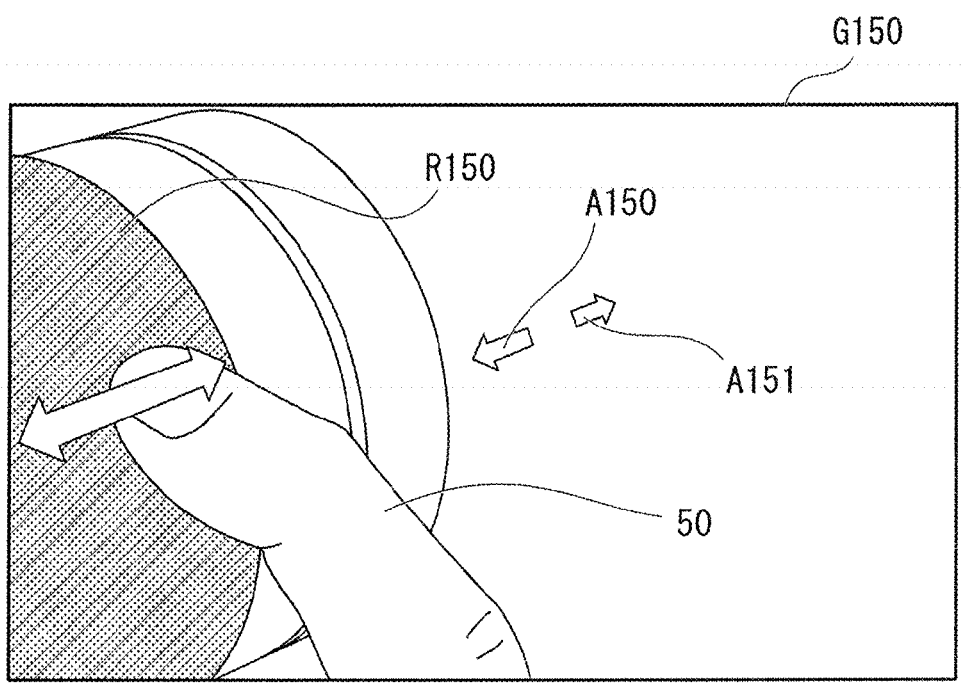
FIG. 19 is a reference diagram showing a motion of a user's finger or hand which is detected in the embodiment of the present invention.
Figure 20:
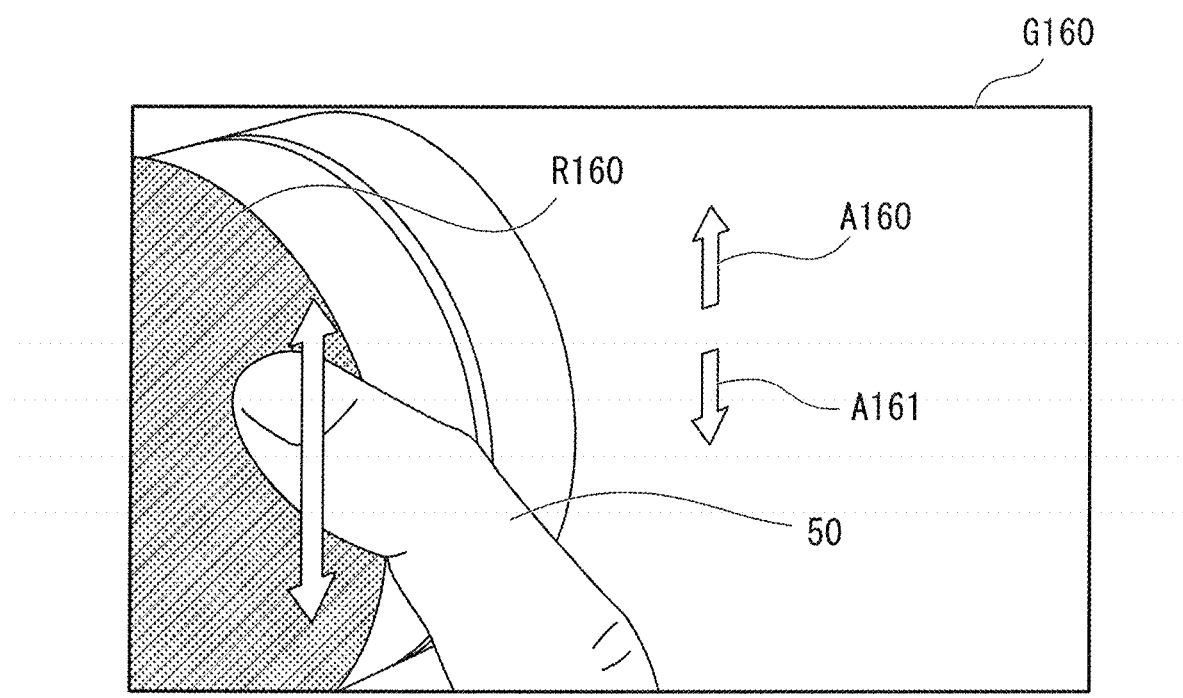
FIG. 20 is a reference diagram showing a motion of a user's finger or hand which is detected in the embodiment of the present invention.

FIGS. 18 to 20 illustrate images formed by the imaging unit 100. The motion of the user's finger or hand detected in step S1452 will be described below with reference to FIGS. 18 to 20.

FIG. 18 shows an example of a motion corresponding to focus control. In a detection area R140 of an image G140 showed in FIG. 18, the motion of the user's finger 50 is detected. Specifically, a motion of a curved shape of the finger 50 along a curve constituting an outline of the detection area R140 is detected. For example, when the finger 50 moves in the direction of arrow A140, the focus is changed to a value on a short-distance side. When the finger 50 moves in the direction of arrow A141, the focus is changed to a value on a long-distance side. The control value of the focus is changed depending on the distance by which the finger 50 moves.

FIG. 19 shows an example of a motion corresponding to zoom (focal length) control. In a detection area R150 of an image G150 showed in FIG. 19, the motion of the user's finger 50 is detected. Specifically, a motion of the finger 50 in an inward direction of a curve constituting an outline of the detection area R150 or in an outward direction of the curve is detected. For example, when the finger 50 moves in the direction of arrow A150, the zoom (focal length) is changed to a value on a wide-angle side. When the finger 50 moves in the direction of arrow A151, the zoom (focal length) is changed to a value on a telephoto side. The control value of the zoom (focal length) is changed depending on the distance by which the finger 50 moves.

FIG. 20 shows an example of a motion corresponding to aperture control. In a detection area R160 of an image G160 showed in FIG. 20, the motion of the user's finger 50 is detected. Specifically, a motion of the finger 50 in an upward or downward direction in the detection area R160 is detected. For example, when the finger 50 moves in the direction of arrow A160, that is, in the upward direction, the aperture is changed to a value on an open side. When the finger 50 moves in the direction of arrow A161, that is, in the downward direction, the aperture is changed to a value on a narrow side. The control value of the aperture is changed depending on the distance by which the finger 50 moves.

A shutter speed of the imaging unit 200 of the imaging terminal 20a is controlled depending on the motion of the user's finger or hand. The control of the shutter speed may be performed in the same way as the aperture control. For example, when a single finger is detected, the aperture may be controlled depending on the motion of the finger in the upward or downward direction. When two fingers are detected, the shutter speed may be controlled depending on the motion of the finger in the upward or downward direction.

A line or the like indicating a specific area may be marked in advance on the surface of the imaging terminal 20a. Alternatively, an area having a different color from its surroundings may be present on the surface of the imaging terminal 20a. It may be detected whether or not the user's finger or hand crosses the line or the area. In this case, by using the line or the color of the area marked in advance on the imaging terminal 20a as an index, the user can easily see the area in which an operation is performed with the finger or hand. False detection is also reduced.

According to the embodiment of the present invention, the control terminal 10 or 10a including the imaging unit 100, the shielding object detecting unit 101, the operation detecting unit 102, and the output unit 103 is constituted.

According to the embodiment of the present invention, an imaging system 1 including the control terminal 10a and the imaging terminal 20a is constituted. The control terminal 10a includes the imaging unit 100 (first imaging unit), the shielding object detecting unit 101, the operation detecting unit 102, and the output unit 103. The imaging terminal 20a includes the imaging unit 200 (second imaging unit) and the communication unit 201 (input unit).

According to the embodiment of the present invention, a control method including an imaging step (step S100), a shielding object detecting step (step S110), an operation detecting step (step S1452), and an output step (steps S1454, S1456, S1458, and S1460) is constituted. In the imaging step, an image of the shooting area is captured and a first image is formed by the imaging unit 100. In the shielding object detecting step, a shielding object fixed to the control terminal 10 or 10a is detected. The shielding object shields part of the shooting area. In the operation detecting step, after the shielding object is detected, a predetermined state of an object other than the shielding object or a predetermined motion of the object is detected based on a second image. The second image is an image of at least an area based on the shielding object in the first image. In the output step, when the predetermined state of the object or the predetermined motion of the object is detected, a control signal is output to a control target terminal 20.

According to the embodiment of the present invention, a program causing a computer to perform the imaging step (step S100), the shielding object detecting step (step S110), the operation detecting step (step S1452), and the output step (steps S1454, S1456, S1458, and S1460) is constituted.

In the embodiment of the present invention, since no means for projecting an image is necessary, it is possible to simplify the configuration for detecting an operation.

The area in which the predetermined state of the object or the predetermined motion of the object is detected is a surface area of the shielding object or an area in the vicinity of the shielding object. Accordingly, the user can easily see the area in which an operation is performed with the finger or hand. Since the detection area is restricted, the operation can be accurately detected and the error detection is reduced.

First Modified Example

In a first modified example of the embodiment of the present invention, the imaging unit 100 of the control terminal 10a can set focus or exposure. While the shielding object detecting unit 101 detects a shielding object, the focus or exposure set in the imaging unit 100 is fixed.

In other words, when a shielding object is present in the shooting area of the imaging unit 100, the focus or exposure set in the imaging unit 100 is fixed. That is, when the shielding object detecting unit 101 detects a shielding object (when a shielding object is present in the shooting area of the imaging unit 100), the focus or exposure set in the imaging unit 100 is fixed. Thereafter, the focus or exposure set in the imaging unit 100 is changed only when the shielding object is not detected.

In other words, while the operation detecting unit 102 performs an operation of detecting the predetermined state of the object or the predetermined motion of the object after the shielding object is detected, the focus or exposure set in the imaging unit 100 is fixed.

When a black shielding object occupies most of the shooting area, the exposure is likely to be set depending on the shielding object. When a shielding object located at a short distance occupies most of the shooting area, the focus point is likely to be set on the shielding object. Accordingly, the focus is likely to be set depending on the shielding object. Accordingly, an image formed by the imaging unit 100 may not be suitable for detecting an operation with the user's finger or hand. In the first modified example, the focus or exposure is fixed when detecting the operation with the user's finger or hand. As a result, the operation detecting unit 102 can accurately detect the operation.

After the shielding object detecting unit 101 starts the operation of detecting the shielding object, the focus or exposure set in the imaging unit 100 is fixed until the shielding object detecting unit 101 detects a shielding object. The focus or exposure value fixed until the shielding object detecting unit 101 detects the shielding object is different from the focus or exposure value fixed after the shielding object detecting unit 101 detects the shielding object. In the first modified example, the focus or exposure is fixed when detecting the shielding object. Accordingly, the shielding object detecting unit 101 can accurately detect the shielding object.

Figure 21:
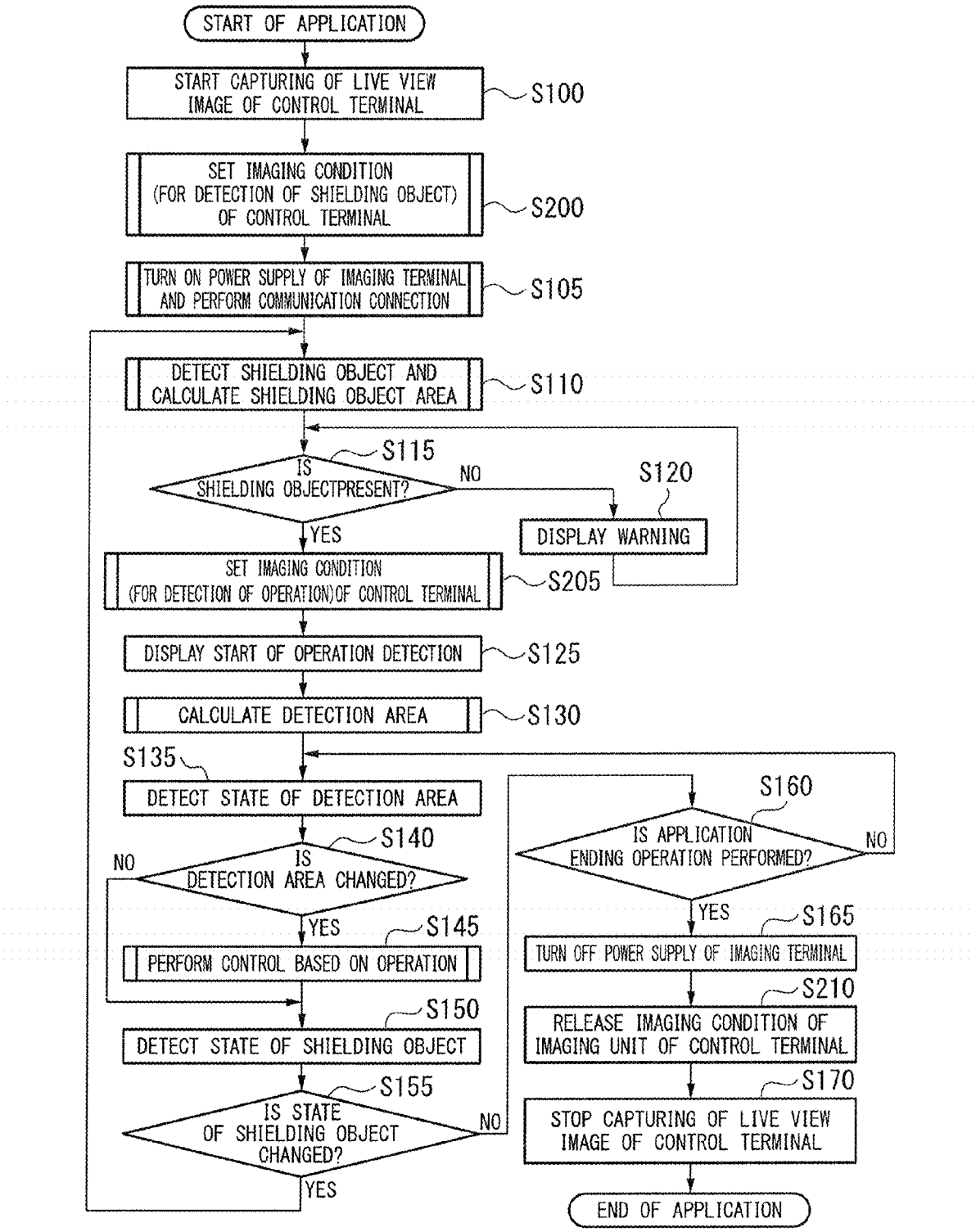
FIG. 21 is a flowchart showing an operation flow of a control terminal according to a first modified example of the embodiment of the present invention.

FIG. 21 shows an operation flow of the control terminal 10a according to the first modified example. The operation of the control terminal 10a according to the first modified example will be described below with reference to FIG. 21. A difference of the process showed in FIG. 21 from the process showed in FIG. 7 will be described.

After the capturing of a live view image is started in step S100, the control terminal 10a sets an imaging condition of the imaging unit 100 to a condition for detecting a shielding object (step S200). After the imaging condition is set, step S105 is performed.

When a shielding object is present in step S115, the control terminal 10a sets the imaging condition of the imaging unit 100 to a condition for detecting an operation (step S205). After the imaging condition is set, step S125 is performed.

After step S165 is performed, the control terminal 10a releases the imaging condition set in the imaging unit 100 in step S205 (step S210). After the imaging condition is released, step S170 is performed.

Regarding points other than those just described, the process showed in FIG. 21 is the same as the process showed in FIG. 7. In the process showed in FIG. 21, the focus or exposure is fixed until the shielding object is detected after the focus or exposure is set in step S200. When the shielding object is detected, the focus or exposure is changed in step S205.

Figure 22:
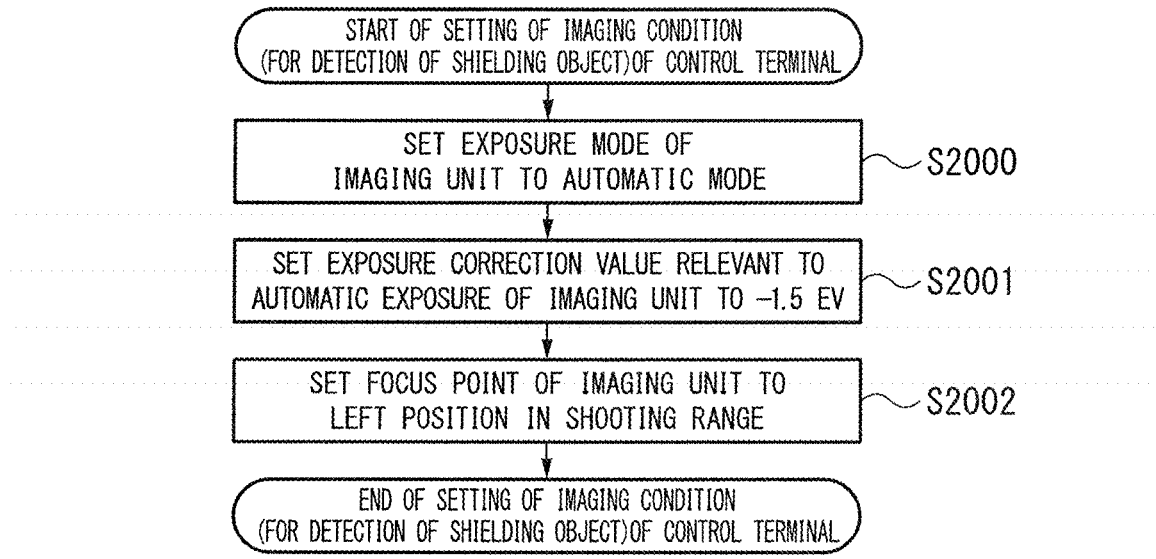
FIG. 22 is a flowchart showing an operation flow of the control terminal according to the first modified example of the embodiment of the present invention.

FIG. 22 shows a first example of an operation flow of the control terminal 10a in step S200. The first example of the operation of the control terminal 10a in step S200 will be described below with reference to FIG. 22.

The control terminal 10a sets an exposure mode of the imaging unit 100 to an automatic mode (step S2000). The control terminal 10a sets an exposure correction value for the automatic exposure of the imaging unit 100 to −1.5 EV (step S2001). The control terminal 10a sets the focus point of the imaging unit 100 to a left position in the shooting area (step S2002). By performing step S2002, step S200 is ended.

When the imaging condition is set as described above and a black shielding object occupies most of the shooting area, the exposure is less likely to depend on the shielding object. That is, overexposure is less likely. Accordingly, the shielding object detecting unit 101 can stably detect a shielding object. The focus point is set to be in focus on the shielding object which is assumed to be located on the left in the shooting area. Accordingly, the shielding object is less likely to be blurry.

Figure 23:
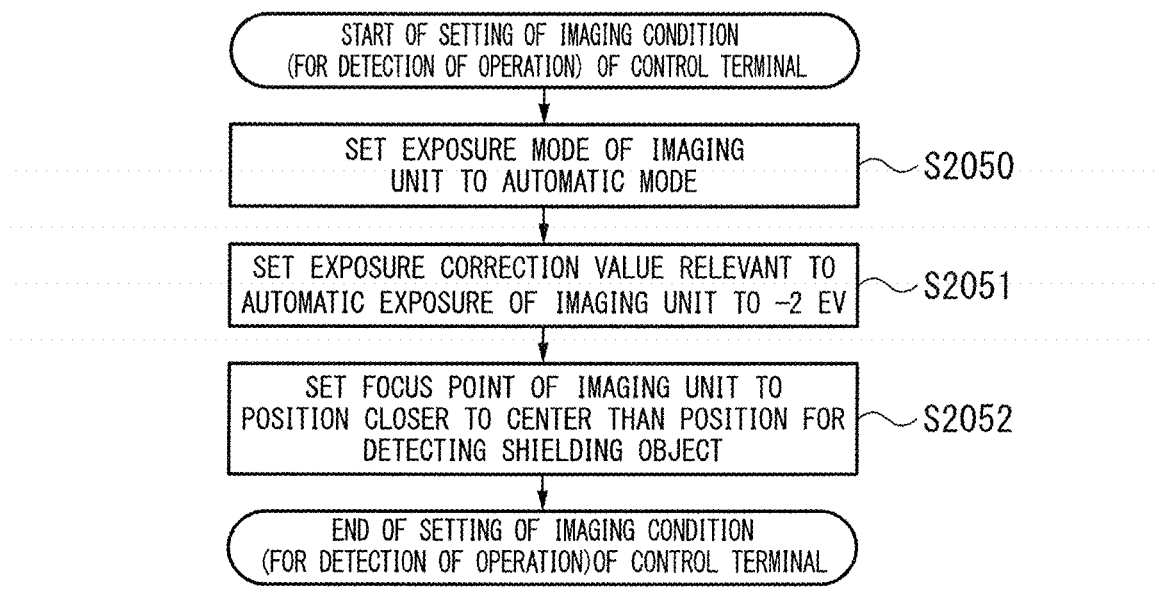
FIG. 23 is a flowchart showing an operation flow of the control terminal according to the first modified example of the embodiment of the present invention.

FIG. 23 shows a first example of an operation flow of the control terminal 10a in step S205. The first example of the operation of the control terminal 10a in step S205 will be described below with reference to FIG. 23.

The control terminal 10a sets an exposure mode of the imaging unit 100 to an automatic mode (step S2050). The control terminal 10a sets an exposure correction value for the automatic exposure of the imaging unit 100 to −2 EV (step S2051). The control terminal 10a sets the focus point of the imaging unit 100 to a position closer to the center than the position in detecting the shielding object in the shooting area (step S2052). By performing step S2052, step S205 is ended. When the imaging condition is set as described above and a black shielding object occupies most of the shooting area, the exposure is less likely to depend on the shielding object. That is, overexposure is less likely. The user's finger or hand can be easily detected. Accordingly, the operation detecting unit 102 can stably detect an operation with the user's finger or hand. The focus point is set to a position closer to the center than the position in detecting the shielding object such that the detection area is in focus. Accordingly, the area in which the operation with the user's finger or hand is performed is less likely to be blurry. In this example, the focus point is fixed to the position on the center side. However, the focus point may be set in the detection area or the like.

Step S205 may not be performed. In step S205, the imaging condition based on the shielding object, that is, the imaging terminal 20a or the lens module 20b, may be set. Accordingly, the operation detecting unit 102 can stably detect the operation depending on the color or shape of the imaging terminal 20a or the lens module 20b.

In step S2000 and step S2050, the exposure mode of the imaging unit 100 may be set to an aperture priority mode. In the aperture priority mode, the shutter speed value is set to optimize the exposure based on the aperture value designated by the user. In the aperture priority mode, even when the aperture is narrowed, a relatively in-focus image can be easily obtained. Accordingly, the shielding object detecting unit 101 can easily detect the shielding object. The operation detecting unit 102 can easily detect the operation with the user's finger or hand.

Figure 24:
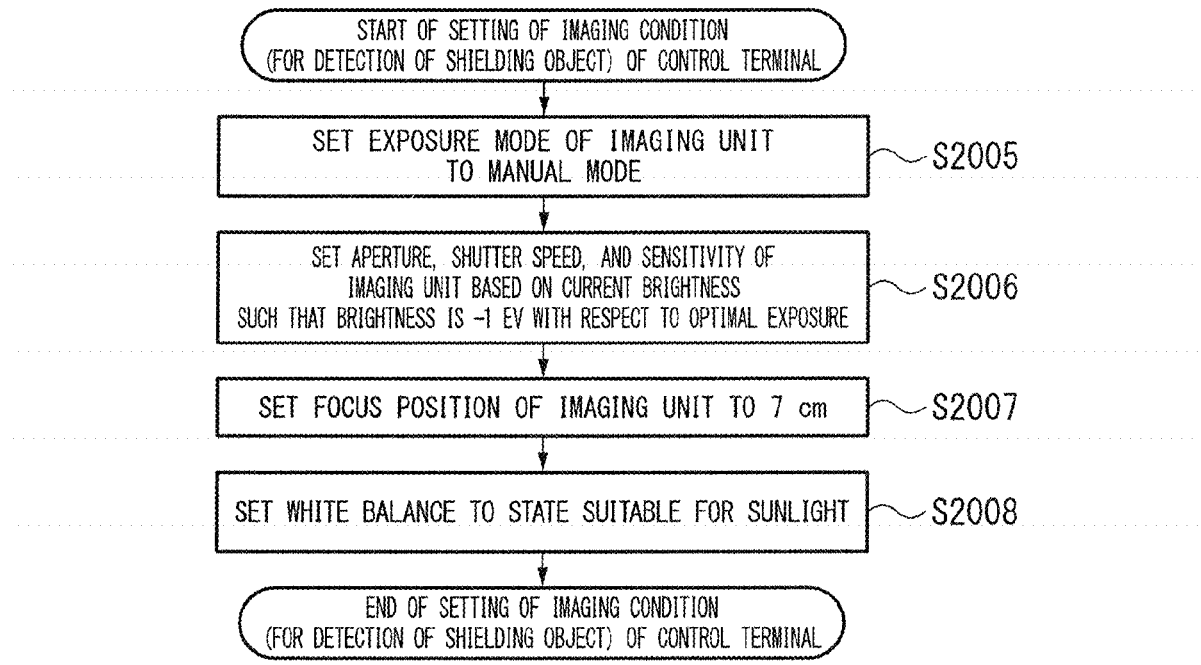
FIG. 24 is a flowchart showing an operation flow of the control terminal according to the first modified example of the embodiment of the present invention.

FIG. 24 shows a second example of an operation flow of the control terminal 10a in step S200. The operation of the control terminal 10a in step S200 will be described below with reference to FIG. 24.

The control terminal 10a sets the exposure mode of the imaging unit 100 to a manual mode (step S2005). The control terminal 10a sets the aperture, the shutter speed, and the sensitivity of the imaging unit 100 depending on current brightness such that the brightness is −1 EV with respect to optimal exposure (step S2006). The control terminal 10a sets the focus position of the imaging unit 100 to 7 cm (step S2007). The control terminal 10a sets white balance to a state suitable for sunlight (step S2008). By performing step S2008, step S200 is ended.

In step S2006, the aperture, the shutter speed, and the sensitivity of the imaging unit 100 are each set to predetermined values. For example, the aperture may be set to F8, the shutter speed may be set to 1/125 of a second, and the sensitivity may be set to ISO400. In step S2006, the brightness is set to be −1 EV with respect to the optimal exposure. The optimal exposure is set based on an AE function value of the imaging unit 100. Alternatively, when the control terminal 10a, the imaging terminal 20a, or the like includes an external illuminance sensor, the optimal exposure may be set based on the value of the external illuminance sensor. When noise is great, the detection accuracy of a shielding object is lowered and thus the sensitivity may be set to a low value in step S2006. When the shutter speed is low, the operation detection accuracy is lowered and thus the shutter speed may be set to a high value in step S2006. The condition set in step S2006 may be periodically changed while the shielding object detecting unit 101 is detecting a shielding object. For example, the condition set in step S2006 may be changed every five minutes.

Figure 25:
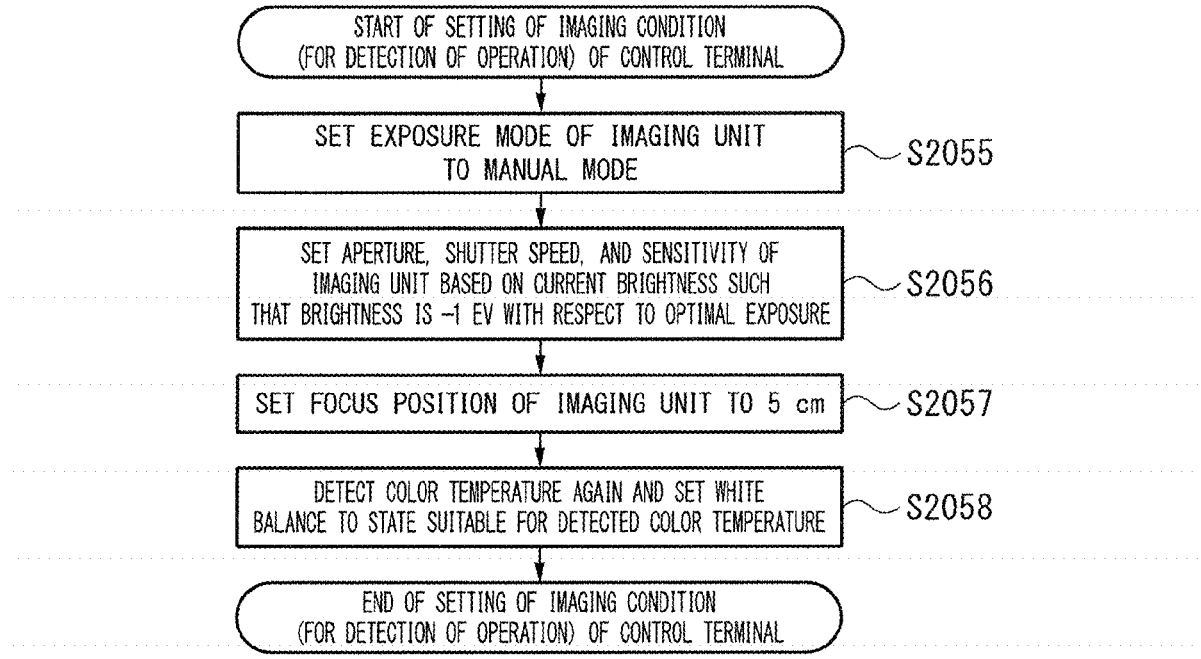
FIG. 25 is a flowchart showing an operation flow of the control terminal according to the first modified example of the embodiment of the present invention.

FIG. 25 shows a second example of an operation flow of the control terminal 10a in step S205. The second example of the operation of the control terminal 10a in step S205 will be described below with reference to FIG. 25.

The control terminal 10a sets the exposure mode of the imaging unit 100 to the manual mode (step S2055). The control terminal 10a sets the aperture, the shutter speed, and the sensitivity of the imaging unit 100 depending on current brightness such that the brightness is −1 EV with respect to optimal exposure (step S2056). The control terminal 10a sets the focus position of the imaging unit 100 to 5 cm (step S2057). The control terminal 10a detects a color temperature again and sets the white balance to a state suitable for the detected color temperature (step S2058). By performing step S2058, step S205 is ended.

In step S200 and step S205 of the second example, all the imaging conditions are fixed. Accordingly, the brightness, the focus point, the color, and the like of the image are not changed. As a result, the shielding object detecting unit 101 can stably detect a shielding object. The operation detecting unit 102 can stably detect the operation with the user's finger or hand.

Second Modified Example

In a second modified example of the embodiment of the present invention, the operation detecting unit 102 detects a predetermined state of an object or a predetermined motion of the object based on a second image after the shielding object is detected. The second image is an image of a second area included in a first area including an image of the shielding object in the first image formed by the imaging unit 100. For example, the first area is an area including images of the imaging terminal 20a and the lens module 20b. For example, the second area is an area including an image of any one of the imaging terminal 20a and the lens module 20b. The second area is smaller than the first area.

The control terminal 10 includes an input unit configured to input information from the control target terminal 20. For example, the input unit is the communication unit 103a showed in FIG. 2. The operation detecting unit 102 detects the second area based on the information input through the input unit.

For example, the control target terminal 20 is the imaging terminal 20a and the lens module 20b is connected to the imaging terminal 20a. The communication unit 103a receives information of the lens module 20b from the imaging terminal 20a. For example, the second area is an area including the image of the imaging terminal 20a. The information of the lens module 20b is information for identifying the lens module 20b.

Figure 26:
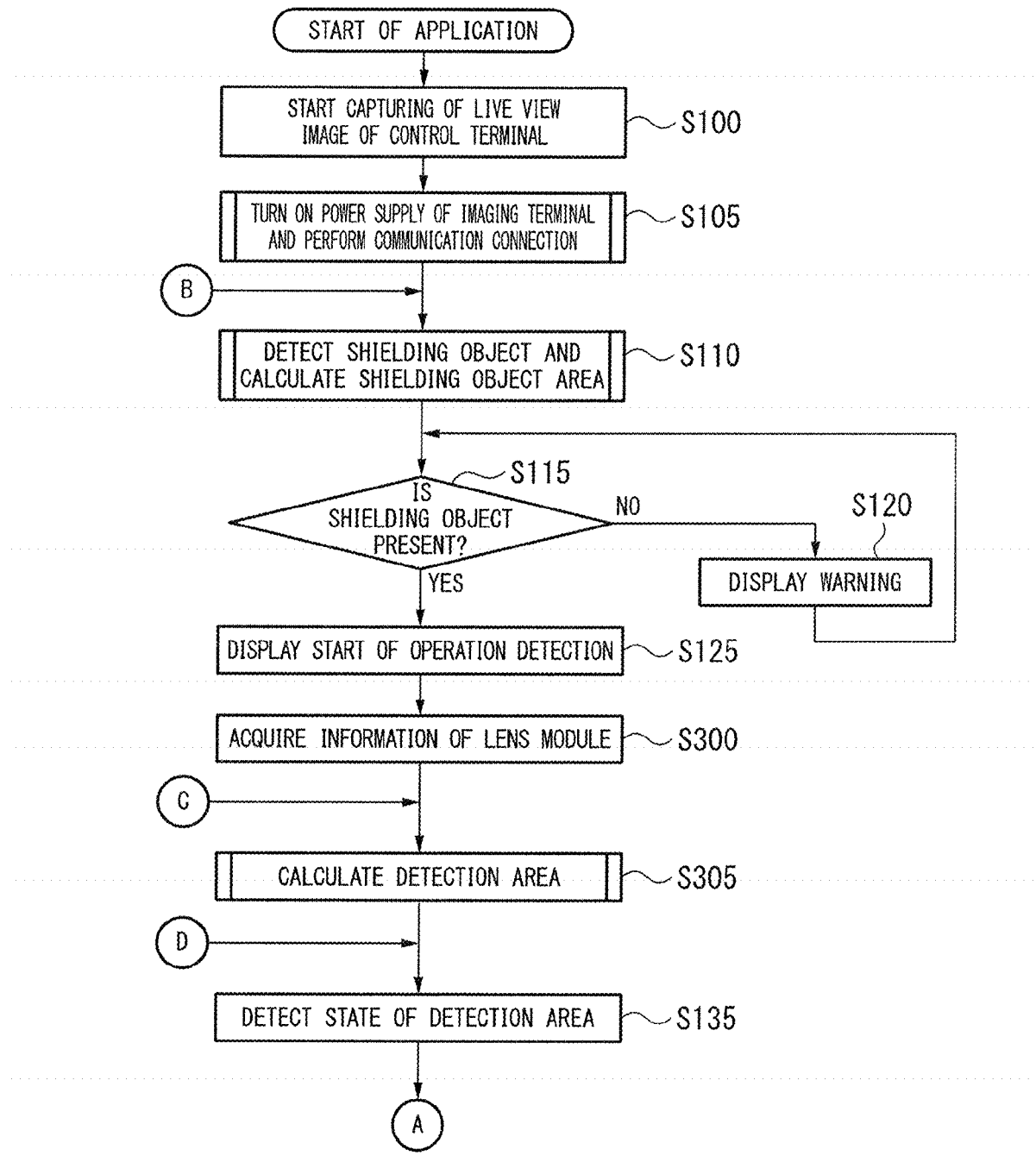
FIG. 26 is a flowchart showing an operation flow of a control terminal according to a second modified example of the embodiment of the present invention.
Figure 27:
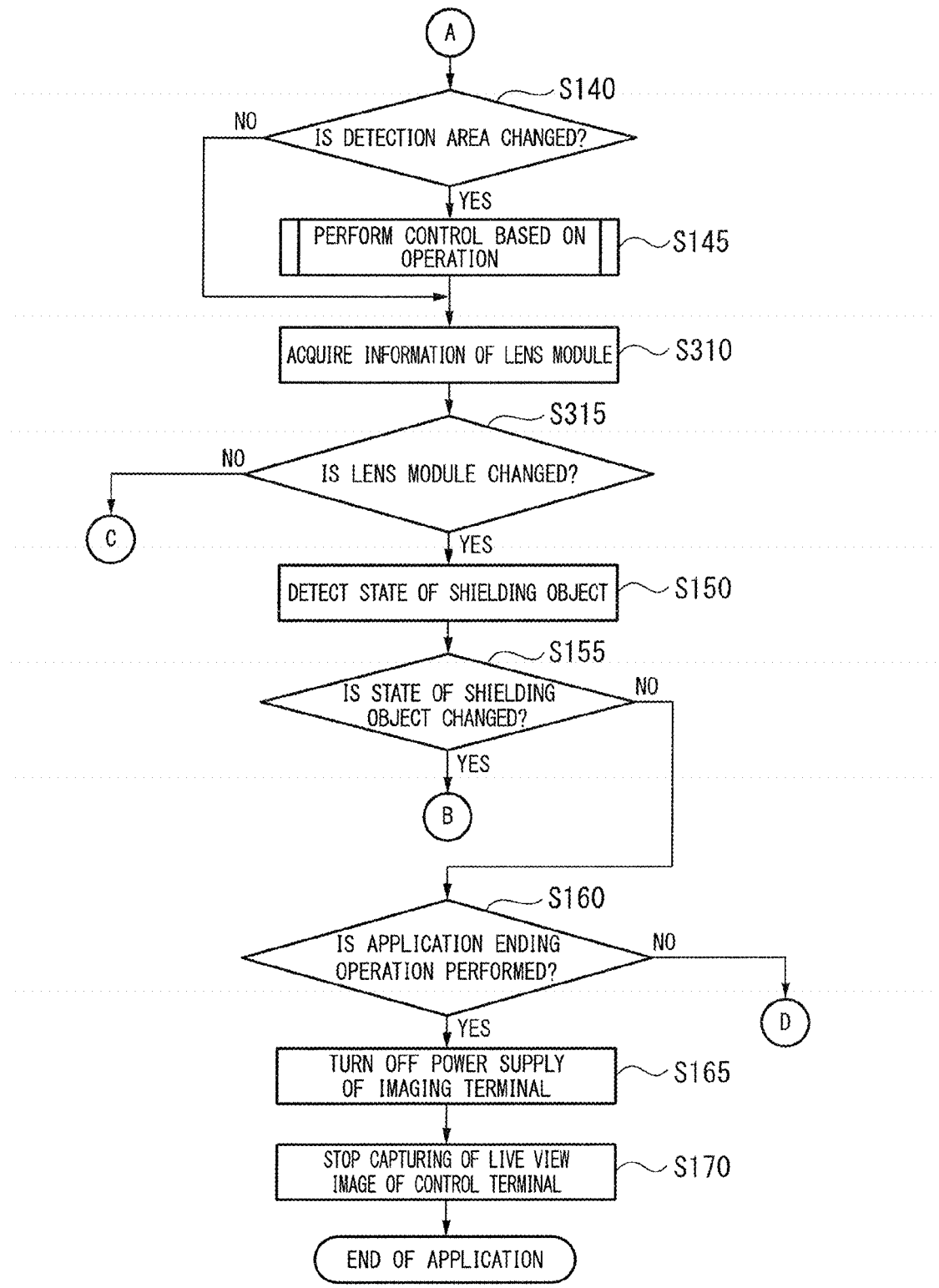
FIG. 27 is a flowchart showing an operation flow of a control terminal according to the second modified example of the embodiment of the present invention.

FIGS. 26 and 27 illustrate an operation flow of the control terminal 10a according to the second modified example. The operation of the control terminal 10a according to the second modified example will be described below with reference to FIGS. 26 and 27. A difference of the process showed in FIGS. 26 and 27 from the process showed in FIG. 7 will be described.

After step S125 is performed, the communication unit 201 of the imaging terminal 20a receives the information of the lens module 20b from the lens module 20b. The communication unit 201 wirelessly transmits the received information to the control terminal 10a. The communication unit 103a of the control terminal 10a wirelessly receives the information of the lens module 20b from the imaging terminal 20a (step S300). Accordingly, the information of the lens module 20b is acquired.

After the information of the lens module 20b is acquired, the operation detecting unit 102 calculates a detection area of the image (step S305). The detection area is an area in which the motion of the user's finger is detected. After the detection area is calculated, step S135 is performed.

After step S145 is performed, the information of the lens module 20b is acquired (step S310). In step S310, the same process as performed in step S300 is performed.

After the information of the lens module 20b is acquired, the operation detecting unit 102 determines whether or not the lens module 20b is changed based on the result of step S310 (step S315). When the lens module 20b is changed by replacing the lens module 20b attached to the imaging terminal 20a, step S150 is performed. When the lens module 20b is not changed, step S305 is performed.

In step S300 and step S310, the control terminal 10a may acquire the information of the lens module 20b based on the image formed by the imaging unit 100.

Regarding points other than those just described, the process showed in FIGS. 26 and 27 is the same as the process showed in FIG. 7.

Figure 28:
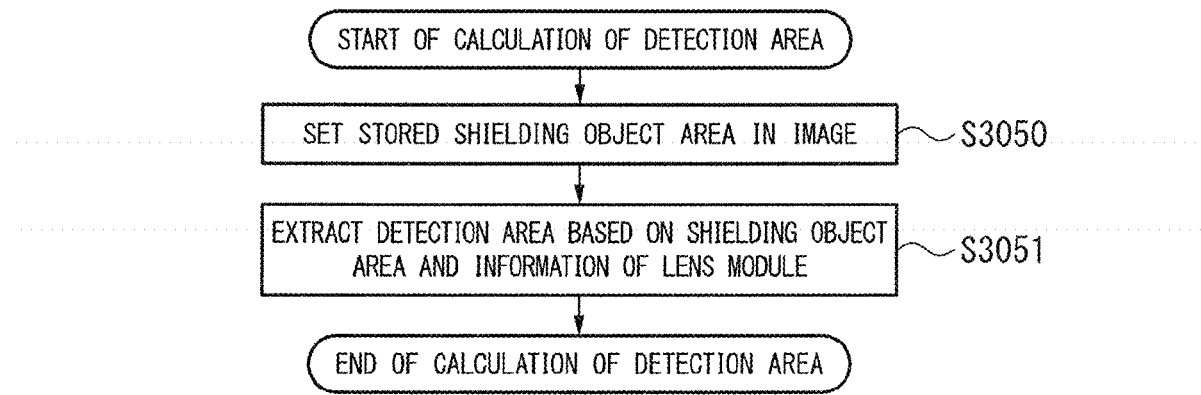
FIG. 28 is a flowchart showing an operation flow of a control terminal according to the second modified example of the embodiment of the present invention.

FIG. 28 shows an operation flow of the control terminal 10a in step S305. The operation of the control terminal 10a in step S305 will be described below with reference to FIG. 28.

The shielding object detecting unit 101 sets the shielding object area stored in step S1107 in the image (step S3050). The image used in step S3050 can be one of the images used in step S1100.

After the shielding object area is set in the image, the shielding object detecting unit 101 extracts a detection area in the image based on the shielding object area and the information of the lens module 20b (step S3051). Accordingly, the shielding object detecting unit 101 detects an area based on the shielding object. Here, the shielding object detecting unit 101 detects a first area based on the imaging terminal 20a among the shielding object and a second area based on the lens module 20b among the shielding object.

By performing step S3051, step S305 is ended.

FIGS. 29 to 34 illustrate images formed by the imaging unit 100. A shielding object area and a detection area in the second modified example will be described below with reference to FIGS. 29 to 34.

Figure 29:
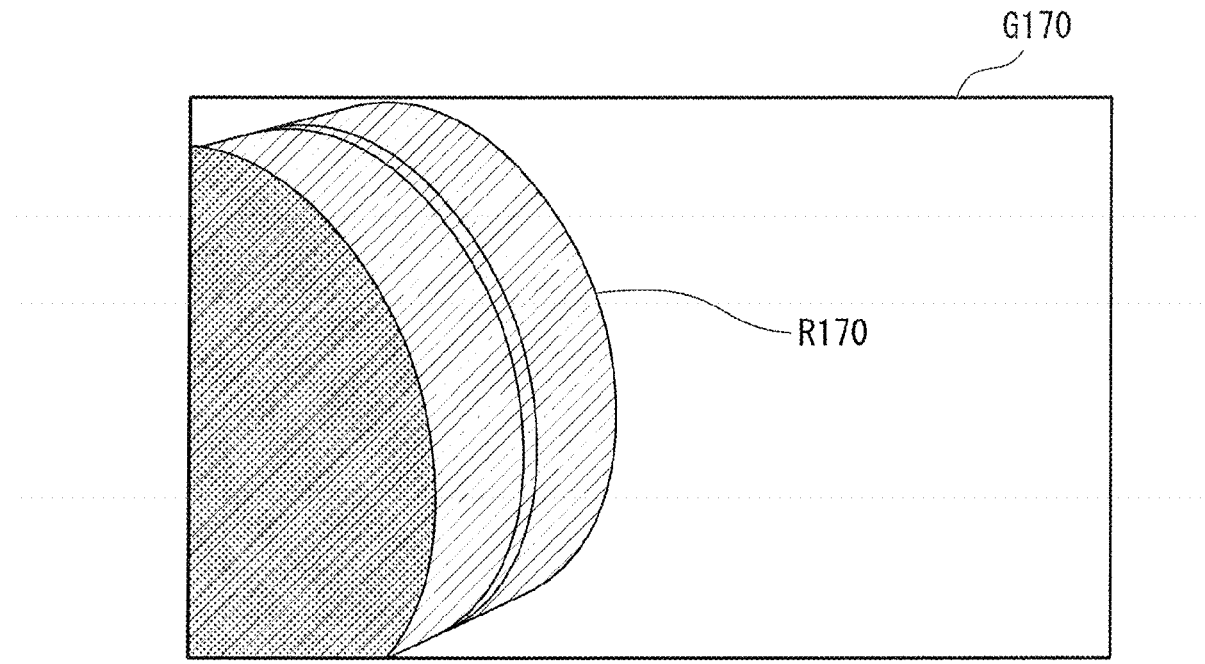
FIG. 29 is a reference diagram showing a shielding object area in a third modified example of the embodiment of the present invention.
Figure 30:
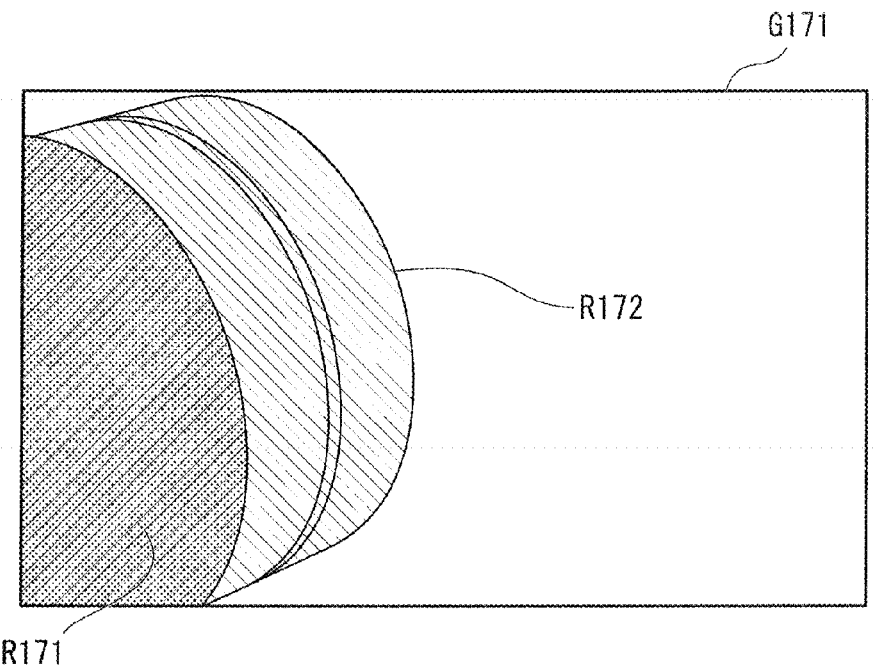
FIG. 30 is a reference diagram showing a shielding object area in the third modified example of the embodiment of the present invention.

In an image G170 showed in FIG. 29, a shielding object area R170 including the images of the imaging terminal 20a and the lens module 20b is detected. In an image G171 showed in FIG. 30, a shielding object area R171 and a shielding object area R172 are calculated from the shielding object area R170 showed in FIG. 29. The shielding object area R171 is an area including the image of the imaging terminal 20a. The shielding object area R172 is an area including the image of the lens module 20b.

For example, the shielding object detecting unit 101 detects the shielding object area R171 and the shielding object area R172 depending on the color or shape of the area in the image G171. For example, the shielding object detecting unit 101 detects a black area as the shielding object area R171. The shielding object detecting unit 101 detects a silver area as the shielding object area R172. Alternatively, the shielding object detecting unit 101 detects an area including a rounded part as the shielding object area R171. The shielding object detecting unit 101 detects a cylindrical area as the shielding object area R172.

The shielding object detecting unit 101 may detect the shielding object area R171 and the shielding object area R172 based on the shape information of the imaging terminal 20a and the shape information of the lens module 20b. The shape information of the imaging terminal 20a and the shape information of the lens module 20b are stored in the control terminal 10a in advance. The shielding object detecting unit 101 detects an area having a shape corresponding to the shape of the imaging terminal 20a as the shielding object area R171. The shielding object detecting unit 101 detects an area having a shape corresponding to the shape of the lens module 20b as the shielding object area R172.

Figure 31:
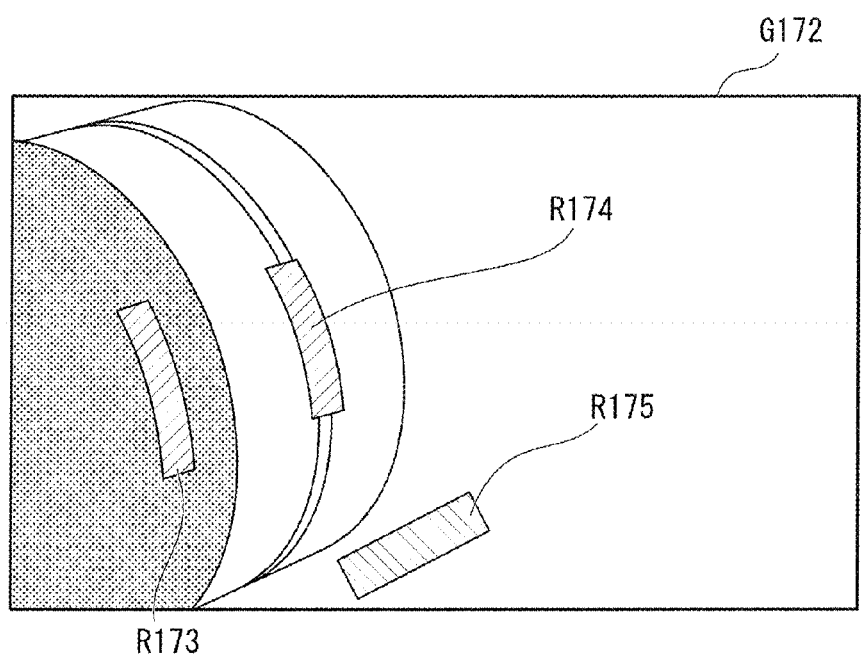
FIG. 31 is a reference diagram showing a detection area in the third modified example of the embodiment of the present invention.

In an image G172 showed in FIG. 31, the shielding object detecting unit 101 calculates a detection area R173 based on the shielding object area R171 and detection areas R174 and R175 based on the shielding object area R172. The detection area R173 overlaps the shielding object area R171. The detection area R173 is an area in which an operation on the imaging terminal 20a is detected. For example, an operation of the shutter speed is detected from the detection area R173. The detection area R174 overlaps the shielding object area R172. The detection area R175 is located in the vicinity of the shielding object area R172. The detection area R174 and the detection area R175 are areas in which an operation on the lens module 20b is detected. For example, an operation of the focus is detected from the detection area R174. An operation of the zoom is detected from the detection area R175.

For example, an operation of the sensitivity or an operation of turning the imaging terminal 20a on may be detected from the detection area R173. An operation of the aperture may be detected from the detection area R174 or the detection area R175.

The operation on the imaging terminal 20a is detected from the first area (detection area R173) based on the image of the imaging terminal 20a. The operation on the lens module 20b is detected from the second area (detection areas R174 and R175) based on the image of the lens module 20b. Accordingly, a user can easily see an area in which an operation with a finger or hand is performed.

Figure 32:
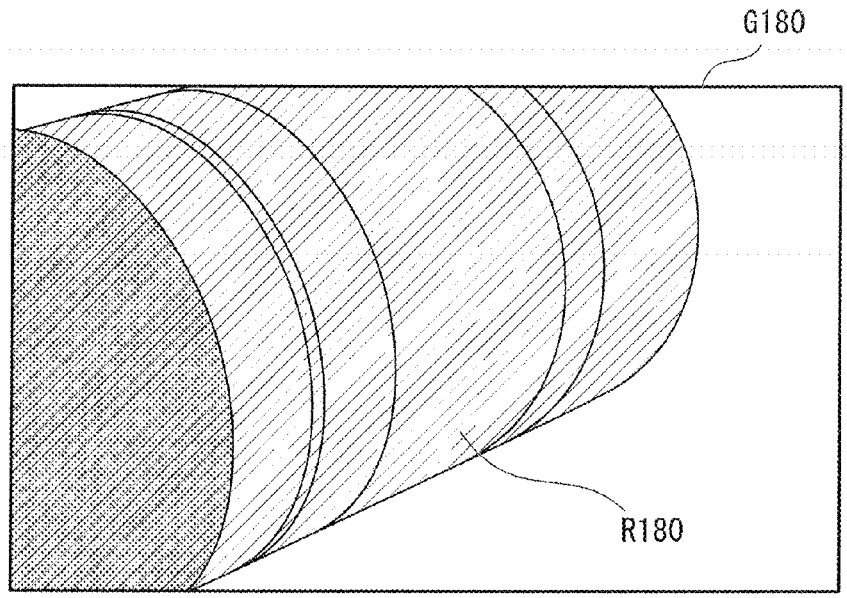
FIG. 32 is a reference diagram showing a shielding object area in the third modified example of the embodiment of the present invention.

FIG. 32 shows a state after the lens module 20b is replaced in the state showed in FIG. 29. The replacement means that a different lens module 20b is attached. In an image G180 showed in FIG. 32, a shielding object area R180 including the images of the imaging terminal 20a and the lens module 20b is detected. When the lens module 20b is replaced, it is assumed that the shielding object area R180 is different from the shielding object area R170 showed in FIG. 29. The shielding object area R180 may be the same as the shielding object area R170. When the shape of the lens module 20b is changed with a change in a zoom state or the like, different shielding object areas may be detected depending on the shape of the lens module 20b. Alternatively, the same shielding object area may be detected regardless of the shape of the lens module 20b. For example, the shielding object area including the image of the imaging terminal 20a is detected regardless of the lens module 20b. Alternatively, the shielding object area including a partial image of the lens module 20b and the image of the imaging terminal 20a may be detected.

Figure 33:
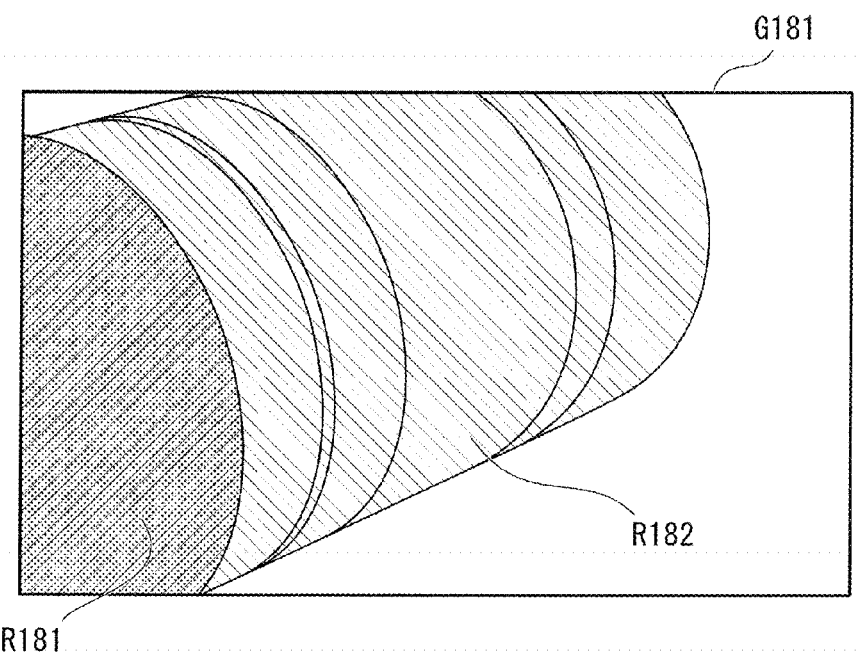
FIG. 33 is a reference diagram showing a shielding object area in the third modified example of the embodiment of the present invention.

In an image G181 showed in FIG. 33, a shielding object area R181 and a shielding object area R182 are calculated from the shielding object area R180 showed in FIG. 32. The shielding object area R181 is an area including the image of the imaging terminal 20a. The shielding object area R182 is an area including the image of the lens module 20b. The method of calculating the shielding object area R181 and the shielding object area R182 is the same as the method of calculating the shielding object area R171 and the shielding object area R172 in FIG. 30.

Figure 34:
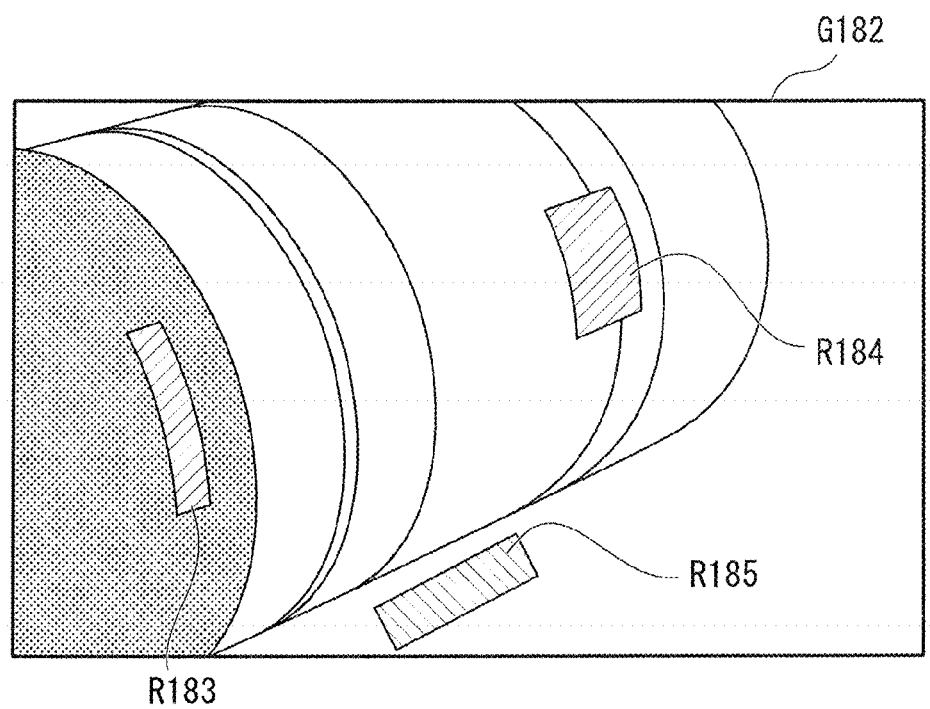
FIG. 34 is a reference diagram showing a detection area in the third modified example of the embodiment of the present invention.

In an image G182 showed in FIG. 34, the shielding object detecting unit 101 calculates a detection area R183 based on the shielding object area R181 and detection areas R184 and R185 based on the shielding object area R182. The detection area R183 overlaps the shielding object area R181. The detection area R183 is an area in which an operation on the imaging terminal 20a is detected. The detection area R184 overlaps the shielding object area R182. The detection area R185 is located in the vicinity of the shielding object area R182. The detection area R184 and the detection area R185 are areas in which an operation on the lens module 20b is detected. The method of calculating the detection areas R183, R184, and R185 is the same as the method of calculating the detection areas R173, R174, and R175 in FIG. 31.

The detection area R184 is different from the detection area R174 in FIG. 31. The detection area R185 is different from the detection area R175 in FIG. 31. By changing the detection area depending on the lens module 20*b*, a detection area which can be easily used by the user can be set for each lens module 20*b*.

Third Modified Example

In a third modified example of the embodiment of the present invention, the operation detecting unit 102 detects a predetermined motion of an object other than a shielding object based on a second image after the shielding object is detected. The second image is an image of at least an area based on the shielding object in a first image formed by the imaging unit 100. The predetermined motion of the object is a tap on the shielding object with the object.

Figure 35:
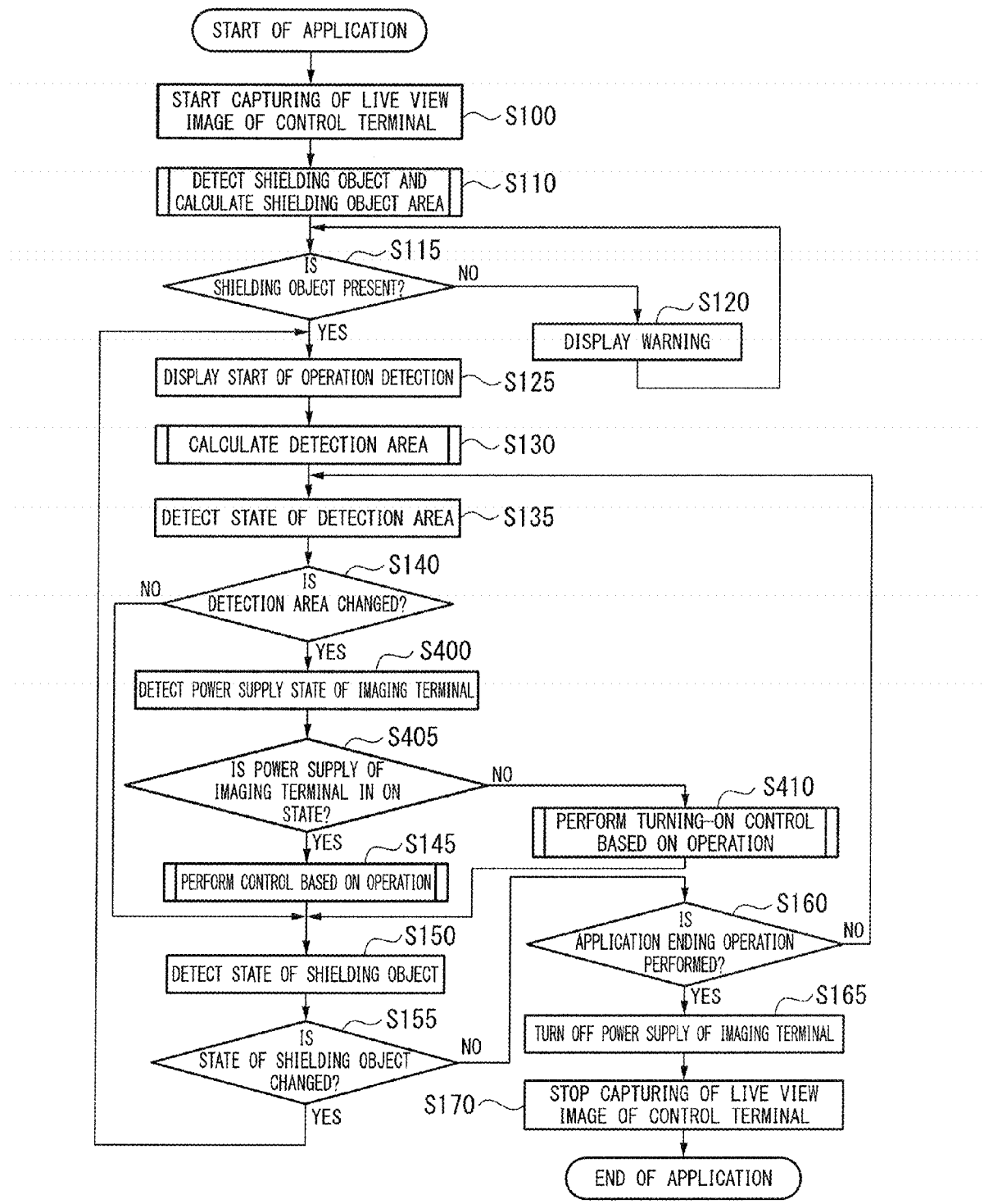
FIG. 35 is a flowchart showing an operation flow of a control terminal according to the third modified example of the embodiment of the present invention.

FIG. 35 shows an operation flow of the control terminal 10*a* according to the third modified example. The operation of the control terminal 10*a* according to the third modified example will be described below with reference to FIG. 35. A difference of the process showed in FIG. 35 from the process showed in FIG. 7 will be described.

After step S100 is performed, step S110 is performed. When a detection area is changed in step S140, the control terminal 10*a* detects the power supply state of the imaging terminal 20*a* (step S400). The control terminal 10*a* determines whether or not the power supply of the imaging terminal 20*a* is turned on based on the result of step S400 (step S405). When the power supply of the imaging terminal 20*a* is turned on, step S145 is performed. When the power supply of the imaging terminal 20*a* is turned off, the control terminal 10*a* performs control of turning on the power supply of the imaging terminal 20*a* with an operation with the user's finger or hand (step S410). After step S410 is performed, step S150 is performed.

Regarding points other than those just described, the process showed in FIG. 35 is the same as the process showed in FIG. 7.

Figure 36:
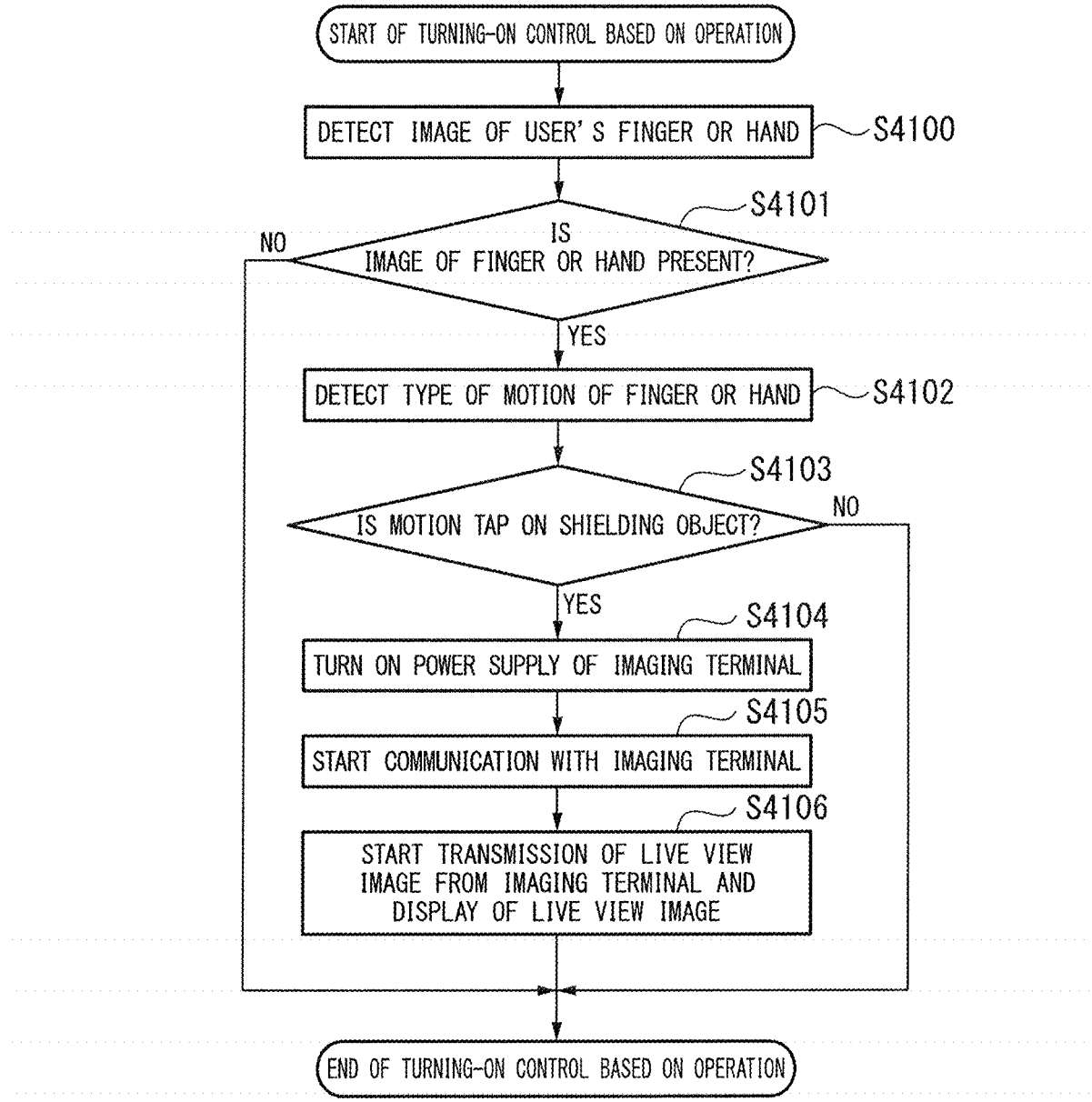
FIG. 36 is a flowchart showing an operation flow of the control terminal according to the third modified example of the embodiment of the present invention.

FIG. 36 shows an operation flow of the control terminal 10*a* in step S410. The operation of the control terminal 10*a* in step S410 will be described below with reference to FIG. 36.

The operation detecting unit 102 performs a process of detecting an image of a user's finger or hand based on the image of the detection area (step S4100). Step S4100 is the same as step S1450. The operation detecting unit 102 determines whether or not the image of the user's finger or hand is present in the image of the detection area based on the result of step S4100 (step S4101).

When the image of the user's finger or hand is not present in the image of the detection area, step S410 is ended. When the image of the user's finger or hand is present in the image of the detection area, the operation detecting unit 102 detects the type of the motion of the user's finger or hand based on the image of the detection area (step S4102). Step S4102 is the same as step S1452.

After the type of the motion of the user's finger or hand is detected, the operation detecting unit 102 determines whether or not the detected motion is a tap on the shielding object based on the result of step S4102 (step S4103). When the detected motion is not a tap on the shielding object, step S410 is ended. When the detected motion is a tap on the shielding object, the communication unit 103*a* wirelessly transmits a control signal for turning on the power supply of the imaging terminal 20*a* to the imaging terminal 20*a* (step S4104). The communication unit 201 of the imaging terminal 20*a* wirelessly receives the control signal from the control terminal 10*a*. The power supply of the imaging terminal 20*a* is turned on in response to the control signal.

After the power supply of the imaging terminal 20*a* is turned on, the communication unit 103*a* starts communication with the imaging terminal 20*a* (step S4105). After the communication with the imaging terminal 20*a* is started, the communication unit 103*a* starts transmission of a live view image and the display unit 104 starts display of the trough image (step S4106). Step S4106 is the same as step S1058.

By starting the transmission of the live view image and the display of the live view image, step S410 is ended.

Fourth Modified Example

In a fourth modified example of the embodiment of the present invention, the operation detecting unit 102 detects a position of an object and a predetermined state of the object based on a second image after a shielding object is detected. The second image is an image of at least an area based on the shielding object in a first image formed by the imaging unit 100. When the predetermined state of the object is detected, the output unit 103 outputs a control signal based on the position of the object to a control target terminal 20.

For example, the control target terminal 20 is the lens module 20*b* connected to the imaging terminal 20*a*. When the position of the object is in an area based on the lens module 20*b* and the predetermined state of the object is detected, the communication unit 103*a* (output unit) outputs a control signal based on the position of the object to the lens module 20*b*.

For example, the position of the object detected by the operation detecting unit 102 is located on the surface of the lens module 20*b* or in the vicinity thereof. When the image of the object in the image overlaps the image of the lens module 20*b* or when the image of the object in the image is located in the vicinity of the image of the lens module 20*b*, the object is located on the surface of the lens module 20*b* or in the vicinity thereof. For example, the predetermined state of the object is a state in which the image of the object in the image is located in the area based on the image of the lens module 20*b*.

Figure 37:
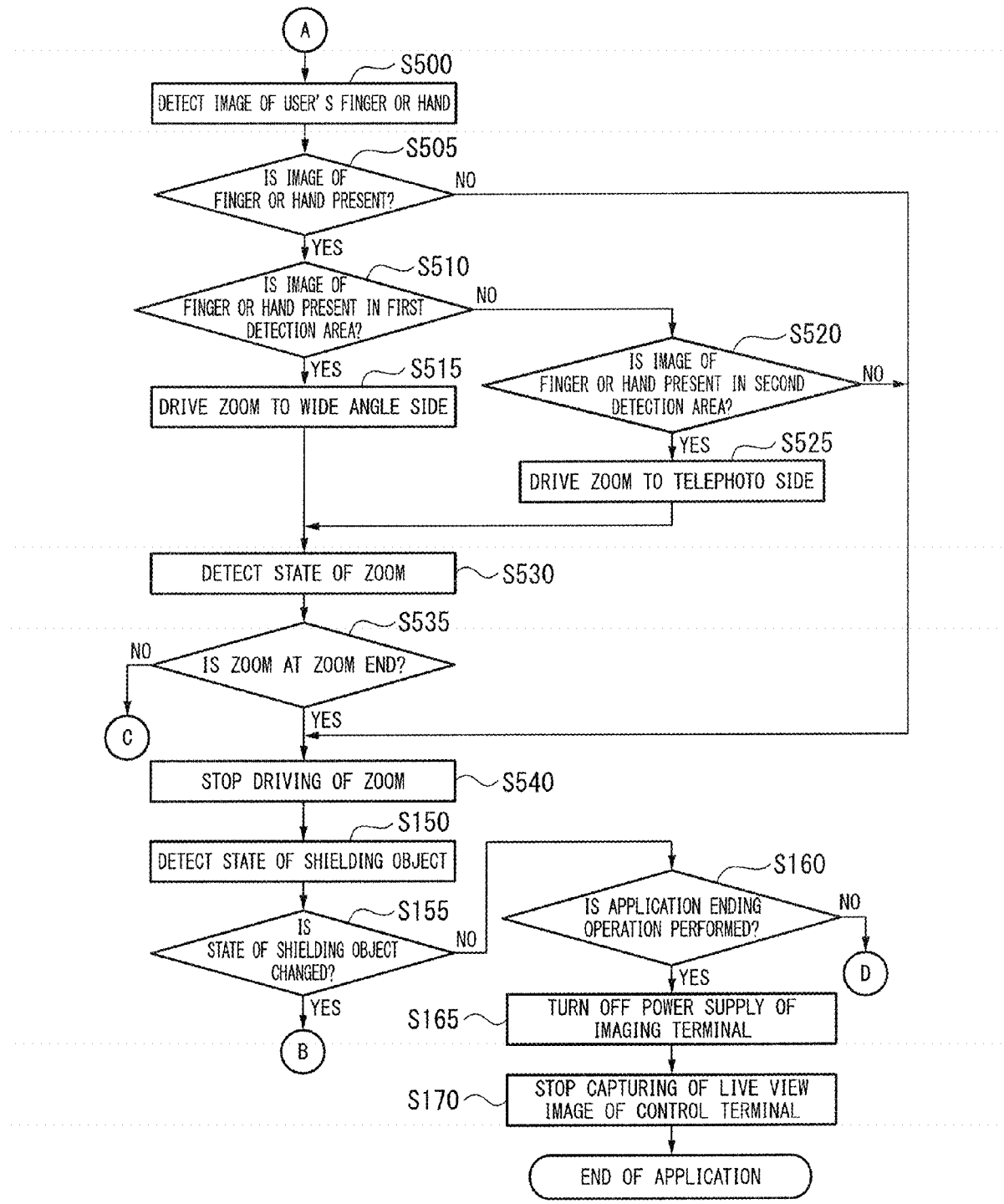
FIG. 37 is a flowchart showing an operation flow of a control terminal according to a fourth modified example of the embodiment of the present invention.

The operation of the control terminal 10*a* according to the fourth modified example is based on FIGS. 26 and 37. Step S305 in FIG. 26 is changed to step S130 in FIG. 7. The operation of the control terminal 10*a* according to the fourth modified example will be described below with reference to FIG. 37. A difference of the process showed in FIG. 37 from the process showed in FIG. 7 will be described.

After step S130 is performed, the operation detecting unit 102 performs a process of detecting an image of a user's finger or hand based on the image of the detection area (step S500). Step S500 is the same as step S1450. The operation detecting unit 102 determines whether or not the image of the user's finger or hand is present in the image of the detection area based on the result of step S500 (step S505).

The detection area in the fourth modified example includes multiple detection areas, that is, a first detection area and a second detection area. The first detection area and the second detection area are areas based on the image of the lens module 20*b*. The second detection area is different from the first detection area.

When the image of the user's finger or hand is not present in the image of the detection area, step S540 is performed.

When the image of the user's finger or hand is present in the image of the detection area, the operation detecting unit 102 determines whether or not the image of the user's finger or hand is present in the first detection area (step S510).

When the image of the user's finger or hand is present in the first detection area, the communication unit 103a wirelessly transmits a control signal for driving the zoom to a wide side to the imaging terminal 20a (step S515). The communication unit 201 of the imaging terminal 20a wirelessly receives the control signal from the control terminal 10a. The communication unit 201 transmits the received control signal to the lens module 20b. The lens module 20b drives the zoom to the wide side in response to the control signal.

When the image of the user's finger or hand is not present in the first detection area, the operation detecting unit 102 determines whether or not the image of the user's finger or hand is present in the second detection area (step S520). When the image of the user's finger or hand is not present in the second detection area, step S540 is performed.

When the image of the user's finger or hand is present in the second detection area, the communication unit 103a wirelessly transmits a control signal for driving the zoom to a telephoto side to the imaging terminal 20a (step S525). The communication unit 201 of the imaging terminal 20a wirelessly receives the control signal from the control terminal 10a. The communication unit 201 transmits the received control signal to the lens module 20b. The lens module 20b drives the zoom to the telephoto side in response to the control signal.

After step S515 or step S525 is performed, the communication unit 201 of the imaging terminal 20a receives information on the zoom of the lens module 20b from the lens module 20b. The communication unit 201 wirelessly transmits the received information to the control terminal 10a. The communication unit 103a of the control terminal 10a wirelessly receives the information on the zoom of the lens module 20b from the imaging terminal 20a. The control terminal 10a detects the state of the zoom based on the information on the zoom of the lens module 20b (step S530). The control terminal 10a determines whether or not the zoom is located at a zoom end, that is, a wide end or telephoto end, based on the result of step S530 (step S535).

When the zoom is not located at a zoom end, step S130 is performed. When the zoom is located at a zoom end, the communication unit 103a wirelessly transmits a control signal for stopping the driving of the zoom to the imaging terminal 20a (step S540). The communication unit 201 of the imaging terminal 20a wirelessly receives the control signal from the control terminal 10a. The communication unit 201 transmits the received control signal to the lens module 20b. The lens module 20b stops the driving of the zoom in response to the control signal. After the driving of the zoom is stopped, step S150 is performed.

Regarding points other than those just described, the process showed in FIG. 37 is the same as the process showed in FIG. 7.

Figure 38:
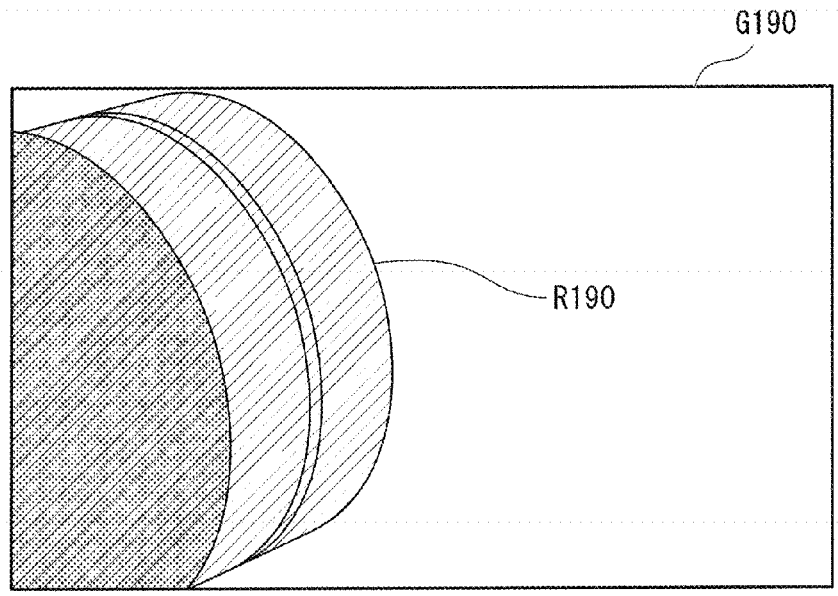
FIG. 38 is a reference diagram showing a shielding object area in the fourth modified example of the embodiment of the present invention.
Figure 39:
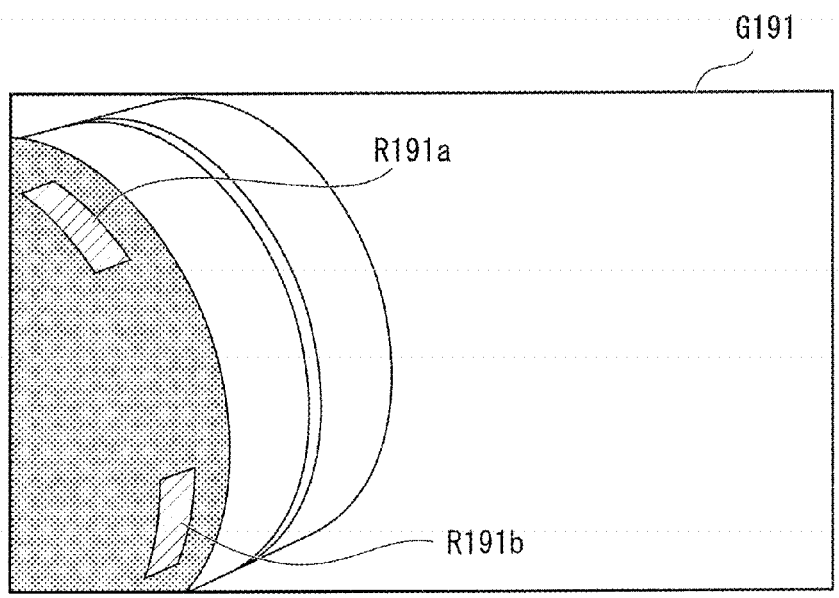
FIG. 39 is a reference diagram showing a detection area in the fourth modified example of the embodiment of the present invention.

FIGS. 38 and 39 illustrate images formed by the imaging unit 100. A shielding object area and a detection area in the fourth modified example will be described below with reference to FIGS. 38 and 39.

In an image G190 showed in FIG. 38, a shielding object area R190 including the images of the imaging terminal 20a and the lens module 20b is detected. In an image G191 showed in FIG. 39, a first detection area R191a and a second detection area R191b including a partial image of the imaging terminal 20a are calculated from the shielding object area R190. When the image of the user's finger or hand is present in the first detection area R191a, the zoom is driven to the wide side. When the image of the user's finger or hand is present in the second detection area R191b, the zoom is driven to the telephoto side.

As described above, when the predetermined state of the object is detected, the control terminal 10a can perform control based on the position of the object.

Fifth Modified Example

In a fifth modified example of the embodiment of the present invention, the operation detecting unit 102 stops detection of a predetermined state of an object or a predetermined motion of the object when a shielding object is not detected after the shielding object has been detected. That is, while the shielding object detecting unit 101 repeatedly detects the shielding object, the operation detecting unit 102 repeatedly detects the predetermined state of the object or the predetermined motion of the object. Thereafter, when the shielding object is not detected, the operation detecting unit 102 stops the detection of the predetermined state of the object or the predetermined motion of the object. After the operation detecting unit 102 stops the detection of the predetermined state of the object or the predetermined motion of the object, the operation detecting unit 102 continuously stops the detection until the shielding object is detected. That is, the operation detecting unit 102 detects the predetermined state of the object or the predetermined motion of the object only when the shielding object detecting unit 101 repeatedly detects the shielding object.

The control terminal 10a includes a display unit 104 that displays a first image formed by the imaging unit 100. The display unit 104 stops the display of the first image when the shielding object is not detected after the shielding object has been detected. That is, when the shielding object detecting unit 101 repeatedly detects the shielding object, the display unit 104 repeatedly displays the first image. Thereafter, the display unit 104 stops the display of the first image when the shielding object is not detected. After the display unit 104 stops the display of the first image, the display unit 104 continuously stops the display of the first image until the shielding object is detected. That is, the display unit 104 displays the first image only when the shielding object detecting unit 101 repeatedly detects the shielding object.

When the shielding object is not detected after the shielding object has been detected, the imaging unit 100 stops formation of the first image. That is, when the shielding object detecting unit 101 repeatedly detects the shielding object, the imaging unit 100 repeatedly forms the first image. Thereafter, the imaging unit 100 stops the formation of the first image when the shielding object is not detected. After the imaging unit 100 stops the formation of the first image, the imaging unit 100 continuously stops the formation of the first image until it is instructed to detect the shielding object. That is, the imaging unit 100 forms the first image only when the shielding object detecting unit 101 repeatedly detects the shielding object.

Figure 40:
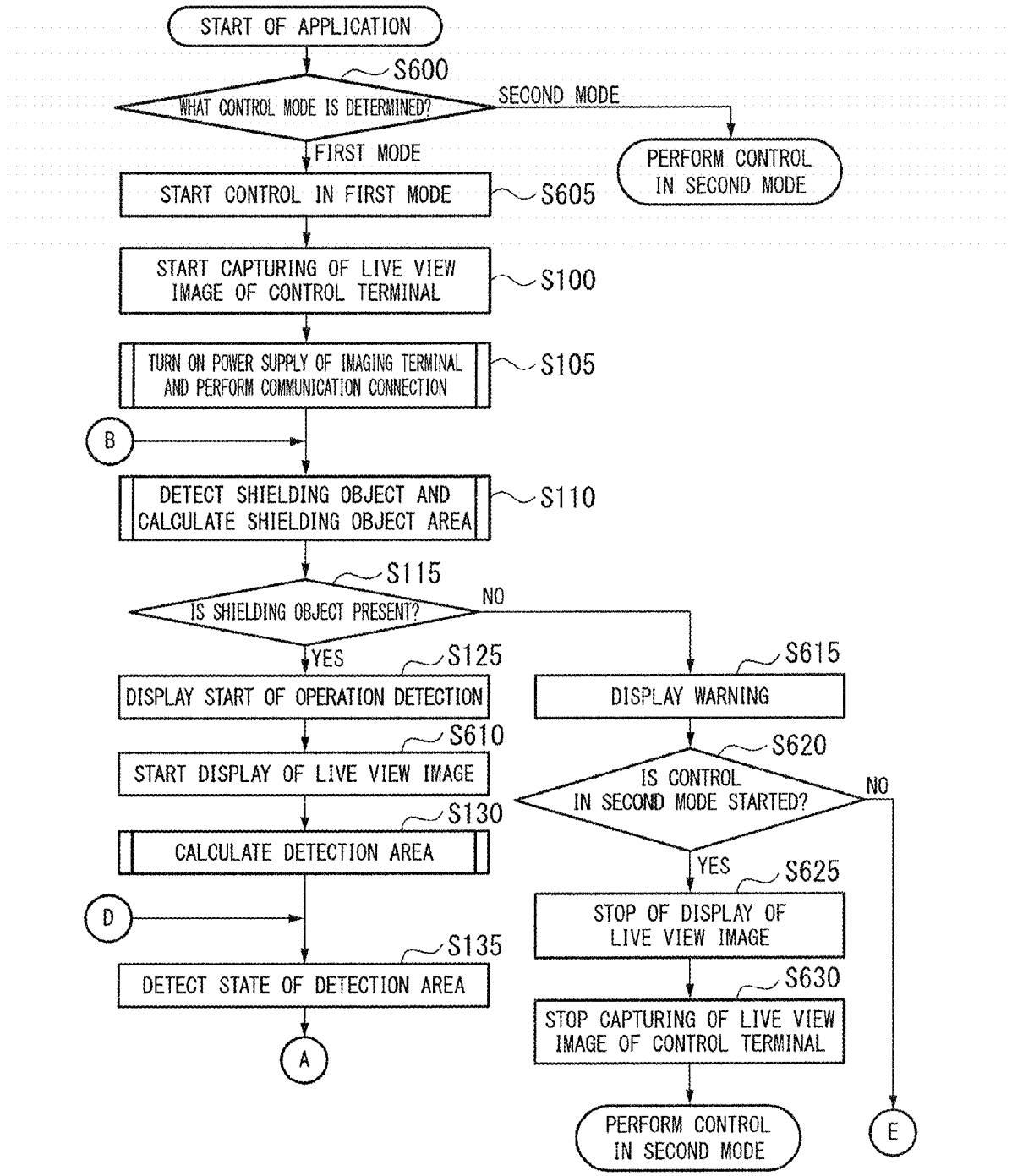
FIG. 40 is a flowchart showing an operation flow of a control terminal according to a fifth modified example of the embodiment of the present invention.
Figure 41:
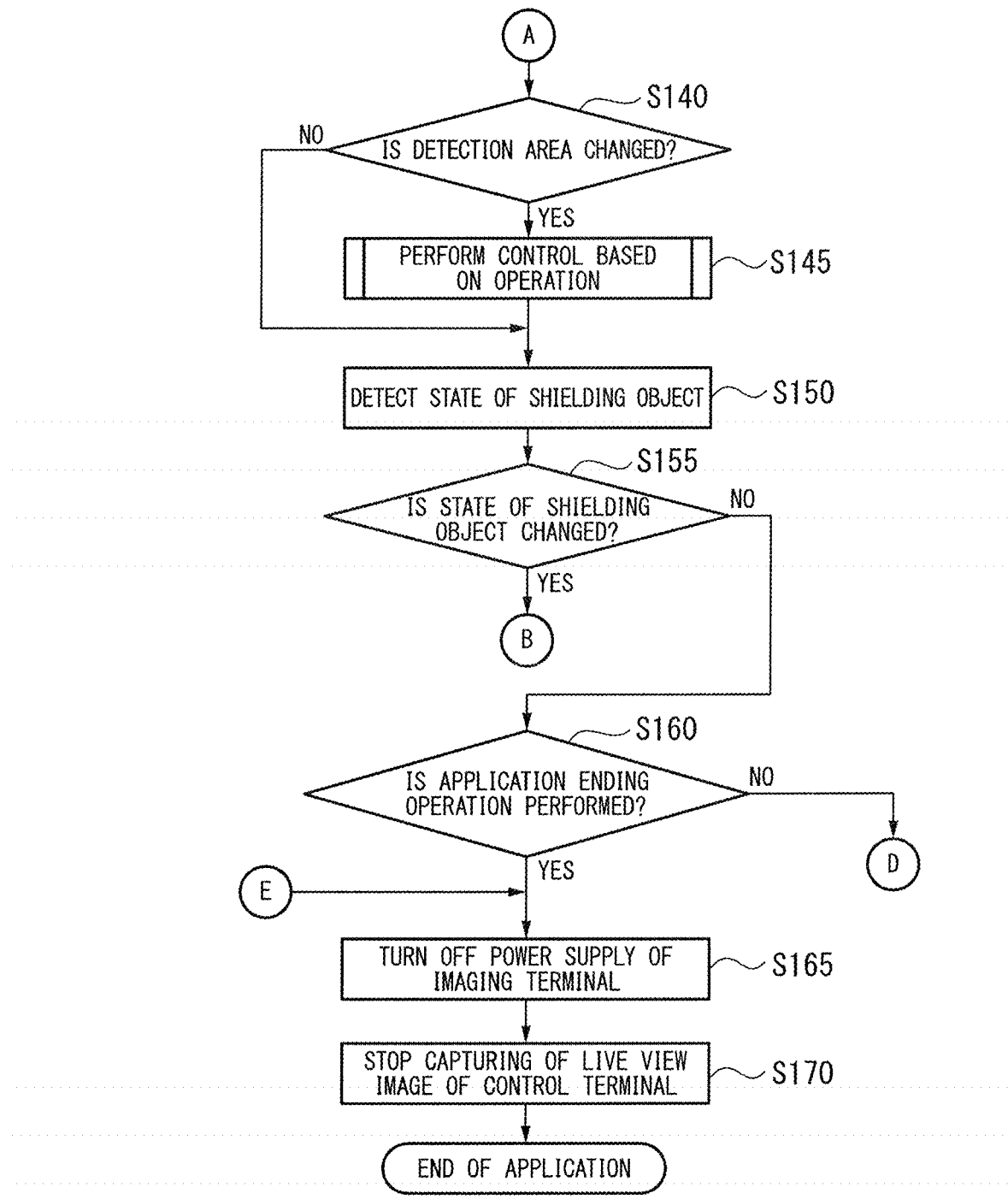
FIG. 41 is a flowchart showing an operation flow of the control terminal according to the fifth modified example of the embodiment of the present invention.

FIGS. 40 and 41 illustrate an operation flow of the control terminal 10a according to the fifth modified example. The operation of the control terminal 10a according to the fifth modified example will be described below with reference to FIGS. 40 and 41. A difference of the process showed in FIGS. 40 and 41 from the process showed in FIG. 7 will be described.

The control of the imaging terminal 20a is started by starting an application of the control terminal 10a. The control terminal 10a determines a control mode of the control terminal 10a (step S600). The control mode of the control terminal 10a can be switched between a first mode and a second mode. The first mode is a mode in which an operation with the user's finger or hand is detected based on the image formed by the imaging unit 100. The second mode is a mode in which a manual operation on the control terminal 10a is received. For example, the display unit 104 is a touch panel, and the touch panel receives the manual operation. For example, the manual operation on the control terminal 10a is an operation of switching the control mode between the first mode and the second mode. Alternatively, the manual operation on the control terminal 10a is an operation on the control of the imaging terminal 20a.

When the control mode of the control terminal 10a is the second mode, the control terminal 10a performs the control in the second mode. When the control mode of the control terminal 10a is the first mode, the control terminal 10a starts the control in the first mode (step S605). After the control in the first mode is started, step S100 is performed.

After step S125 is performed, the display unit 104 starts display of a live view image formed by the imaging unit 100 (step S610). After the display of a live view image is started, the display unit 104 displays the live view image in synchronization with the capturing of the live view image in the imaging unit 100. After the display of the live view image is started, step S130 is performed.

When no shielding object is present in step S115, the display unit 104 displays a warning (step S615). For example, the display unit 104 displays a message indicating that the imaging terminal 20a is not attached to the control terminal 10a and that the control in the second mode is started.

After the warning is displayed, the control terminal 10a determines whether or not to start the control in the second mode (step S620). When the control in the second mode is not started, step S165 is performed. When the control in the second mode is started, the display unit 104 stops the display of a live view image formed by the imaging unit 100 (step S625).

After the display of the live view image is stopped, the imaging unit 100 stops the capturing of a live view image (step S630). After the capturing of a live view image is stopped, the control terminal 10a performs the control in the second mode.

Regarding points other than those just described, the process showed in FIGS. 40 and 41 is the same as the process showed in FIG. 7.

In the operation, when no shielding object is detected, the control in the second mode is performed. Alternatively, when no shielding object is detected, step S165 and step S170 are performed and then the application is ended. Accordingly, the detection of the operation with the user's finger or hand and the display and generation of the image are stopped. As a result, the power consumption of the control terminal 10a is reduced.

Sixth Modified Example

In a sixth modified example of the embodiment of the present invention, the operation detecting unit 102 stops detection of a predetermined state of an object or a predetermined motion of the object when the power supply of the imaging terminal 20a is changed from an ON state to an OFF state. That is, while the power supply of the imaging terminal 20a is in the ON state, the operation detecting unit 102 repeatedly detects the predetermined state of the object or the predetermined motion of the object. Thereafter, when the power supply of the imaging terminal 20a is changed from the ON state to the OFF state, the operation detecting unit 102 stops the detection of the predetermined state of the object or the predetermined motion of the object. After the operation detecting unit 102 stops the detection of the predetermined state of the object or the predetermined motion of the object, the operation detecting unit 102 continuously stops the detection until the power supply of the imaging terminal 20a is turned on. That is, the operation detecting unit 102 detects the predetermined state of the object or the predetermined motion of the object only when the power supply of the imaging terminal 20a is in the ON state.

The control terminal 10a includes a display unit 104 that displays a first image formed by the imaging unit 100. The display unit 104 stops the display of the first image when the power supply of the imaging terminal 20a is changed from the ON state to the OFF state. That is, when the power supply of the imaging terminal 20a is in the ON state, the display unit 104 repeatedly displays the first image. Thereafter, the display unit 104 stops the display of the first image when the power supply of the imaging terminal 20a is changed from the ON state to the OFF state. After the display unit 104 stops the display of the first image, the display unit 104 continuously stops the display of the first image until the power supply of the imaging terminal 20a is turned on. That is, the display unit 104 displays the first image only when the power supply of the imaging terminal 20a is in the ON state.

When the power supply of the imaging terminal 20a is changed from the ON state to the OFF state, the imaging unit 100 stops formation of the first image. That is, when the power supply of the imaging terminal 20a is in the ON state, the imaging unit 100 repeatedly forms the first image. Thereafter, the imaging unit 100 stops the formation of the first image when the power supply of the imaging terminal 20a is changed from the ON state to the OFF state. After the imaging unit 100 stops the formation of the first image, the imaging unit 100 continuously stops the formation of the first image until the power supply of the imaging terminal 20a is turned on. That is, the imaging unit 100 forms the first image only when the power supply of the imaging terminal 20a is in the ON state.

The operation detecting unit 102 stops detection of a predetermined state of an object or a predetermined motion of the object when communication between the control terminal 10a and the imaging terminal 20a is ended after the communication between the control terminal 10a and the imaging terminal 20a has been started. That is, while the control terminal 10a and the imaging terminal 20a are communicating with each other, the operation detecting unit 102 repeatedly detects the predetermined state of the object or the predetermined motion of the object. Thereafter, when the communication between the control terminal 10a and the imaging terminal 20a is ended, the operation detecting unit 102 stops the detection of the predetermined state of the object or the predetermined motion of the object. After the operation detecting unit 102 stops the detection of the predetermined state of the object or the predetermined motion of the object, the operation detecting unit 102 continuously stops the detection until the communication between the control terminal 10a and the imaging terminal 20a is started. That is, the operation detecting unit 102 detects the predetermined state of the object or the predetermined motion of the object only when the control terminal 10a and the imaging terminal 20a are communicating with each other. For example, the communication between the control terminal 10a and the imaging terminal 20a is transmission of an image formed by the imaging unit 200 of the imaging terminal 20a.

The display unit 104 stops the display of the first image when the communication between the control terminal 10a and the imaging terminal 20a is ended after the communication between the control terminal 10a and the imaging terminal 20a is started. That is, when the control terminal 10a and the imaging terminal 20a are communicating with each other, the display unit 104 repeatedly displays the first image. Thereafter, the display unit 104 stops the display of the first image when the communication between the control terminal 10a and the imaging terminal 20a is ended. After the display unit 104 stops the display of the first image, the display unit 104 continuously stops the display of the first image until the communication between the control terminal 10a and the imaging terminal 20a is started. That is, the display unit 104 displays the first image only when the control terminal 10a and the imaging terminal 20a are communicating with each other.

When the communication between the control terminal 10a and the imaging terminal 20a is ended after the communication between the control terminal 10a and the imaging terminal 20a is started, the imaging unit 100 stops formation of the first image. That is, when the control terminal 10a and the imaging terminal 20a are communicating with each other, the imaging unit 100 repeatedly forms the first image. Thereafter, the imaging unit 100 stops the formation of the first image when the communication between the control terminal 10a and the imaging terminal 20a is ended. After the imaging unit 100 stops the formation of the first image, the imaging unit 100 continuously stops the formation of the first image until the communication between the control terminal 10a and the imaging terminal 20a is started. That is, the imaging unit 100 forms the first image only when the control terminal 10a and the imaging terminal 20a are communicating with each other.

Figure 42:
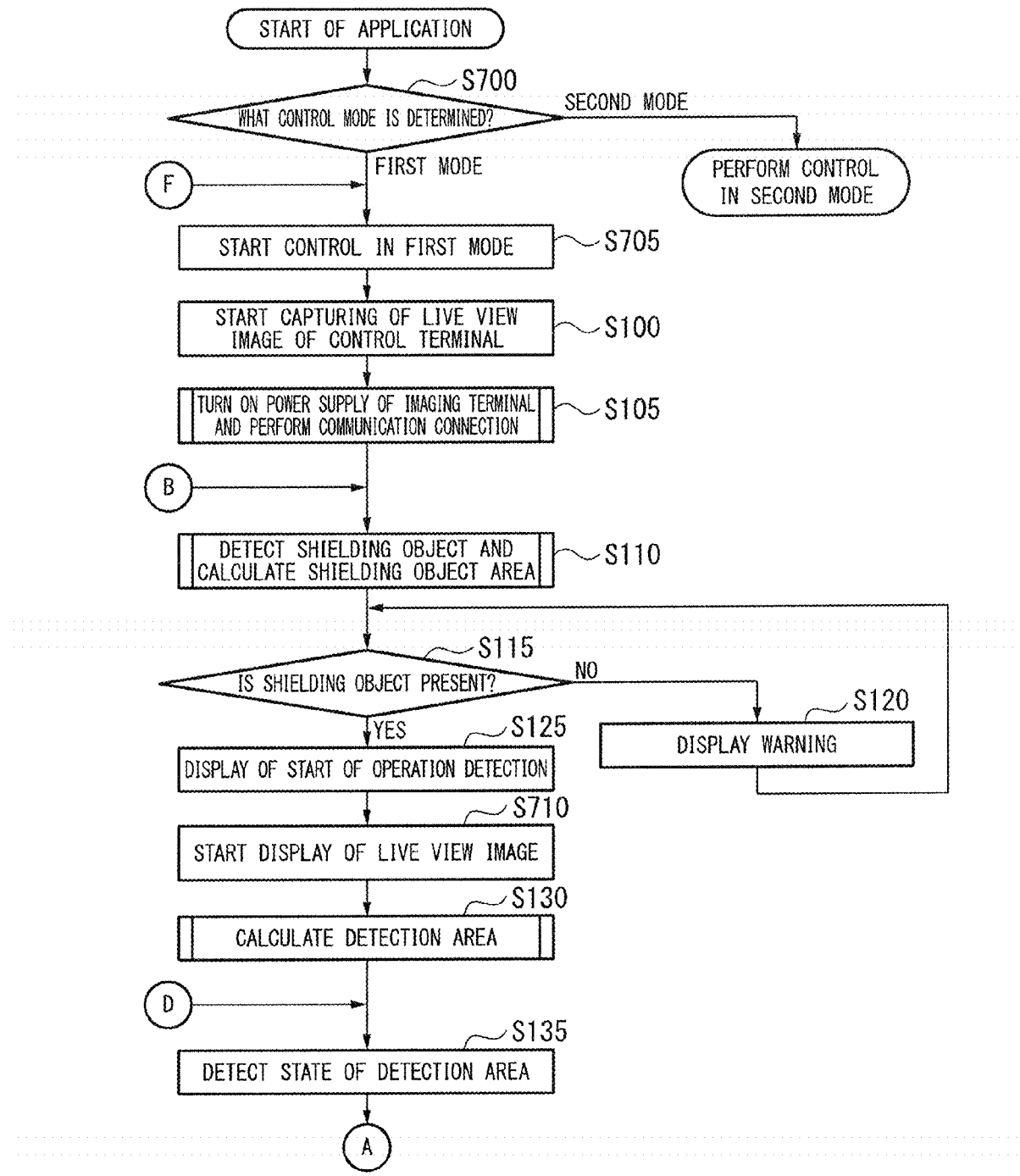
FIG. 42 is a flowchart showing an operation flow of a control terminal according to a sixth modified example of the embodiment of the present invention.
Figure 43:
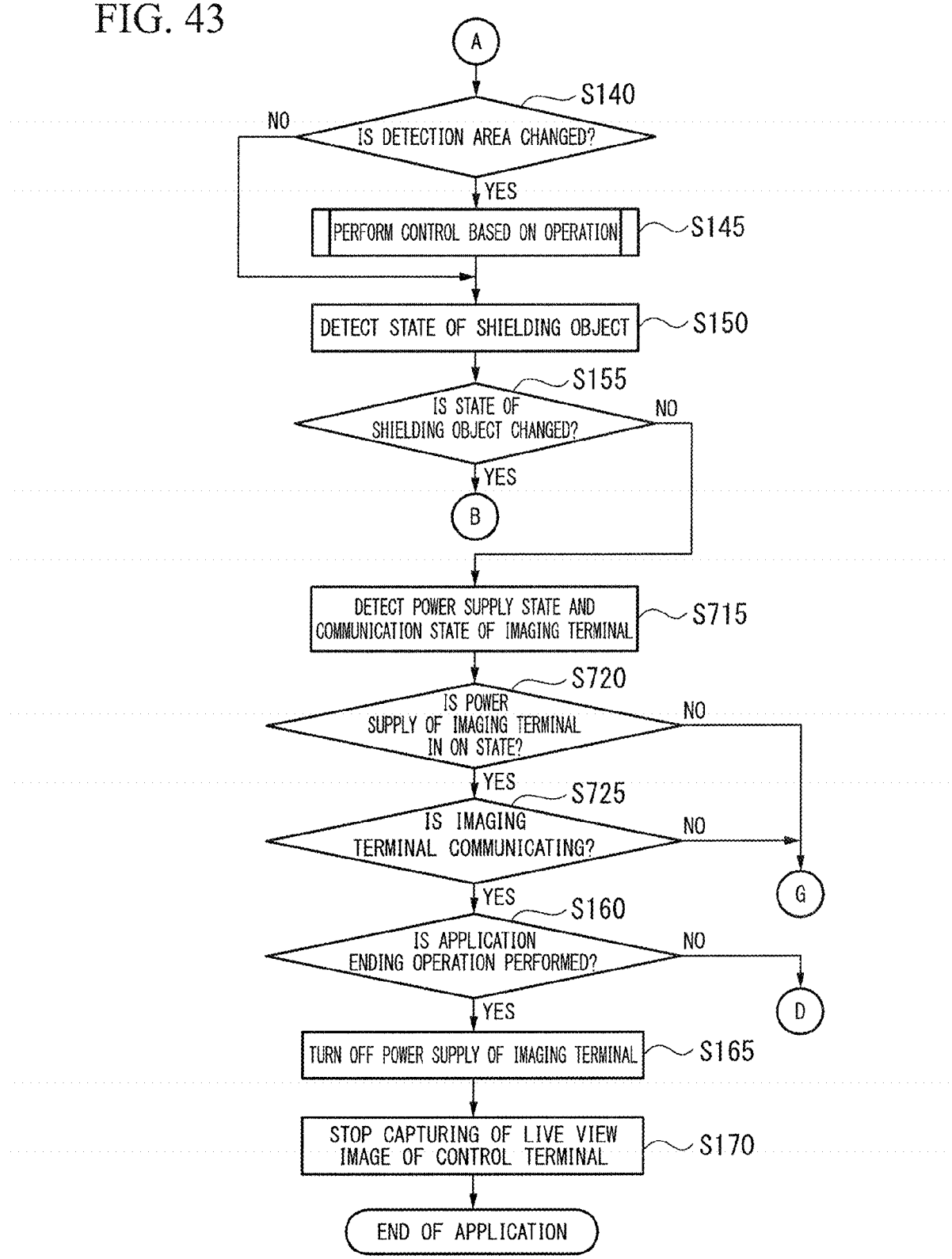
FIG. 43 is a flowchart showing an operation flow of the control terminal according to the sixth modified example of the embodiment of the present invention.
Figure 44:
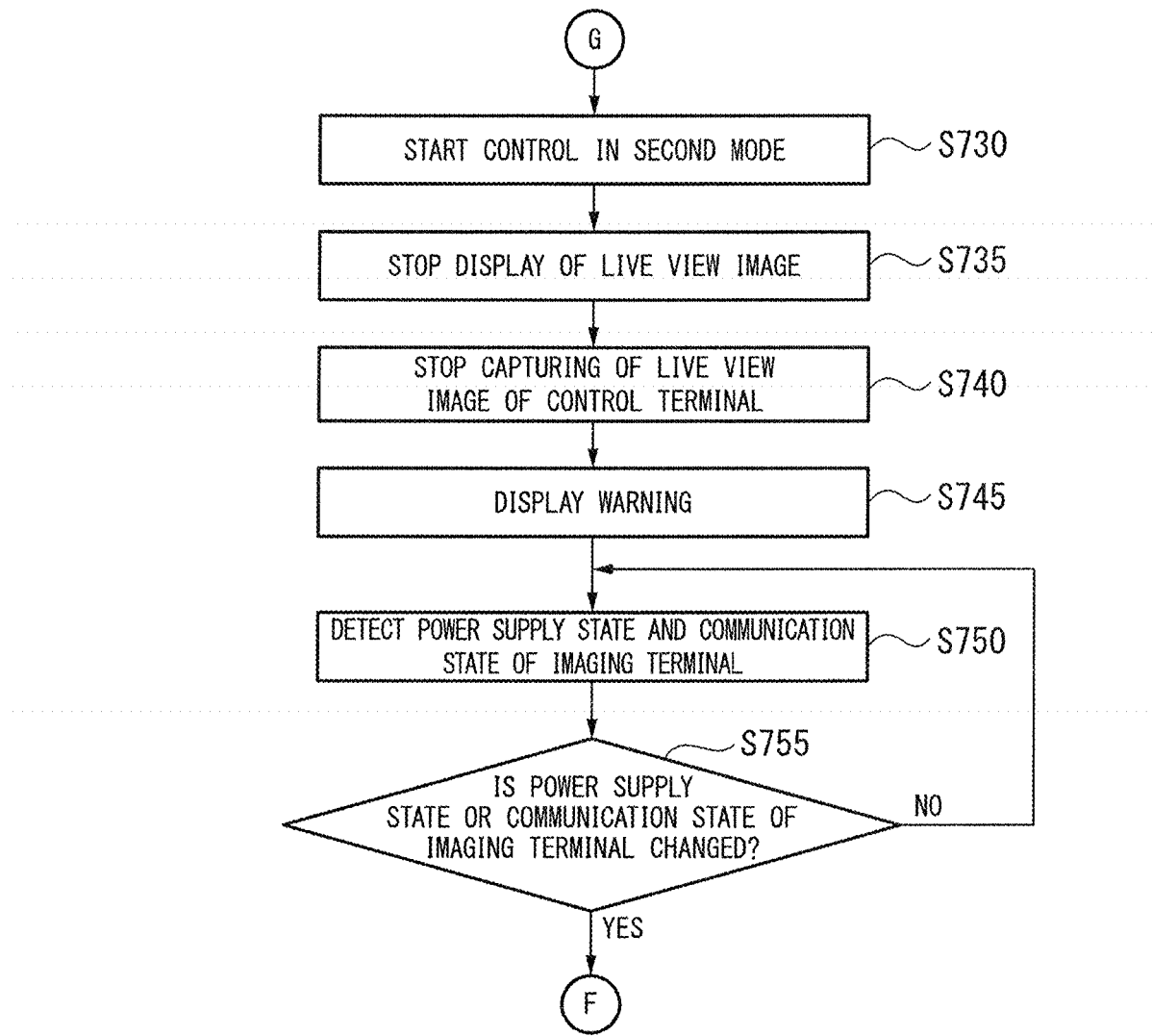
FIG. 44 is a flowchart showing an operation flow of the control terminal according to the sixth modified example of the embodiment of the present invention.

FIGS. 42, 43, and 44 illustrate an operation flow of the control terminal 10a according to the sixth modified example. The operation of the control terminal 10a according to the sixth modified example will be described below with reference to FIGS. 42, 43, and 44. A difference of the process showed in FIGS. 42, 43, and 44 from the process showed in FIG. 7 will be described.

Step S700, step S705, and step S710 are the same as steps S600, step S605, and step S610 in FIG. 40.

When the state of the shielding object is not changed in step S155, the control terminal 10a detects a communication state and a power supply state of the imaging terminal 20a (step S715). The control terminal 10a determines whether or not the power supply of the imaging terminal 20a is in the ON state or the OFF state based on the result of step S715 (step S720).

When the power supply of the imaging terminal 20a is in the ON state, the control terminal 10a determines whether or not the imaging terminal 20a is communicating based on the result of step S715 (step S725). When the imaging terminal 20a is communicating, step S160 is performed. The order of step S725 and step S720 may be reversed.

When the power supply of the imaging terminal 20a is not in the ON state or when the imaging terminal 20a is not communicating, the control terminal 10a starts the control in the second mode (step S730). After the control in the second mode is started, the display unit 104 stops the display of a live view image formed by the imaging unit 100 (step S735).

After the display of the live view image is stopped, the imaging unit 100 stops the capturing of the live view image (step S740). After the capturing of the live view image is stopped, the display unit 104 displays a warning (step S745). For example, the display unit 104 displays a message indicating that the power supply of the imaging terminal 20a is in the OFF state or that the communication with the imaging terminal 20a is not possible.

After the warning is displayed, the control terminal 10a detects the communication state and the power supply state of the imaging terminal 20a (step S750). The control terminal 10a determines whether or not the power supply state or the communication state of the imaging terminal 20a is changed based on the result of step S750 (step S755).

When the power supply state or the communication state of the imaging terminal 20a is changed, step S705 is performed. When the power supply state and the communication state of the imaging terminal 20a are not changed, step S750 is performed.

Regarding points other than those just described, the process showed in FIGS. 42, 43, and 44 is the same as the process showed in FIG. 7.

In the operation, when the power supply of the imaging terminal 20a is in the OFF state or when the imaging terminal 20a is not communicating, the control in the second mode is performed. Accordingly, the detection of the operation with the user's finger or hand and the display and formation of an image are stopped and the control terminal 20a operates in the second control mode. As a result, the power consumption of the control terminal 10a is reduced.

Seventh Modified Example

Figure 45:
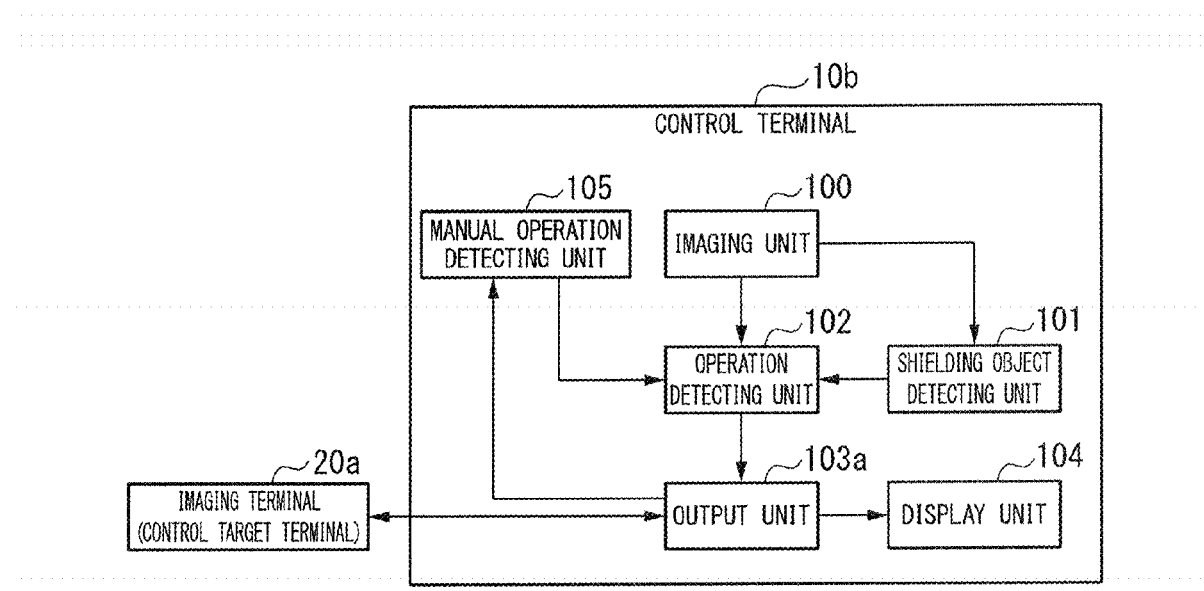
FIG. 45 is a block diagram showing a configuration of a control terminal according to a seventh modified example of the embodiment of the present invention.

FIG. 45 shows a configuration of a control terminal 10b according to a seventh modified example of the embodiment of the present invention. As showed in FIG. 45, the control terminal 10b includes an imaging unit 100 (first imaging unit), a shielding object detecting unit 101, an operation detecting unit 102, an output unit 103, a display unit 104, and a manual operation detecting unit 105.

A difference of the configuration showed in FIG. 45 from the configuration showed in FIG. 2 will be described. The manual operation detecting unit 105 detects a first manual operation on the control terminal 10b. The operation detecting unit 102 stops detection of a predetermined state of an object or a predetermined motion of the object when the first manual operation is detected after a shielding object has been detected.

A control target terminal 20 is the imaging terminal 20a. The manual operation detecting unit 105 detects a second manual operation on the lens module 20b connected to the imaging terminal 20a. The operation detecting unit 102 stops the detection of the predetermined state of the object or the predetermined motion of the object when the second manual operation is detected after the shielding object has been detected.

The first manual operation and the second manual operation are manual operations on the imaging. For example, when the display unit 104 is a touch panel, the manual operation detecting unit 105 includes an operation area on the touch panel. For example, the manual operation detecting unit 105 includes a shutter button on the touch panel. The manual operation detecting unit 105 detects the first manual operation by receiving an instruction to capture a still image for the imaging unit 200 of the imaging terminal 20a. The manual operation detecting unit 105 may detect the first manual operation by receiving an instruction to switch the control mode of the imaging. Alternatively, the manual operation detecting unit 105 may detect the first manual operation by receiving an instruction to set an imaging parameter of the imaging.

The manual operation detecting unit 105 detects the second manual operation based on the information from the imaging terminal 20*a*. When the lens module 20*b* is manually operated by a user, the lens module 20*b* outputs information indicating that the second manual operation is performed. The second manual operation is an operation on an aperture, focus, zoom, and the like. When the operation is performed through an operation part of the lens module 20*b*, the communication unit 201 of the imaging terminal 20*a* wirelessly transmits information input from the lens module 20*b* to the control terminal 10*b*. The communication unit 103*a* of the control terminal 10*b* receives the information and outputs the received information to the manual operation detecting unit 105. Accordingly, the manual operation detecting unit 105 receives the second manual operation.

When any one of the first manual operation and the second manual operation is detected, the operation detecting unit 102 stops the detection of the predetermined state of the object or the predetermined motion of the object. That is, when neither of the two manual operations is detected, the operation detecting unit 102 repeatedly detects the predetermined state of the object or the predetermined motion of the object. Thereafter, when any one of the two manual operations is detected, the operation detecting unit 102 stops the detection of the predetermined state of the object or the predetermined motion of the object.

The control terminal 10*b* includes a display unit 104 that displays a first image formed by the imaging unit 100. When any one of the first manual operation and the second manual operation is detected, the display unit 104 stops the display of the first image. That is, when neither of the two manual operations is detected, the display unit 104 repeatedly displays the first image. Thereafter, when any one of the two manual operations is detected, the display unit 104 stops the display of the first image.

When any one of the first manual operation and the second manual operation is detected, the imaging unit 100 stops the formation of the first image. That is, when neither of the two manual operations is detected, the imaging unit 100 repeatedly forms the first image. Thereafter, when any one of the two manual operations is detected, the imaging unit 100 stops the formation of the first image.

The display unit 104 displays an area based on an image of a shielding object, that is, a detection area, in the first image formed by the imaging unit 100. The display unit 104 may display the detection area when the shielding object detecting unit 101 repeatedly detects a shielding object.

Regarding points other than those just described, the configuration showed in FIG. 45 is the same as the configuration showed in FIG. 2.

Figure 46:
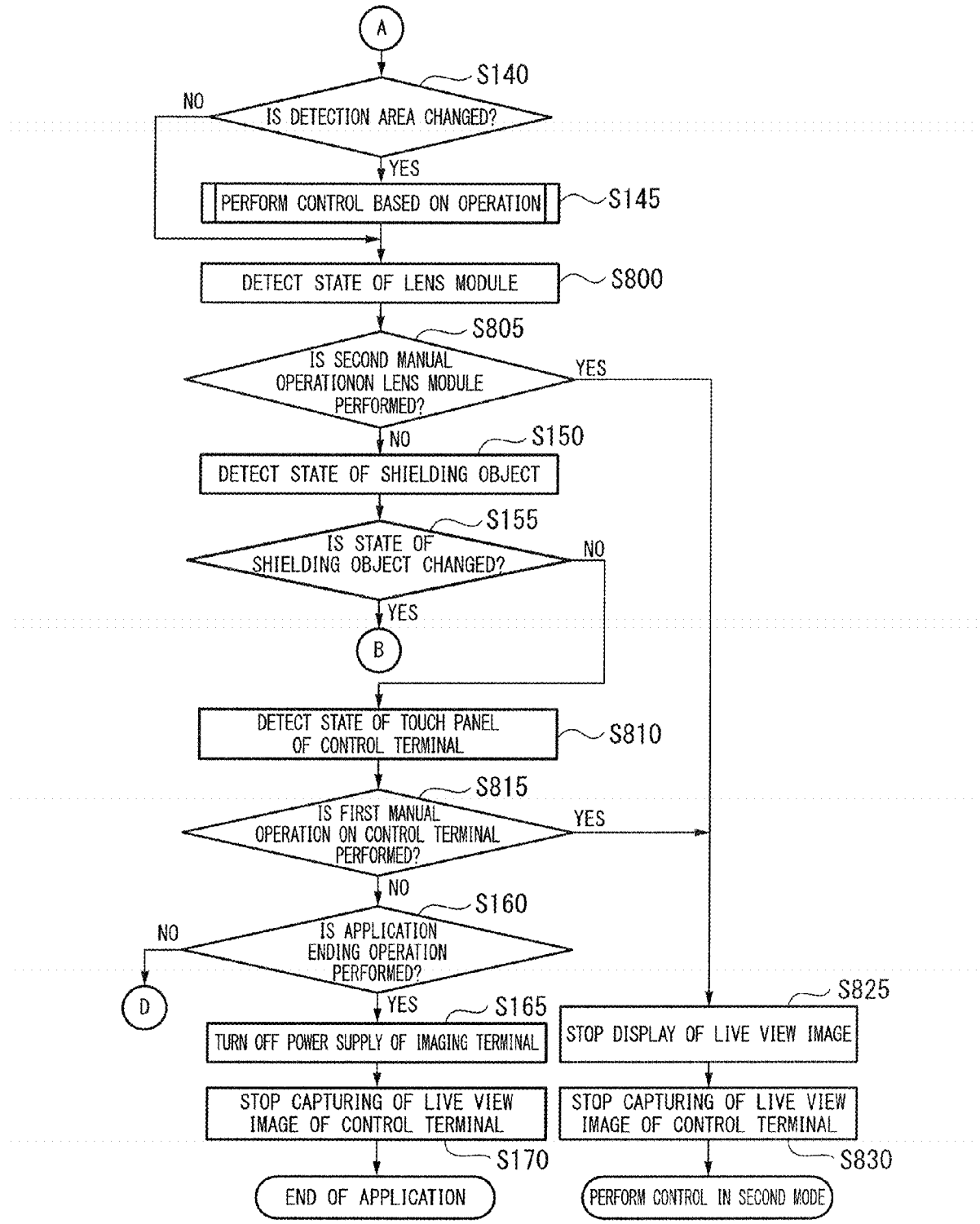
FIG. 46 is a flowchart showing an operation flow of the control terminal according to the seventh modified example of the embodiment of the present invention.

The operation of the control terminal 10*b* according to the seventh modified example is based on FIGS. 42 and 46. The operation of the control terminal 10*b* will be described with reference to FIG. 46. A difference of the process showed in FIG. 46 from the process showed in FIG. 7 will be described below.

After step S145 is performed, the communication unit 201 of the imaging terminal 20*a* receives information on the state of the lens module 20*b* from the lens module 20*b*. The communication unit 201 wirelessly transmits the received information to the control terminal 10*b*. The communication unit 103*a* of the control terminal 10*b* wirelessly receives the information on the state of the lens module 20*b* from the imaging terminal 20*a*. The manual operation detecting unit 105 detects the state of the lens module 20*b* based on the received information (step S800).

The manual operation detecting unit 105 determines whether or not the second manual operation on the lens module 20*b* is performed based on the result of step S800 (step S805). When the second manual operation is not performed, step S150 is performed. When the second manual operation is performed, the display unit 104 stops the display of a live view image formed by the imaging unit 100 (step S825).

When the display of the live view image is stopped, the imaging unit 100 stops the capturing of the live view image (step S830). After the capturing of the live view image is stopped, the control terminal 10*b* performs the control in the second mode.

When the state of the shielding object is not changed in step S155, the manual operation detecting unit 105 detects the state of the touch panel of the control terminal 10*b* (step S810). The manual operation detecting unit 105 determines whether or not the first manual operation on the control terminal 10*b* is performed based on the result of step S810 (step S815). When the first manual operation is performed, step S825 is performed. When the first manual operation is not performed, step S160 is performed.

Regarding points other than those just described, the process showed in FIG. 46 is the same as the process showed in FIG. 7.

Figure 47:
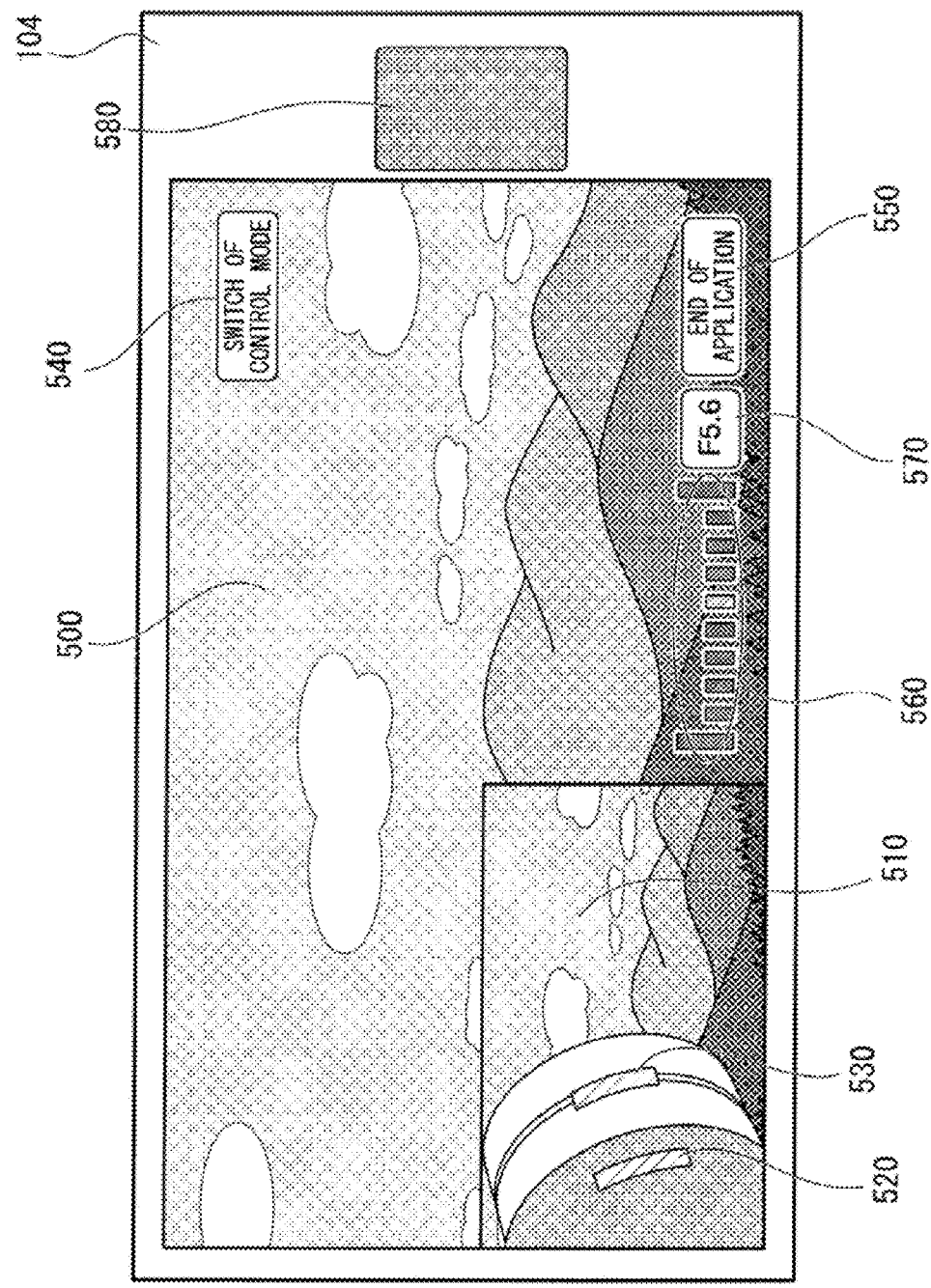
FIG. 47 is a reference diagram showing a screen of a display unit in the seventh modified example of the embodiment of the present invention.

FIG. 47 shows an example of a screen of the display unit 104. The display unit 104 is constituted by a touch panel. The display unit 104 displays an image 500 formed by the imaging unit 200 of the imaging terminal 20*a*. The display unit 104 displays an image 510 formed by the imaging unit 100 of the control terminal 10*b*. For example, the image 510 overlaps the image 500. Part of the imaging unit 200 may not be displayed and the image 510 may be displayed in that part. Alternatively, the image 500 and the image 510 may be arranged in parallel. The display unit 104 displays a detection area 520 and a detection area 530 in which detection of a user's finger or hand is performed in the image 510. Since the detection area 520 and the detection area 530 are displayed, the user can easily see the area in which the finger or hand performs an operation.

The display unit 104 includes a mode switching button 540 and an end button 550 in the image 500. The mode switching button 540 is a button for receiving an operation of switching a control mode. When the mode switching button 540 is operated while the control in the first mode is performed, the control in the second mode is performed. When the mode switching button 540 is operated while the control in the second mode is performed, the control in the first mode is performed. Although not showed in FIG. 47, the control mode may be displayed to show which of the first control mode and the second control mode the current control mode is. For example, the current control mode is displayed on the mode switching button 540 or in the vicinity thereof. Alternatively, the current control mode may be clearly displayed in a color. The end button 550 is a button for receiving an application ending operation.

The display unit 104 displays an indicator 560 visually indicating a value of an imaging parameter and an imaging parameter value 570 in the image 500. For example, the imaging parameter value is an aperture value. The imaging parameter value may be a shutter speed value. When a user performs an operation in the first mode with a finger or hand, it is difficult for the user to check a degree to which the imaging parameter (a parameter such as an aperture or shutter speed) is changed from the state of the image 500. Since the indicator 560 and the imaging parameter value 570 are displayed, the user can easily know the imaging parameter value when the user performs an operation with the finger or hand.

The display unit 104 displays a shutter button 580 in the vicinity of the image 500. The shutter button 580 is a button for receiving an instruction to capture an image for the imaging unit 200 of the imaging terminal 20*a*.

For example, in step S810, the states of the mode switching button 540 and the shutter button 580 are detected. When an operation on any one of the mode switching button 540 and the shutter button 580 is detected in step S815, step S825 and step S835 are performed.

In the operation, when at least one of the first manual operation and the second manual operation is detected, step S825 and step S830 are performed and then the control in the second mode is performed. Accordingly, the detection of the operation with the user's finger or hand and the display and formation of an image are stopped and the control terminal 10*b* operates in the second control mode. As a result, the power consumption of the control terminal 10*b* is reduced.

Multiple characteristic elements of the first to seventh modified examples of the embodiment of the present invention may be combined.

While preferred embodiments of the invention have been described and showed above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control terminal comprising:
   an imaging unit configured to capture an image of a shooting area and to generate a first image;
   a shielding object detecting unit configured to detect a shielding object fixed to the control terminal, the shielding object shielding part of the shooting area; and
   an operation detecting unit configured to detect a predetermined state of an object other than the shielding object or a predetermined motion of the object based on a second image after the shielding object is detected, the second image being an image of at least an area based on an image of the shielding object in the first image; wherein
   the control terminal is provided to output a control signal to a control target terminal when the predetermined state of the object or the predetermined motion of the object is detected.

2. The control terminal according to claim 1, wherein the shielding object detecting unit detects the shielding object based on the first image.

3. The control terminal according to claim 2, wherein focus or exposure of the imaging unit is settable, and
   wherein the focus or the exposure set in the imaging unit is fixed while the shielding object detecting unit detects the shielding object.

4. The control terminal according to claim 1, wherein the shielding object is the control target terminal.

5. The control terminal according to claim 1, wherein the control target terminal is an imaging terminal having a wireless communication function, and
   wherein the control terminal is provided to wirelessly transmit the control signal relevant to the imaging to the imaging terminal when the predetermined state of the object or the predetermined motion of the object is detected.

6. The control terminal according to claim 1, wherein the operation detecting unit stops the detecting of the predetermined state of the object or the predetermined motion of the object when the shielding object is not detected after the shielding object has been detected.

7. The control terminal according to claim 1, further comprising a display unit configured to display the first image,
   wherein the display unit stops the displaying of the first image when the shielding object is not detected after the shielding object has been detected.

8. The control terminal according to claim 1, wherein the imaging unit stops the forming of the first image when the shielding object is not detected after the shielding object has been detected.

9. The control terminal according to claim 1, wherein the operation detecting unit detects a position of the object and the predetermined state of the object based on the second image after the shielding object is detected, the second image being an image of at least an area based on an image of the shielding object in the first image, and
   wherein the control terminal is provided to output the control signal based on the position of the object to the control target terminal when the predetermined state of the object is detected.

10. The control terminal according to claim 9, wherein the control target terminal is a lens module connected to an imaging terminal, and
    wherein the control terminal is provided to output the control signal to the lens module when the position of the object is at least an area based on the lens module and the predetermined state of the object is detected.

11. The control terminal according to claim 1, wherein the operation detecting unit detects the predetermined state of the object or the predetermined motion of the object based on the second image after the shielding object is detected, the second image being an image of a second area which is included in a first area including the shielding object in the first image.

12. The control terminal according to claim 11, wherein the control terminal is provided to input information from the control target terminal, and
    wherein the operation detecting unit further detects the second area based on the information.

13. The control terminal according to claim 12, wherein the control target terminal is an imaging terminal and a lens module is connected to the imaging terminal,
    wherein the control terminal is provided to input information of the lens module from the imaging terminal, and
    wherein the second area is at least an area including an image of the imaging terminal.

14. The control terminal according to claim 1, wherein the control terminal is provided to detect a first manual operation on the control terminal, and
    wherein the operation detecting unit stops the detecting of the predetermined state of the object or the predetermined motion of the object when the first manual operation is detected after the shielding object has been detected.

15. The control terminal according to claim 1, wherein the control target terminal is an imaging terminal, wherein the control terminal is provided to detect a second manual operation on a lens module connected to the imaging terminal, and wherein the operation detecting unit stops the detecting of the predetermined state of the object or the predetermined motion of the object when the second manual operation is detected after the shielding object has been detected.

16. An imaging system comprising a control terminal and an imaging terminal, wherein the control terminal includes:

a first imaging unit configured to capture an image of a shooting area and to generate a first image;

a shielding object detecting unit configured to detect a shielding object fixed to the control terminal, the shielding object shielding part of the shooting area; and an operation detecting unit configured to detect a predetermined state of an object other than the shielding object or a predetermined motion of the object based on a second image after the shielding object is detected, the second image being an image of at least an area based on an image of the shielding object in the first image;

wherein the control terminal is provided to output a control signal to a control target terminal when the predetermined state of the object or the predetermined motion of the object is detected, wherein the imaging terminal includes a second imaging unit configured to capture an image based on the control signal and to generate a third image; and wherein the imaging terminal is provided to input the control signal from the control terminal.

17. A control method comprising:

an imaging step of capturing an image of a shooting area using an imaging unit of a control terminal and forming a first image;

a shielding object detecting step of detecting a shielding object fixed to the control terminal, the shielding object shielding part of the shooting area;

an operation detecting step of detecting a predetermined state of an object other than the shielding object or a predetermined motion of the object based on a second image after the shielding object is detected, the second image being an image of at least an area based on an image of the shielding object in the first image; and an output step of outputting a control signal to a control target terminal when the predetermined state of the object or the predetermined motion of the object is detected.

18. A non-transitory medium saving a program causing a computer to perform:

an imaging step of capturing an image of a shooting area using an imaging unit of a control terminal and forming a first image;

a shielding object detecting step of detecting a shielding object fixed to the control terminal, the shielding object shielding part of the shooting area;

an operation detecting step of detecting a predetermined state of an object other than the shielding object or a predetermined motion of the object based on a second image after the shielding object is detected, the second image being an image of at least an area based on an image of the shielding object in the first image; and an output step of outputting a control signal to a control target terminal when the predetermined state of the object or the predetermined motion of the object is detected.

* * * * *